United States Patent
Liu et al.

(10) Patent No.: US 12,001,681 B2
(45) Date of Patent: Jun. 4, 2024

(54) DISTRIBUTED STORAGE SYSTEM AND DATA PROCESSING METHOD

(71) Applicant: HUAWEI TECHNOLOGIES CO., LTD., Guangdong (CN)

(72) Inventors: Jinzhong Liu, Beijing (CN); Hongdong Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 17/677,864

(22) Filed: Feb. 22, 2022

(65) Prior Publication Data

US 2022/0179560 A1  Jun. 9, 2022

Related U.S. Application Data

(63) Continuation of application No. PCT/CN2020/088871, filed on May 7, 2020.

(30) Foreign Application Priority Data

Aug. 22, 2019  (CN) .......................... 201910779723.9
Nov. 13, 2019  (CN) .......................... 201911109237.2

(51) Int. Cl.
*G06F 3/05* (2006.01)
*G06F 3/06* (2006.01)
*H04L 67/1097* (2022.01)

(52) U.S. Cl.
CPC .......... *G06F 3/0613* (2013.01); *G06F 3/0631* (2013.01); *G06F 3/067* (2013.01); *H04L 67/1097* (2013.01)

(58) Field of Classification Search
CPC ......... G06F 3/061–0613; G06F 3/0631; G06F 3/067; G06F 9/3877–3881;
(Continued)

(56) References Cited

U.S. PATENT DOCUMENTS 10,846,096 B1 * 11/2020 Chung .................. G06F 9/3856
2006/0080479 A1 * 4/2006 Anjo ........................ G06F 13/28
710/22
(Continued)

FOREIGN PATENT DOCUMENTS

CN  106688217 A  5/2017
CN  107613030 A  1/2018
(Continued)

OTHER PUBLICATIONS

Pan Kexian et al., "Design of IDE Hard Disk Driver of DMA Mode on Intel Xscale", Electronic Engineer, vol. 32, No. 1, Jan. 2006, with an English abstract, total 4 pages.
(Continued)

*Primary Examiner* — Ilwoo Park
(74) *Attorney, Agent, or Firm* — HUAWEI TECHNOLOGIES CO., LTD.

(57) ABSTRACT

This application provides a storage device, a distributed storage system, and a data processing method, and belongs to the field of storage technologies. In this application, an AI apparatus is disposed inside a storage device, so that the storage device has an AI computing capability. In addition, the storage device further includes a processor and a hard disk, and therefore further has a service data storage capability. Therefore, convergence of storage and AI computing power is implemented. An AI parameter and service data are transmitted inside the storage device through a high-speed interconnect network without a need of being forwarded through an external network. Therefore, a path for transmitting the service data and the AI parameter is greatly shortened, and the service data can be loaded nearby, thereby accelerating loading.

10 Claims, 29 Drawing Sheets

(58) Field of Classification Search
CPC ....... G06F 13/28–287; G06F 15/17337; G06F 2209/3883; G06F 2213/0026; G06F 2213/28–2808
USPC .... 709/217–219; 710/22–28, 62, 68, 72, 74, 710/308
See application file for complete search history.

(56) References Cited

U.S. PATENT DOCUMENTS

| | | | |
|---|---|---|---|
| 2014/0129753 A1 | 5/2014 | Schuette et al. | |
| 2014/0149528 A1* | 5/2014 | VandaVaart | H04L 69/10 709/213 |
| 2014/0344194 A1 | 11/2014 | Lee et al. | |
| 2017/0147516 A1* | 5/2017 | De | G06F 3/0685 |
| 2019/0065410 A1 | 2/2019 | Bigioi et al. | |
| 2019/0073585 A1 | 3/2019 | Pu et al. | |
| 2019/0121889 A1 | 4/2019 | Gold et al. | |
| 2019/0227887 A1 | 7/2019 | Hu et al. | |
| 2019/0228308 A1 | 7/2019 | Zhou et al. | |
| 2019/0347212 A1 | 11/2019 | Chen et al. | |
| 2020/0311599 A1* | 10/2020 | Chen | G06F 18/214 |

FOREIGN PATENT DOCUMENTS

| | | |
|---|---|---|
| CN | 108153190 A | 6/2018 |
| CN | 207965873 U | 10/2018 |
| CN | 109408500 A | 3/2019 |
| CN | 110069111 A | 7/2019 |
| CN | 110147251 A | 8/2019 |
| CN | 111104459 A | 5/2020 |
| JP | 2016181280 A | 10/2016 |
| TW | 201905714 A | 2/2019 |
| WO | 2017120517 A1 | 7/2017 |
| WO | 2018164782 A1 | 9/2018 |
| WO | 2019147708 A1 | 8/2019 |
| WO | 2020121359 A1 | 6/2020 |

OTHER PUBLICATIONS

Feldman Michael: "Nvidia GPU Accelerators Get A Direct Pipe To Big Data", Aug. 9, 2019 (Aug. 9, 2019), pp. 1-6, XP093000157.
Foertter Fernanda: "Summit GPU Supercomputer Enables Smarter Science—NVIDIA Technical Blog", Jun. 8, 2018 (Jun. 8, 2018), pp. 1-4, XP093000709.
Thompson Adam et al: "GPUDirect Storage: A Direct Path Between Storage and GPU Memory—NVIDIA Technical Blog", Aug. 6, 2019 (Aug. 6, 2019), p. 1 8, XP093000164.
Harris Mark: "Unified Memory for CUDA Beginners—NVIDIA Developer Blog", Jun. 19, 2017 (Jun. 19, 2017), XP055864746, Total 6 pages.

* cited by examiner

DISTRIBUTED STORAGE SYSTEM AND DATA PROCESSING METHOD

CROSS-REFERENCE TO RELATED APPLICATIONS

This application is a continuation of International Patent Application No. PCT/CN2020/088871, filed on May 7, 2020, which claims priority to Chinese Patent Application No. 201910779723.9, filed on Aug. 22, 2019 and Chinese Patent Application No. 201911109237.2, filed on Nov. 13, 2019. All of the aforementioned patent applications are hereby incorporated by reference in their entireties.

TECHNICAL FIELD

This application relates to the field of storage technologies, and especially, to a storage device, a distributed storage system, and a data processing method.

BACKGROUND

With development of storage technologies and artificial intelligence (artificial intelligence, AI) technologies, a storage device may store service data for AI computing. The service data may be, for example, a sample set used for model training, such as a face image set used for training a facial recognition model, an audio sample set used for training a speech recognition model, or a sample text used for training a semantic recognition model.

The face image set is used as an example. A single server cannot meet a computing requirement due to a large amount of to-be-computed data. Therefore, currently, a mainstream architecture is a cluster architecture with a plurality of devices. This architecture includes an AI cluster, a storage cluster, and a switch. The AI cluster includes a plurality of AI servers for AI computing. The storage cluster includes a plurality of storage devices for storing service data. The switch is configured to forward service data between an AI server and a storage device. In an AI computing process, the AI server establishes a remote network connection to the storage device according to a transmission control protocol/internet protocol (transmission control protocol/internet protocol, TCP/IP) protocol. When the AI server needs to obtain service data required for AI computing, the AI server sends a data obtaining request to the storage device through the switch. After receiving the data obtaining request, the storage device sends stored service data to the AI server through the switch. Then, the AI server loads the service data to a memory for AI computing.

In the foregoing architecture, the service data needs to be sent from the storage device to the switch through a network, and then sent from the switch to the AI server through the network, so that the AI server can obtain the service data to perform AI computing. Therefore, a path for obtaining service data in an AI computing process is very long. Consequently, the service data is obtained at a very slow speed and with low efficiency.

SUMMARY

Embodiments of this application provide a storage device, a distributed storage system, and a data processing method, to resolve a technical problem that service data is obtained at a very slow speed and with low efficiency in a related technology. The technical solutions are as follows:

According to a first aspect, a storage device is provided, including a processor, a hard disk, and an AI apparatus. The AI apparatus communicates with the processor through a high-speed interconnect network. The processor is configured to: receive service data, and store the service data in the hard disk. The AI apparatus is configured to: send a data obtaining request to the processor to obtain the service data, and perform AI computing on the service data.

The AI apparatus is disposed inside the storage device provided in this embodiment, so that the storage device can provide an AI computing capability through the AI apparatus and provide a service data storage capability through the processor and the hard disk in the storage device, thereby implementing convergence of storage and AI computing power. When AI computing needs to be performed, the service data is transmitted inside the storage device through the high-speed interconnect network without a need of being forwarded through an external network. Therefore, a path for transmitting the service data is greatly shortened, and the service data can be loaded nearby, thereby accelerating loading. Optionally, the data obtaining request includes a first data obtaining request. The processor is configured to: in response to the first data obtaining request, obtain the service data from the hard disk, and send the service data to the AI apparatus. In this manner, the AI apparatus obtains the service data nearby. The storage device includes the AI apparatus, the processor, and the hard disk. Therefore, when the AI apparatus needs to obtain the service data, the AI apparatus sends the data obtaining request to the processor. The processor in the storage device obtains the service data from the hard disk, and sends the service data to an AI processor, so that the AI processor can locally obtain the service data. This avoids communication overheads caused by requesting the service data from a remote storage device through a network, and shortens a delay of obtaining the service data.

Optionally, the data obtaining request includes a second data obtaining request. The processor is configured to send metadata of the service data to the AI apparatus in response to the second data obtaining request. The metadata is used to indicate an address of the service data. The AI apparatus is configured to: when the metadata indicates that the service data is located in the storage device, send a first data access request to the hard disk. The first data access request includes the metadata. The hard disk is configured to: obtain the service data based on the metadata, and write the service data into the AI apparatus through DMA. In this manner, DMA pass-through between the AI apparatus and the hard disk can be implemented. A DMA path is established between the AI apparatus and the hard disk, so that the AI apparatus and the hard disk can quickly exchange the service data with each other through the DMA path. This accelerates service data loading by the AI apparatus, increases an amount of service data that can be simultaneously processed by the AI apparatus, reduces communication overheads for transmitting an AI parameter between AI apparatuses, and accelerates AI training.

Optionally, the data obtaining request includes a third data obtaining request. The processor is configured to send metadata of the service data to the AI apparatus in response to the third data obtaining request. The metadata is used to indicate an address of the service data. The AI apparatus is configured to: when the metadata indicates that the service data is located in another storage device, send a second data access request to the another storage device. The second data access request includes the metadata. In this optional manner, RDMA pass-through between an AI memory in the AI apparatus and the another storage device is implemented, and the AI memory and the another storage device quickly exchange the service data with each other. This accelerates AI training.

Optionally, the storage device further includes a memory. The processor is further configured to obtain a segment of memory space from the memory through division and reserve the segment of memory space for the AI apparatus. In this optional manner, the AI apparatus can borrow the memory in a storage apparatus to perform AI computing, so that available memory space of the AI apparatus is expanded, and the AI apparatus can perform AI computing in larger memory. This improves AI computing efficiency.

Optionally, the AI apparatus includes an AI processor and an AI memory. The AI processor is configured to: when an available capacity of the AI memory reaches a preset threshold, send a memory application request to the processor. The available capacity of the AI memory is determined by a specified batch size. The memory application request is used to request the processor to obtain a segment of memory space from the memory through division and reserve the segment of memory space for the AI apparatus. In this optional manner, the AI processor may perform training by using memory space of the memory. Therefore, because larger available memory space can increase a batch size for AI training, an amount of service data that can be processed by the AI apparatus in one batch can be increased, communication overheads for exchanging an AI parameter between different AI apparatuses can be reduced, and AI training can be accelerated. Experiments show that, if AI training is performed only through the AI memory, a maximum batch size is set to 256. However, in this manner, the batch size may be set to 32000. Therefore, the batch size is significantly increased.

In a related technology, the memory in the storage device has a fixed capacity, and consequently there is frequently no sufficient memory for storing the service data. However, in this optional manner, the storage apparatus can borrow the AI memory in the AI apparatus to read/write the service data, so that available memory space of the storage apparatus is expanded, and the storage apparatus can store the service data in larger memory. This shortens a service data read/write time, and improves service data read/write efficiency.

Optionally, the AI apparatus includes an AI processor. The AI processor is configured to: divide a computing task into at least two subtasks, and send a first subtask in the at least two subtasks to the processor. The processor is further configured to: execute the first subtask, and send a computing result to the AI processor. In this optional manner, computing power of the AI processor and computing power of the processor are collaborated, and the AI processor can borrow the computing power of the processor in the storage device to increase the computing power of the AI processor. This accelerates AI computing processed by the AI processor.

Optionally, the AI processor is further configured to: before dividing the computing task into the at least two subtasks, determine that the computing power of the AI processor is insufficient. In this optional manner, when determining that the computing power of the AI processor is insufficient, the AI processor can borrow the computing power of the processor to process AI computing. This breaks a bottleneck of insufficient computing power resources in an AI training process.

Optionally, the processor is configured to: divide a computing task into at least two subtasks, and send a second subtask in the at least two subtasks to the AI processor. The AI processor is further configured to: execute the second subtask, and send a computing result to the processor. In this optional manner, computing power of the AI processor and computing power of the processor are collaborated, and the processor in the storage device can borrow the computing power of the AI processor to increase the computing power of the processor in the storage device. This accelerates service data read/write performed by the processor in the storage device.

The processor is further configured to: execute the first subtask, and send a computing result to the AI processor.

Optionally, the AI memory communicates with the memory in the storage device through a memory fabric (memory fabric).

Optionally, the AI memory communicates with an AI memory in another storage device through a memory fabric.

Optionally, the memory in the storage device communicates with a memory in another storage device through a memory fabric.

Optionally, the memory in the storage device communicates with an AI memory in another storage device through a memory fabric.

Unified scheduling of a memory and an AI memory in one storage device, unified scheduling of memories in different storage devices, and unified scheduling of AI memories in different storage devices can be implemented through the memory fabric. This improves memory resource scheduling and use efficiency of a storage system.

Optionally, the AI apparatus communicates with the processor through a high-speed serial computer expansion bus standard (peripheral component interconnect express, PCIe for short) bus.

Optionally, the processor is configured to: when an available capacity of the memory reaches a preset threshold, send a memory application request to the AI processor. The memory application request is used to request the processor to obtain a segment of memory space from the AI memory through division and reserve the segment of memory space for the processor.

Optionally, the AI apparatus further includes an AI computing power unit. The AI computing power unit is specifically configured to: obtain the service data from the AI memory, and perform AI computing. Optionally, the AI processor is further configured to obtain a segment of memory space from the AI memory through division and reserve the segment of memory space for the processor in the storage device.

Optionally, the AI memory serves as a first level and the memory serves as a second level, to perform layered AI parameter caching. A priority of the first level is higher than a priority of the second level. In this manner, the memory and the AI memory are layered, and an AI parameter is preferentially cached in the AI memory.

According to a second aspect, a distributed storage system is provided, including a plurality of storage devices. The plurality of storage devices include a first storage device. The first storage device includes a first processor, a first hard disk, and a first AI apparatus. The first AI apparatus communicates with the first processor through a high-speed interconnect network. The first processor is configured to: receive service data, and store the service data in the first hard disk. The first AI apparatus is configured to: send a data obtaining request to the first processor to obtain the service data, and perform AI computing on the service data.

In the distributed storage system provided in this embodiment, two AI apparatuses in different storage devices exchange an AI parameter with each other through a first network, and two storage apparatuses in the different storage devices exchange service data with each other through a second network, to collaboratively perform AI computing based on the AI parameter and the service data. Storage capabilities and AI computing power of a plurality of storage devices are converged, so that an overall storage capability and AI computing power of the system can be increased.

Optionally, the second storage device is configured to transmit the service data to the first storage device through a second network. The second storage device is further configured to transmit an AI parameter to the first storage device through a first network. The AI parameter is used to perform AI computing on the service data. The first network and the second network are deployed, so that the AI parameter can be transmitted through the first network, and the service data can be transmitted through the second network. Therefore, for the system, a network resource used to forward an AI parameter can be separated from a network resource used to forward other data, so as to prevent original storage network resources of the storage device from being occupied during AI parameter transmission, thereby preventing network transmission performance of the storage device from being deteriorated when a network bandwidth of the storage device is occupied in an AI computing process. In addition, the first network can be dedicated to forwarding AI-related service data. Therefore, based on the network, impact on networking of an existing service data center or a storage device cluster can be avoided.

Optionally, the second storage device is further configured to transmit other service data to the first storage device through the first network. Optionally, when a quantity of network resources of the second network is less than a specified storage network resource threshold, the other service data is transmitted between the first storage device and the second storage device through the first network. In this optional manner, a new path is provided for service data exchange between storage apparatuses. When network resources of the second network are insufficient, the first network is used to exchange the service data, and the first network may be used as a newly added path for forwarding the service data. Therefore, the service data can be transmitted through the second network or the first network. This increases a network bandwidth for transmitting the service data, shortens a delay of exchanging the service data, accelerates service data exchange, and accelerates AI computing.

Optionally, the second storage device is further configured to transmit another AI parameter through the second network. The another AI parameter is used to perform AI computing on the other service data.

Optionally, when a quantity of network resources of the first network is less than a specified AI network resource threshold, the another AI parameter is transmitted between the first AI apparatus and the second AI apparatus through the second network. In this optional manner, a new path is provided for AI parameter exchange between AI apparatuses. When network resources of the first network are insufficient, the second network is used to exchange the AI parameter. This increases a network bandwidth for transmitting the AI parameter, shortens a delay of exchanging the AI parameter, accelerates AI parameter exchange, and accelerates AI computing.

Optionally, the first AI apparatus includes a first AI processor and a first AI memory, the second storage apparatus includes a second processor, and the second AI apparatus includes a second AI memory. The first AI processor is configured to: send a network resource request of the second network to the second processor, and send a memory RDMA access request to the second processor. The first AI processor is configured to: read other service data from the first memory, and send the other service data to the second AI apparatus through the second network. The second AI apparatus writes the other service data into the second memory. In this optional manner, memory pass-through between the first storage device and the second storage device is implemented, and a memory in the first storage device and a memory in the second storage device can exchange the service data with each other through RDMA. Therefore, processing overheads of the first processor and the second processor can be avoided, and the service data is directly transmitted from the first memory to the second memory. This accelerates service data exchange, and improves service data exchange efficiency.

Optionally, the system further includes a management apparatus. The management apparatus is configured to: receive a first job request; determine distribution of a to-be-trained dataset based on the first job request, where the dataset includes the service data; and when determining that the service data is distributed on the first storage device, send a first computing request to the first storage device. The first computing request is used to request the first AI apparatus to perform AI computing on the service data. In this optional manner, the management apparatus selects the first storage device in which the service data is located, to provide AI computing, and the first storage device may obtain the service data through a first storage apparatus in the first storage device, to perform AI computing. This prevents the service data from moving across storage devices, avoids a delay caused by accessing another storage device to obtain the service data, shortens a delay of obtaining the service data, and accelerates AI computing.

Optionally, the first AI apparatus is configured to: obtain the service data from the first storage apparatus in the first storage device based on the first computing request, and perform AI computing on the service data to obtain a first computing result. Optionally, before sending the first computing request to the first AI apparatus in the first storage device, the management apparatus is further configured to determine that a running status of the first storage device meets a specified condition. In this optional manner, it can be ensured that the selected first storage device is not occupied currently and can provide AI computing power, so as to avoid problems that device overheads are excessively high and an AI computing task cannot be completed in time because an occupied storage device is selected to perform AI computing.

Optionally, the dataset further includes other service data. The management apparatus is further configured to: when determining that the other service data is distributed on a second storage device in the plurality of storage devices, further determine a running status of the second storage device; and when the running status of the second storage device does not meet the specified condition, send a second computing request to the first storage device. A distance between the first storage device and the second storage device is less than a specified distance threshold. The first AI apparatus is further configured to: obtain the other service data from the second storage device based on the second computing request, and perform AI computing on the other service data to obtain a second computing result. In this optional manner, if a storage device in which the service data is located has been occupied, the management apparatus can select a storage apparatus that is close to the service data, to provide AI computing. This shortens a service data transmission distance, and reduces cross-node service data movements.

Optionally, before determining whether the running status of the second storage device meets the specified condition, the management apparatus is further configured to: receive a second job request, and determine, based on the second job request, that a to-be-trained second dataset is distributed on the second storage device.

According to a third aspect, a data processing method is provided. The method is applied to a distributed storage system. The distributed storage system includes a plurality of storage devices. The plurality of storage devices include a first storage device. The method is used to implement a function provided in any implementation of the second aspect.

According to a fourth aspect, a data processing method is provided. The method is applied to a storage device. The storage device includes a processor, a hard disk, and an AI apparatus. The AI apparatus communicates with the processor through a high-speed interconnect network. The method is used to implement a function provided in any implementation of the first aspect.

According to a fifth aspect, a computer-readable storage medium is provided. The storage medium stores at least one instruction, and the instruction is read by a storage device, so that the storage device is enabled to perform the data processing method provided in the fourth aspect or any optional manner of the fourth aspect.

According to a sixth aspect, a computer-readable storage medium is provided. The storage medium stores at least one instruction, and the instruction is read by a distributed storage system, so that the distributed storage system is enabled to perform the data processing method provided in the third aspect or any optional manner of the third aspect.

According to a seventh aspect, a computer program product is provided. When the computer program product is run on a storage device, the storage device is enabled to perform the data processing method provided in the fourth aspect or any optional manner of the fourth aspect.

According to an eighth aspect, a computer program product is provided. When the computer program product is run on a distributed storage system, the distributed storage system is enabled to perform the data processing method provided in the third aspect or any optional manner of the third aspect.

DESCRIPTION OF EMBODIMENTS

Figure 1:
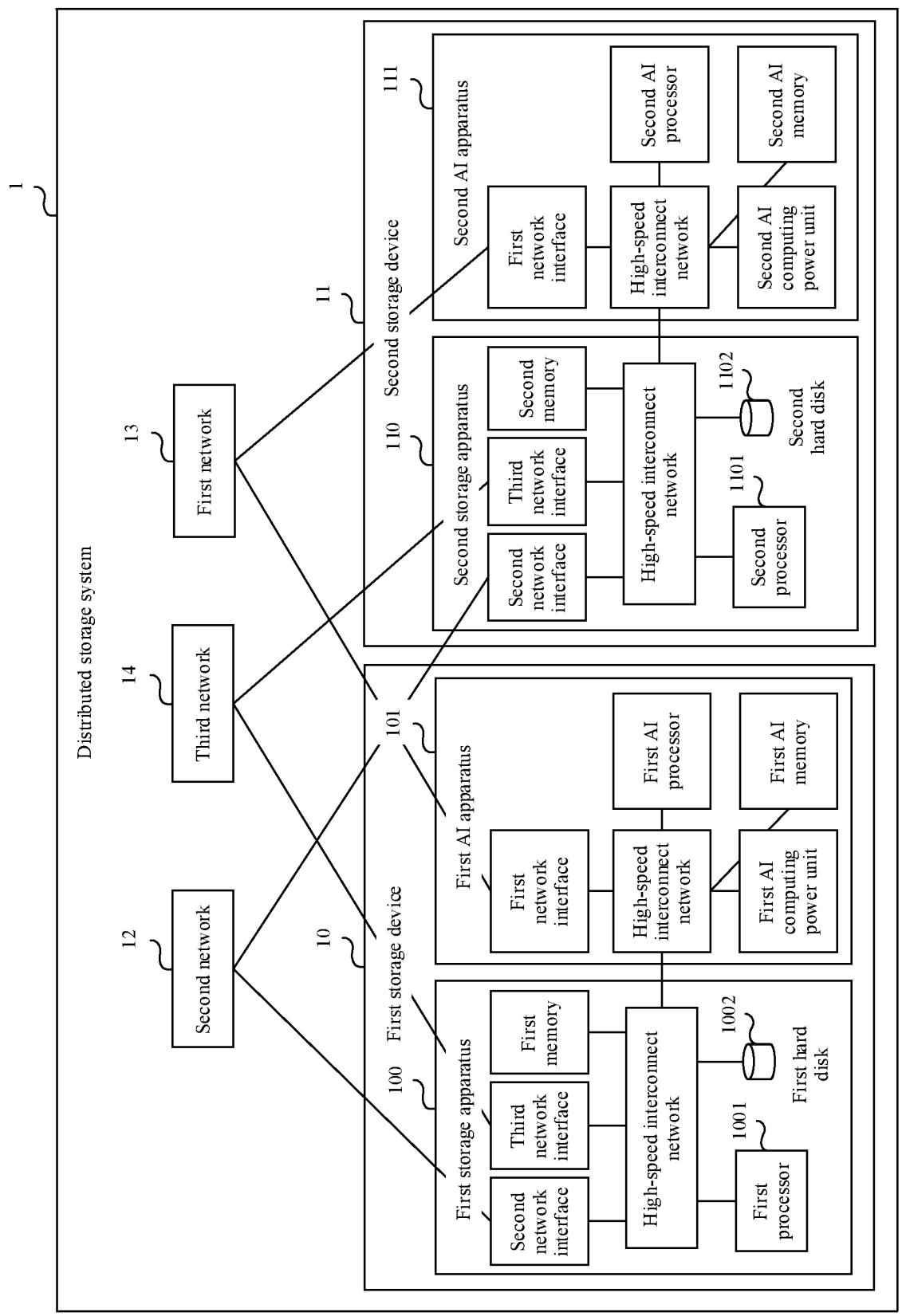
FIG. 1 is an architectural diagram of a distributed storage system according to an embodiment of this application.

The following explains terms related in this application.

Artificial intelligence (artificial intelligence, AI) is a theory, a method, a technology, and an application system for simulating, extending, and expanding human intelligence through a computer or a machine controlled by a computer, to sense an environment, obtain knowledge, and obtain an optimal result by using the knowledge. In other words, the artificial intelligence is a comprehensive technology of computer science, which produces, based on essence of intelligence, a new intelligent machine that can react in a manner similar to that of the human intelligence. The artificial intelligence is to study design principles and implementations of various intelligent machines, so that the machines have perception, inference, and decision-making functions.

Generally, AI implementation includes two phases: training and inference. Training means that a neural network model is obtained through training by using a large quantity of labeled samples, so that the neural network model can have a specific function. Inference is also referred to as prediction or inference, and means that a neural network model obtained through training is used to infer various conclusions based on new service data.

A high-speed serial computer expansion bus standard (peripheral component interconnect express, PCIe for short) bus is a local bus developed based on a peripheral component interconnect (peripheral component interconnect, PCI for short) bus, and is used to connect a processor and at least one peripheral device. A peripheral device that conforms to a PCIe bus standard is referred to as a PCIe device. The PCIe bus has at least one PCIe interface. Each PCIe interface may be a slot in a physical form. Each PCIe interface is configured to connect to one PCIe device. Each PCIe device on the PCIe bus uses a serial interconnect manner, and different PCIe devices on the PCIe bus may perform service data transmission in a point-to-point manner. A PCIe protocol is generally compatible with a technology related to the PCI protocol and a PCI device.

A Huawei cache coherence system (Huawei cache-coherent system, HCCS) is a protocol standard for maintaining consistency of service data between a plurality of ports (socket).

An AI parameter is a parameter in an AI model that is determined through AI training. In other words, the AI model may be considered as a function, and the AI parameter may be considered as a coefficient in the function. For example, if the AI model is a neural network, the AI parameter may be a weight of a convolution kernel in the neural network. For another example, if the AI model is a support vector machine, the AI parameter may be a support vector in the support vector machine. For another example, if the AI model is a linear regression model or a logistic regression model, the AI parameter may be a coefficient in the linear regression model or the logistic regression model. Certainly, the enumerated AI model is merely an example. The AI model may alternatively be another type of model, for example, a decision tree model, a random forest model, a confidence network, a reinforcement learning model, a transfer learning model, or an inductive learning model, or a combination thereof. Correspondingly, the AI parameter may alternatively be a parameter in the another type of model. A specific type of the AI parameter and a specific type of the AI model are not limited in the embodiments of this application.

An AI parameter adjustment process is critical to AI computing. Specifically, in an AI computing process, service data in a dataset is usually input into an AI model. The AI model performs inference and prediction on the service data based on an AI parameter, to obtain a prediction result. The AI parameter is adjusted based on an error between the prediction result and an actual result, so that the error is reduced when inference and prediction is performed next time based on an adjusted AI parameter. AI parameter adjustment is cyclically performed, so that the AI parameter can be gradually accurate through adjustment. When training ends, an AI model including an accurate parameter may be used to implement accurate inference and prediction, for example, accurately perform facial recognition on a face image. Some embodiments of this application can greatly accelerate AI parameter adjustment. For example, by performing the following embodiment in FIG. 17, computing power of a processor in a storage device may be borrowed to greatly increase AI computing power. Therefore, AI parameter computing can be accelerated through stronger AI computing power. For another example, by performing the following embodiment in FIG. 26, a back-end storage network resource (that is, a network resource of a second network) may be borrowed to greatly increase a quantity of available network resources for AI computing. Therefore, AI parameter transmission can be accelerated through more network resources, thereby accelerating AI parameter adjustment and update.

Direct memory access (direct memory access, DMA for short) is a technology for transmitting data between a memory and a peripheral device. Through DMA, the peripheral device may directly write data into the memory or access data in the memory without a need of participation of a central processing unit (central processing unit, CPU). For example, the peripheral device may apply to a processor for memory space, and the processor allocates a memory buffer (buffer) to the peripheral device. Then, the peripheral device may directly write data into the memory buffer, or directly read data from the memory buffer. The peripheral device mentioned herein may be referred to as a DMA controller in a DMA related protocol.

Figure 9:
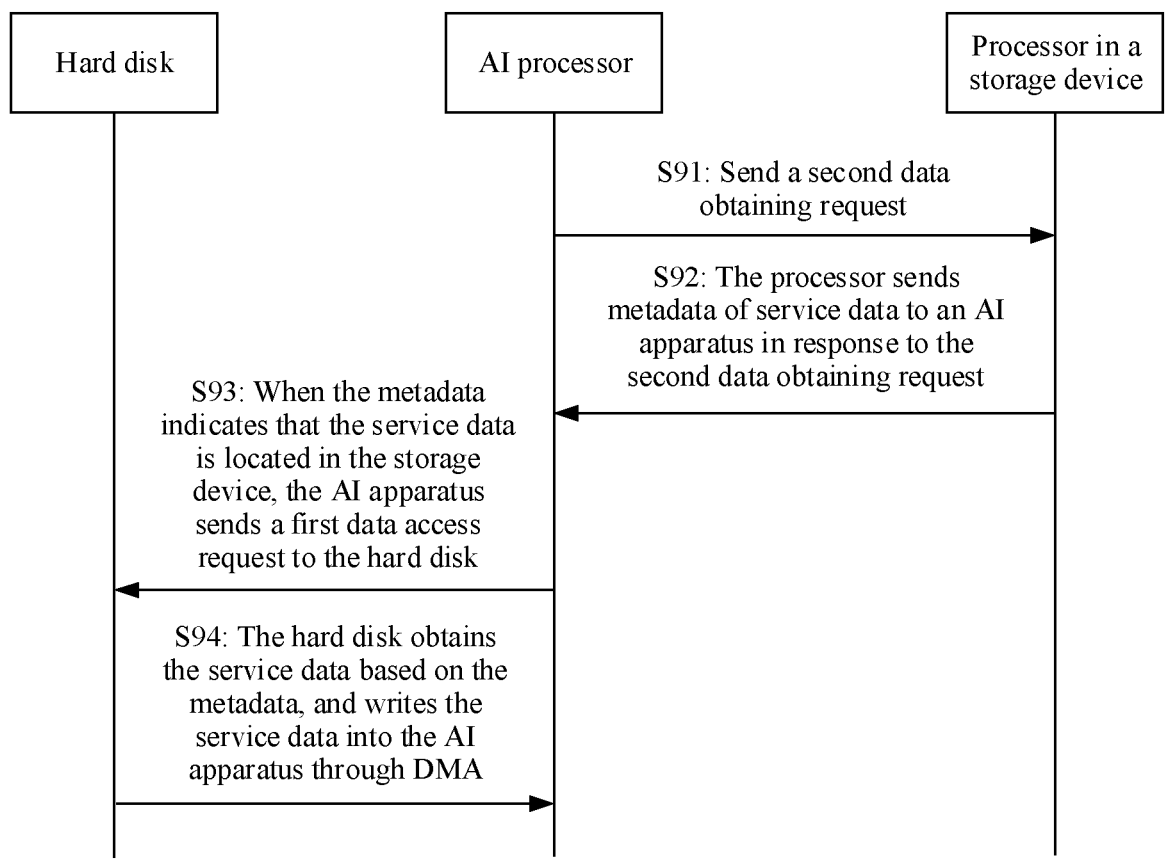
FIG. 9 is a flowchart of a data processing method according to an embodiment of this application.

In an embodiment in FIG. 9 of this application, a hard disk may be the peripheral device described above, and an AI memory may be the memory described above. The hard disk may directly access the AI memory through DMA without a need of participation of a processor and an AI processor in a storage device, thereby accelerating access of the AI memory.

Remote direct memory access (remote direct memory access, RDMA for short) is a technology for directly transmitting data from a memory in one device to a memory in another device. RDMA provides message queue-based point-to-point communication. Each application may obtain a message of the application through a message queue, to avoid CPU intervention. In an RDMA related protocol, an apparatus that performs an RDMA operation (RDMA verb) may be referred to as a remote direct memory access network interface controller (RDMA network interface controller, RNIC for short). The RDMA operation may include a storage operation (memory verb) and a message operation (messaging verb). The storage operation may be used to transmit data. The storage operation includes an RDMA write operation, an RDMA read operation, and an atomic operation. For example, a process of the RDMA write operation may include: A CPU of a destination device sends a virtual address of a memory area and permission information of the memory area to a CPU of a source device. The CPU of the source device stores to-be-written data into a memory area of the source device. The CPU of the source device generates an RDMA write instruction based on a virtual address of the memory area of the source device, the virtual address of the memory area of the destination device, and the permission information of the memory area of the destination device, and adds the RDMA write instruction to a transmit queue of the RNIC. Then, the source device notifies, through a doorbell mechanism, the RNIC to execute the instruction in the transmit queue. Next, the RNIC reads the instruction from the transmit queue to obtain the RDMA write instruction, and performs the RDMA write operation according to the RDMA write instruction. The RDMA read operation may include: The CPU of the destination device stores data in the memory area, and sends the virtual address of the memory area and the permission information of the memory area of the destination device to the CPU of the source device. The CPU of the source device receives the virtual address and the permission information, generates an RDMA read instruction based on the virtual address of the memory area of the source device, the virtual address of the memory area of the destination device, and the permission information of the memory area of the destination device, and adds the RDMA read instruction to the transmit queue. Then, the source device notifies, through the doorbell mechanism, the RNIC to execute the instruction in the transmit queue. The RNIC reads the instruction from the transmit queue to obtain the RDMA read instruction, and performs the RDMA read operation according to the RDMA write instruction. The message operation may be used to control a message. The message operation may include an RDMA sending operation and an RDMA receiving operation.

Figure 22:
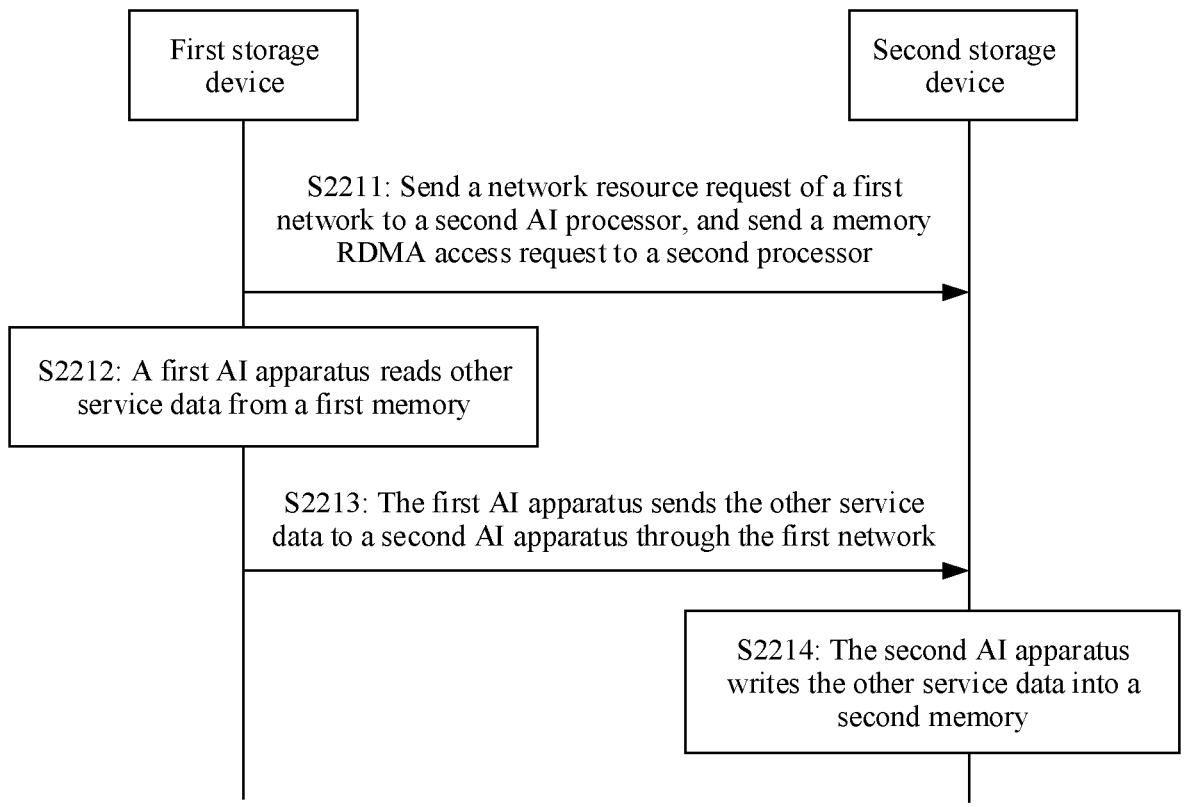
FIG. 22 is a flowchart of a data processing method according to an embodiment of this application.
Figure 26:
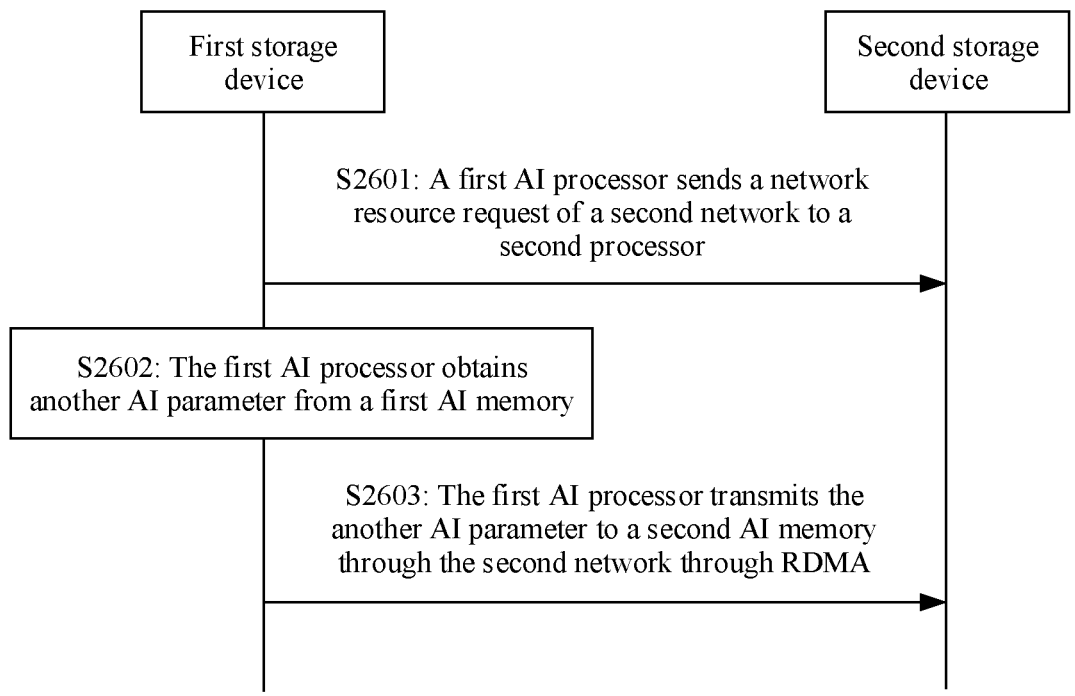
FIG. 26 is a flowchart of a data processing method according to an embodiment of this application.

In the embodiment in FIG. 26 of this application, a first network interface (which may be referred to as an AI parameter network interface) in an AI apparatus may be an RNIC, and may access an AI memory in another storage device through RDMA, or write an AI parameter into an AI memory in another storage device through RDMA. In an embodiment in FIG. 22 of this application, a second network interface (which may be referred to as a back-end switching interface) in a storage apparatus may be an RNIC, and may access a memory in another storage device through RDMA, or write service data into a memory in another storage device through RDMA.

A distributed storage system provided in this application is described below by using an example.

FIG. 1 is an architectural diagram of a distributed storage system according to an embodiment of this application. A distributed storage system 1 includes a plurality of storage devices. The plurality of storage devices include a first storage device 10.

The first storage device 10 is configured to store service data and process AI computing. The first storage device 10 includes a first storage apparatus 100 and a first AI apparatus 101. The first AI apparatus 101 is disposed inside the first storage device 10. The first storage apparatus 100 may include a first processor 1001 and a first hard disk 1002.

The first AI apparatus 101 communicates with the first processor 1001 through a high-speed interconnect network.

The first processor 1001 is configured to: receive service data, and store the service data in the first hard disk 1002.

The first AI apparatus 101 is configured to: send a data obtaining request to the first processor 1001 to obtain the service data, and perform AI computing on the service data.

Optionally, the data obtaining request includes a first data obtaining request.

The first processor 1001 is configured to: in response to the first data obtaining request, obtain the service data from the first hard disk 1002, and send the service data to the first AI apparatus 101.

Optionally, the data obtaining request includes a second data obtaining request.

The first processor 1001 is configured to send metadata of the service data to the first AI apparatus 101 in response to the second data obtaining request. The metadata is used to indicate an address of the service data.

The first AI apparatus 101 is configured to: when the metadata indicates that the service data is located in the first storage device, send a first data access request to the first hard disk 1002. The first data access request includes the metadata.

The first hard disk 1002 is configured to: obtain the service data based on the metadata, and write the service data into the first AI apparatus 101 through DMA.

Optionally, the plurality of storage devices further include a second storage device 11. The first storage device 10 and the second storage device 11 are two different storage devices. The first storage device 10 communicates with the second storage device 11 through a network.

The second storage device 11 is configured to store service data and process AI computing. The second storage device 11 includes a second storage apparatus 110 and a second AI apparatus 111. The second AI apparatus 111 is disposed inside the second storage device 11.

The second storage device 11 includes a second processor 1101 and a second hard disk 1102. The second AI apparatus communicates with the second processor 1101 through the high-speed interconnect network.

The second processor 1101 is configured to: receive service data, and store the service data in the second hard disk 1102.

The second AI apparatus is configured to: send a data obtaining request to the second processor 1101 to obtain the service data, and perform AI computing on the service data.

Optionally, the data obtaining request includes a third data obtaining request.

The first processor 1001 is configured to send metadata of the service data to the first AI apparatus 101 in response to the third data obtaining request. The metadata is used to indicate an address of the service data.

The first AI apparatus 101 is configured to: when the metadata indicates that the service data is located in the second storage device 11 in the plurality of storage devices, send a second data access request to the second storage device 11, where the second data access request includes the metadata; and receive the service data that is sent by the second storage device 11 in response to the second data access request.

Optionally, the second storage device 11 is configured to transmit the service data to the first storage device 10 through a second network 12. The second storage device 11 is further configured to transmit an AI parameter to the first storage device 10 through a first network 13. The AI parameter is used to perform AI computing on the service data.

The first network 13 may be referred to as an AI parameter network, and is used to transmit an AI parameter between the first storage device 10 and the second storage device 11. One or more network devices such as a router and a switch may be disposed in the first network 13. Specifically, the network device 13 may be separately connected to the first AI apparatus 101 and the second AI apparatus 111, and an AI parameter is transmitted between the first AI apparatus 101 and the second AI apparatus 111 through the network device. For example, the network device may be connected to a first network interface in the first AI apparatus 101 and a first network interface in the second AI apparatus 111.

The second network 12 may be referred to as a back-end storage network, and is used to transmit service data between the first storage device 10 and the second storage device 11. One or more network devices such as a router and a switch may be disposed in the second network 12. Specifically, the network device may be connected to the first storage apparatus 100 and the second storage apparatus 110, and service data is transmitted between the first storage apparatus 100 and the second storage apparatus 110 through the network device. For example, the network device may be connected to a second network interface in the first storage apparatus 100 and a second network interface in the second storage apparatus 110.

The first network 13 and the second network 12 are deployed, so that the AI parameter can be transmitted through the first network 13, and the service data can be transmitted through the second network 12. Therefore, for the storage system 1, a network resource used to forward an AI parameter can be separated from a network resource used to forward other data, so as to prevent original storage network resources of a storage device from being occupied during AI parameter transmission, thereby preventing network transmission performance of the storage device from being deteriorated when a network bandwidth of the storage device is occupied in an AI computing process. In addition, the first network 13 can be dedicated to forwarding AI-related service data. Therefore, based on the network, impact on networking of an existing service data center or a storage device cluster can be avoided.

Optionally, a third network 14 may be further deployed for the distributed storage system 1. The third network 14 may be referred to as a service network. The first storage device 10 may communicate with the second storage device 11 through the third network 14. The third network 14 may include one or more network devices. The network device may be separately connected to a service interface in the first storage apparatus 100 and a service interface in the second storage apparatus 110. It should be understood that, in this embodiment, the first storage device 10 and the second storage device 11 in the distributed storage system 1 are merely used as examples for description. A person skilled in the art may learn that the distributed storage system 1 may include more or fewer storage devices. For example, the distributed storage system 1 may include only the first storage device 10 and the second storage device 11. Alternatively, the distributed storage system 1 may include dozens or hundreds of storage devices or more storage devices. In this case, the distributed storage system 1 further includes other storage devices in addition to the first storage device 10 and the second storage device 11. A quantity of storage devices is not limited in this embodiment. Particularly, as a requirement on AI computing power increases, a scale of the storage system 1 in this embodiment may be accordingly enlarged. For example, the storage system 1 may include millions of storage devices, so that overall computing power of the system 1 is enhanced to a million level or higher.

In addition, the first storage device 10 may be generally any one of the plurality of storage devices in the distributed storage system 1, and the second storage device 11 may be generally any one of the plurality of storage devices in the distributed storage system 1 other than the first storage device 10. In this embodiment, the first storage device 10 and the second storage device 11 are merely used as examples for description.

In the distributed storage system provided in this embodiment, two AI apparatuses in different storage devices exchange an AI parameter with each other through the first network, and two storage apparatuses in the different storage devices exchange service data with each other through the second network, to collaboratively perform AI computing based on the AI parameter and the service data. Storage capabilities and AI computing power of a plurality of storage devices are converged, so that an overall storage capability and AI computing power of the system can be increased. The first network may be a PCIe high-speed interconnect network, a fibre channel (FC), a SCSI, the Ethernet, RDMA, a memory fabric, or the like. The second network may be a PCIe high-speed interconnect network, an FC, a SCSI, the Ethernet, RDMA, a memory fabric, or the like.

Optionally, the second storage device 110 is further configured to transmit other service data to the first storage device 10 through the first network 13. The second storage device 110 is further configured to transmit another AI parameter through the second network 12. The another AI parameter is used to perform AI computing on the other service data.

For example, when a quantity of resources of the second network is less than a specified storage network resource threshold, the other service data may be transmitted between the first storage apparatus 100 and the second storage apparatus 110 through the first network 13. Specifically, the first storage apparatus 100 includes the first processor and a first memory, and the second storage apparatus 110 includes the second processor and a second memory. The first AI apparatus 101 includes a first AI processor and a first AI memory. The first AI processor sends a network resource request of the first network to a second AI processor, and sends a memory RDMA access request to the second processor. The first AI apparatus 101 reads the other service data from the first memory, and sends the other service data to the second AI apparatus 111 through the first network 13. The second AI apparatus 111 writes the other service data into the second memory.

Optionally, when a quantity of resources of the first network is less than a specified AI network resource threshold, the another AI parameter is transmitted between the first AI apparatus 101 and the second AI apparatus 111 through the second network 12. Specifically, the first AI processor sends a network resource request of the second network to the second processor. The first AI processor is configured to: obtain the another AI parameter from the first AI memory, and transmit the another AI parameter to a second AI memory through the second network 12 through RDMA.

Optionally, the system 1 further includes a management apparatus. The management apparatus is a software module. Functionally, the management apparatus is configured to manage all the storage devices in the distributed storage system 1, for example, schedule the storage devices to process AI computing. The management apparatus may be an independent device, for example, may be a host, a server, a personal computer, or another device. Alternatively, the management apparatus may be located in any storage device. When the management apparatus is an independent device, the management apparatus may communicate with any storage device in the system through a network.

A specific example is used below to describe how the management apparatus schedules the storage devices. When receiving a first job request, the management apparatus determines distribution of a to-be-trained dataset based on the first job request. When determining that the service data in the dataset is distributed on the first storage device 10, the management apparatus sends a first computing request to the first AI apparatus 101 in the first storage device 10. The first AI apparatus 101 is configured to: obtain the service data from the first storage device 10 based on the first computing request, and perform AI computing on the service data to obtain a first computing result. This is a near-data AI computing manner, to be specific, an AI apparatus in a storage device in which the dataset is located is preferentially selected to perform AI computing on the dataset. This can avoid cross-network data transmission to some extent, and save network resources. It should be understood that, in some cases, a running status of the storage device in which the dataset is located may be poor, and consequently it is not appropriate for the storage device to receive an AI computing task. Therefore, in this embodiment, before sending the first computing request to the first AI apparatus 101 in the first storage device 10, the management apparatus is further configured to determine that a running status of the first storage device 10 meets a specified condition.

Therefore, when the running status of the first storage device 10 does not meet the specified condition, a storage device whose distance from the first storage device 10 is less than a specified distance threshold, for example, the second storage device 11, may be selected to perform AI computing.

In some embodiments, the to-be-trained dataset may further include other service data.

The management apparatus is further configured to: when determining that the other service data is distributed on the second storage device 11 in the plurality of storage device, further determine a running status of the second storage device 11; and when the running status of the second storage device 11 does not meet a specified condition, send a second computing request to the first storage device 10. A distance between the first storage device 10 and the second storage device 11 is less than a specified distance threshold.

The first AI apparatus 101 is further configured to: obtain the other service data from the second storage device 11 based on the second computing request, and perform AI computing on the other service data to obtain a second computing result.

In some possible embodiments, the storage system 1 may further include a host (not shown in FIG. 1). The host is configured to collaborate with the first storage device 10 and the second storage device 11 to perform AI computing. The host may be an AI server, or may be an application server. The AI server is configured to execute an AI computing task. For example, the AI server may perform model training or service data processing. In a running process of the AI server, the AI server may exchange a model parameter with the first storage device 10 and/or the second storage device 11. The application server may receive a model training instruction or a service data processing instruction from a terminal, and perform resource scheduling, AI algorithm storage, AI algorithm updating, or the like in an AI computing process. The host may provide AI computing power through a general-purpose processor such as a CPU, or may provide AI computing power through a processor such as a graphics processing unit (English: graphics processing unit, GPU for short), a neural processing unit (English: neural-network processing unit, NPU for short), a tensor processing unit (English: tensor processing unit, TPU for short), or a field-programmable gate array (English: field-programmable gate array, FPGA for short). The host may be a physical device, or may be a virtual device such as an elastic cloud server leased from a cloud platform. In the AI computing process, the first storage device 10 and the second storage device 11 may undertake a primary computing task, and the host undertakes a secondary computing task; or the host undertakes a primary computing task, and the first storage device 10 and the second storage device 11 undertake a secondary computing task.

In some possible embodiments, the second network 12 may include an internal network device and an external network device.

The internal network device may be disposed inside the first storage device 10 and/or the second storage device 11. The internal network device may be connected to components of the first storage device 10 and/or the second storage device 11 through the high-speed interconnect network. The internal network device may be a bus, which may be specifically a serial interface bus, for example, any one of a PCIE bus, an HCCS bus, the Ethernet, an IB, and an FC. The first storage device 10 and/or the second storage device 11 may back up stored data through the internal network device, to protect service data and an AI parameter.

The external network device may be disposed outside the first storage device 10 and the second storage device 11. The external network device is connected to the first storage device 10 and the second storage device 11 through a network. The external network device may be a switch, a router, or the like. The first storage device 10 and the second storage device 11 each may provide a data storage service for an application through the external network device, for example, a file storage service, an object storage service, or a block storage service. The external network device may be a switch, a router, or the like.

In some possible embodiments, an internal network device and an external network device may be disposed in the first network 13. The internal network device and the external network device in the first network are respectively similar to the internal network device and the external network device in the second network 12. Details are not described herein again.

In some possible embodiments, the internal network device and the external network device in the second network 12 and/or the first network 13 may be deployed together as a whole.

In some possible embodiments, the quantity of storage devices in the system 1 may be dynamically increased or reduced based on a requirement on AI computing power, to implement elastic capacity expansion or elastic capacity shrinking. Specifically, the storage system 1 may be considered as a resource pool, the storage device may be considered as a resource in the resource pool, and the resource can provide both AI computing power and a storage capability. If the storage system 1 has insufficient AI computing power, for example, if load of each AI apparatus has exceeded a load threshold, a storage device may be added to the storage system 1, and an existing storage device and the newly added storage device in the storage system 1 jointly provide AI computing power, to implement capacity expansion and relieve load of an AI apparatus in a single storage device. If the storage system 1 is idle, the quantity of storage devices in the storage system 1 may be reduced, to implement capacity shrinking.

A storage device provided in this application is described below by using an example.

Figure 2:
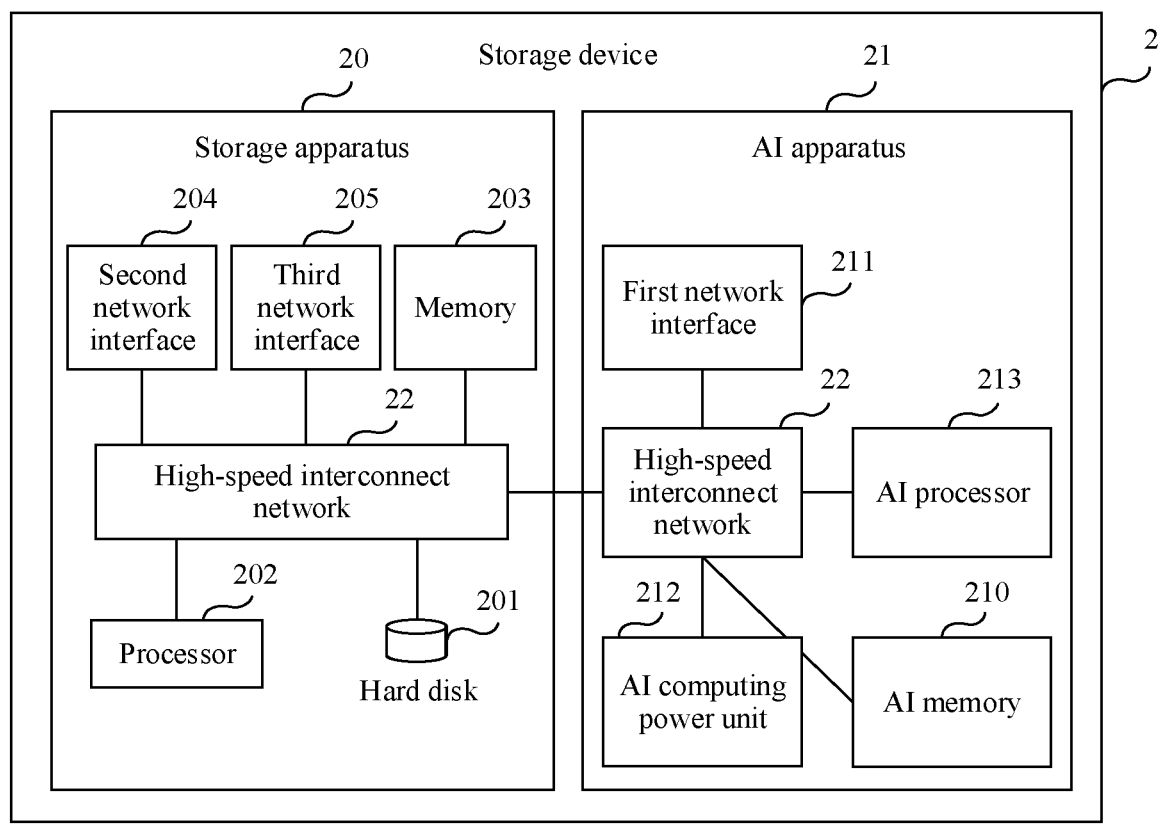
FIG. 2 is a schematic structural diagram of a storage device according to an embodiment of this application.

FIG. 2 is a schematic structural diagram of a storage device according to an embodiment of this application. A storage device 2 may be the first storage device 10 in the system 1 shown in FIG. 1, or may be the second storage device 11 in the system 1 shown in FIG. 1, or certainly may be another storage device not shown in FIG. 1.

As shown in FIG. 2, the storage device 2 includes a storage apparatus 20 and an AI apparatus 21.

The storage apparatus 20 includes a hard disk 201 and a processor 202.

The processor 202 is configured to: receive service data, and store the service data in the hard disk 201. The service data may be used as an input for AI computing. For example, the service data may be a sample set used for model training, or a dataset used for inference and prediction. For example, in a model training phase, the service data may include one or more of a sample image, a sample video, a sample speech, or a sample text. The sample image may be used for training to obtain an image recognition model, the sample video may be used for training to obtain a video recognition model or a target analysis model, the sample text may be used for training to obtain a semantic recognition model, or the like.

For another example, in a model application phase, the service data may be a to-be-recognized image, video, speech, or text, which may be used for image recognition, facial recognition, speech recognition, or text understanding. In some embodiments, the processor 202 may provide a computing resource, and the storage apparatus 20 may process the service data through the processor 202.

The hard disk 201 may provide storage space. The hard disk 201 is configured to store the service data. The hard disk 201 may be a smart disk. The smart disk has components such as a processor, a memory, and a DMA controller. Therefore, the smart disk can undertake more functions than a conventional hard disk, for example, can transmit data through DMA.

The AI apparatus 21 is configured to: send a data obtaining request to the processor 202 to obtain the service data, and perform AI computing on the service data. The AI apparatus is disposed inside the storage device 2. The AI apparatus 21 provides an AI computing capability for the storage device 2. By running the AI apparatus 21, AI computing methods in the following method embodiments may be performed. The AI apparatus 21 may be in a form of a chip or another physical component. For example, the AI apparatus 21 may be a training chip configured to construct a neural network model, or may be an inference chip configured to perform inference through a neural network model. The data obtaining request is used to request to obtain the service data stored in the hard disk 201.

The AI apparatus 21 communicates with the processor 202 through a high-speed interconnect network 22. The high-speed interconnect network 22 is used for data communication between the AI apparatus 21 and the processor 202. The high-speed interconnect network 22 may be any one of PCIe, a memory fabric, the high-speed Ethernet, an HCCS, an infiniband (infiniband, IB), and a fibre channel (fiber channel, FC). The high-speed interconnect network 22 may be in a form of a bus. In this case, the high-speed interconnect network 22 may also be referred to as a high-speed interconnect switch or a high-speed interconnect bus. For example, the storage device 2 may include a high-speed interconnect bus, and the AI apparatus 21 and the processor 202 may be connected to the high-speed interconnect bus, to access the high-speed interconnect network. In some possible embodiments, the AI apparatus 21 may include a high-speed interconnect network interface, and the processor 202 may include a high-speed interconnect network interface. The AI apparatus 21 is connected to the high-speed interconnect bus through the high-speed interconnect network interface of the AI apparatus 21, and the processor 202 is connected to the high-speed interconnect bus through the high-speed interconnect network interface of the processor 202. The high-speed interconnect network interface may be a serial bus interface. Specifically, the high-speed interconnect network interface may be any one of a PCIE interface, an HCCS interface, an Ethernet interface, an IB interface, and an FC interface. If there are different types of high-speed interconnect network interfaces, the service data may be transmitted between the AI apparatus 21 and the processor 202 at different speeds. Experiments show that a service data loading rate can be increased by 2 to 10 times based on different types of interfaces. In addition, the storage device 2 may supply electric energy to the AI apparatus 21 through the high-speed interconnect network interface of the AI apparatus 21. It should be understood that the high-speed interconnect bus is merely an example of the high-speed interconnect network 22. The high-speed interconnect network 22 may not be the high-speed interconnect bus, but another bus having a memory pass-through function. A specific type of the high-speed interconnect network 22 is not limited in this embodiment.

In the storage device, there may be a plurality of components that communicate with each other through the high-speed interconnect network 22. For example, a memory 203 and an AI memory 210 in the storage device may communicate with each other through the high-speed interconnect network 22. For another example, the hard disk 201 and the AI memory 210 may communicate with each other through the high-speed interconnect network 22. For another example, the hard disk 201 and the memory 203 may communicate with each other through the high-speed interconnect network 22. For another example, the processor 202 and an AI processor 213 in the storage device may communicate with each other through the high-speed interconnect network 22. In addition, if there are a plurality of memories 203, different memories may communicate with each other through the high-speed interconnect network 22. If there are a plurality of AI memories 210, different AI memories may communicate with each other through the high-speed interconnect network 22. Certainly, the foregoing components that communicate with each other are merely used as examples for description. All different components that are connected through the high-speed interconnect network 22 may communicate with each other through the high-speed interconnect network 22. An execution body of performing communication through the high-speed interconnect network 22 is not limited in this embodiment.

There may be a plurality of manners of performing communication through the high-speed interconnect network 22. The following two manners are used as examples for description.

Manner 1: Communication is performed through DMA. For the DMA-based communication, refer to the following embodiment in FIG. 9 and the foregoing description of the DMA technical principle. Details are not described herein again.

Manner 2: Communication is performed through a memory fabric (memory fabric).

Figure 3:
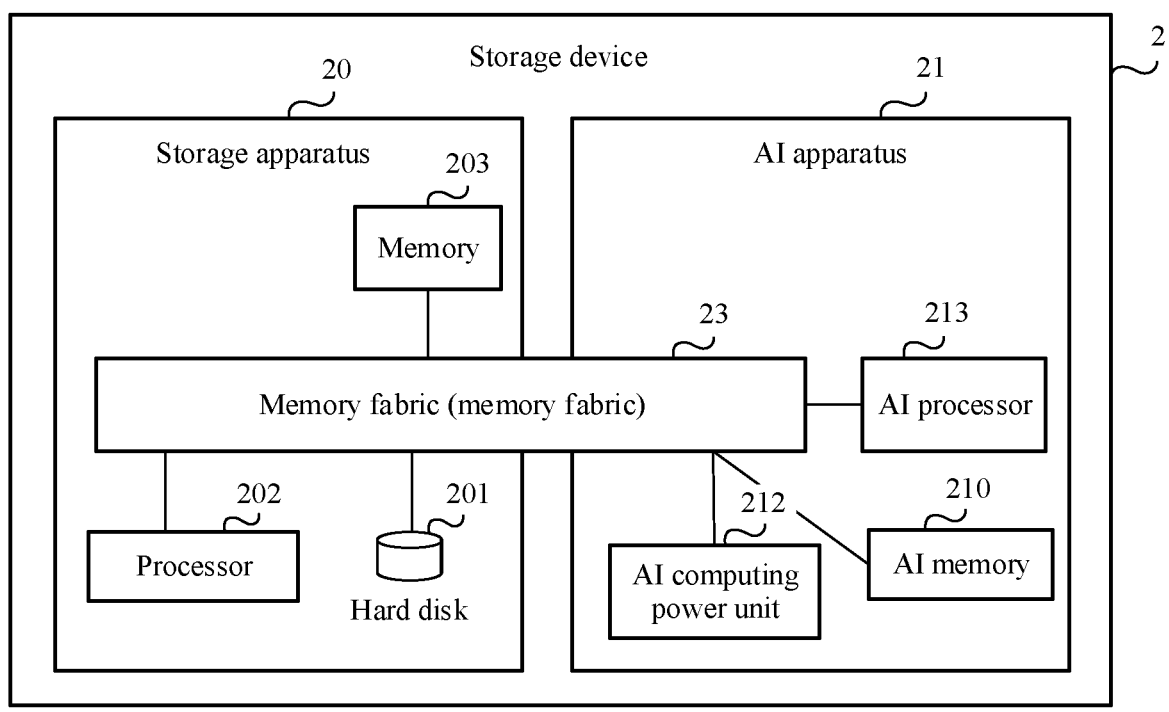
FIG. 3 is a schematic structural diagram of a storage device according to an embodiment of this application.

Referring to FIG. 3, the storage device may include a memory fabric 23. The memory fabric 23 may integrate a function of the high-speed interconnect network 22 and a function of a first network interface 211. The AI memory 210 may be connected to the memory 203 through the memory fabric 23, and the AI memory 210 may communicate with the memory 203 through the memory fabric 23. In addition, the memory fabric 23 may also implement communication between memories across devices. For example, the AI memory 210 may also be connected to an AI memory in another storage device through the memory fabric 23, and the AI memory 210 may also communicate with the AI memory in the another storage device through the memory fabric 23. For another example, the memory 203 may also be connected to a memory in another storage device through the memory fabric 23, and the memory 203 may also communicate with the memory in the another storage device through the memory fabric 23. The AI memory 210 may also be connected to a memory in another storage device through the memory fabric 23, and the AI memory 210 may also communicate with the memory in the another storage device through the memory fabric 23. For another example, the memory 203 may also be connected to an AI memory in another storage device through the memory fabric 23, and the memory 203 may also communicate with the AI memory in the another storage device through the memory fabric 23.

In addition, in some embodiments, the memory fabric 23 may further integrate a function of a second network interface 204, or integrate functions of other components in the storage device that are configured to perform network communication. In this case, the components other than the memory in the storage device may communicate with each other through the memory fabric 23.

For the manner of communication performed through the memory fabric 23, in some possible embodiments, memories that are connected to each other through the memory fabric 23 may constitute a memory resource pool, and corresponding addresses are assigned to memory space of the memories in the memory resource pool in a unified manner, so that the memory space of all the memories in the memory resource pool belongs to a same address range. After service data or an AI parameter is written into any memory space of any memory in the memory resource pool, metadata of the service data or the AI parameter may be obtained based on an address of the memory space, and then corresponding memory space may be obtained through addressing through the memory fabric 23 based on the metadata, to read the service data or the AI parameter from the memory space. An addressing object may be local memory space of the storage device, or may be memory space of a remote storage device.

Figure 4:
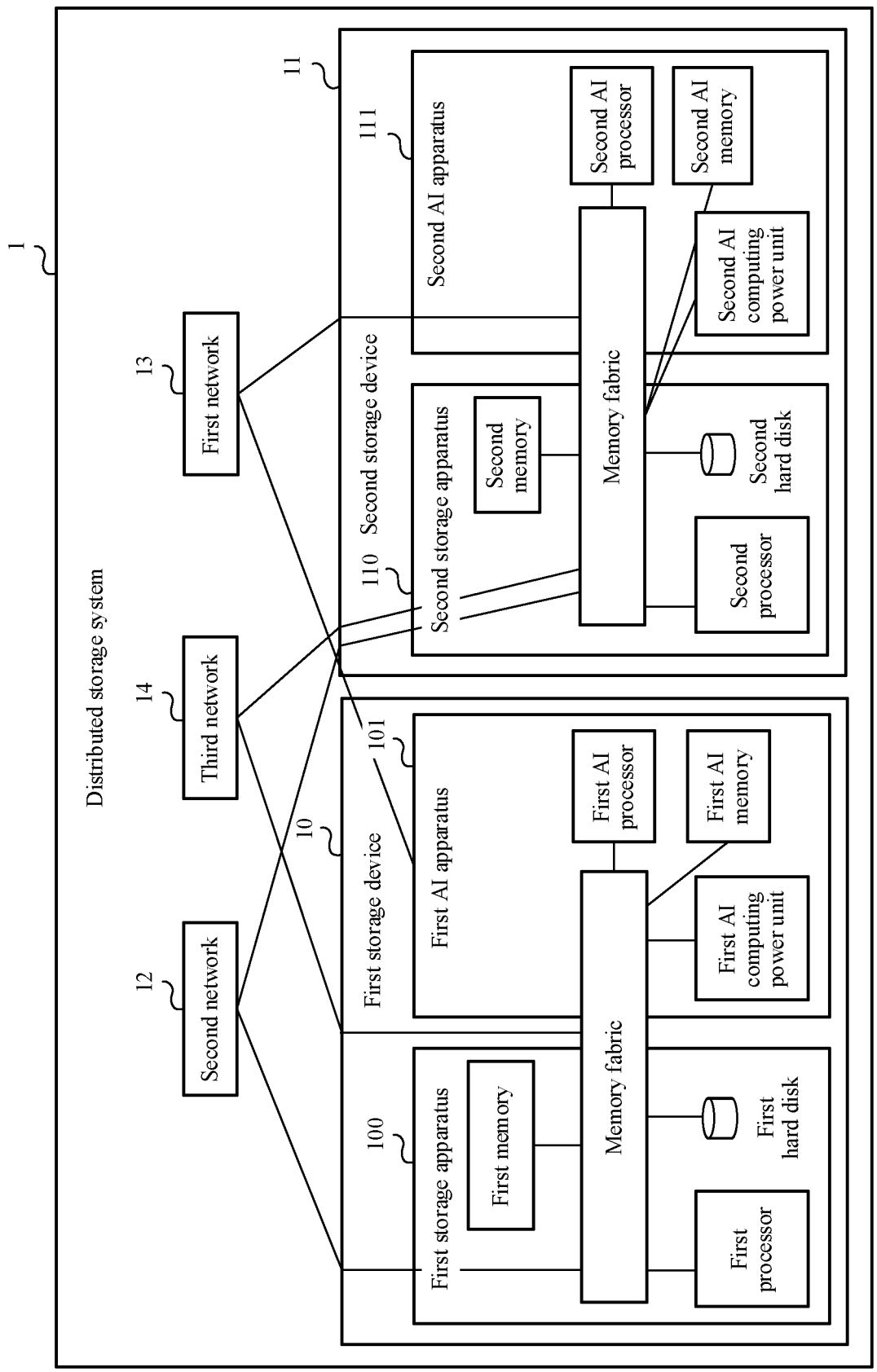
FIG. 4 is an architectural diagram of a distributed storage system according to an embodiment of this application.

For example, referring to FIG. 4, a first memory, a second memory, a first AI memory, and a second AI memory may communicate with each other through a memory fabric. The first memory, the second memory, the first AI memory, and the second AI memory may constitute a memory resource pool of the system 1. For example, when a first AI processor or a first processor needs to obtain an AI parameter, the first AI processor or the first processor determines, based on metadata of the AI parameter, an address of memory space in which the AI parameter is located in the memory resource pool, and obtains the memory space through addressing through the memory fabric.

Unified scheduling of a memory and an AI memory in one storage device, unified scheduling of memories in different storage devices, and unified scheduling of AI memories in different storage devices can be implemented through the memory fabric. This improves memory resource scheduling and use efficiency of a storage system.

That the AI apparatus 21 communicates with the storage apparatus 20 through the high-speed interconnect network 22 may bring at least the following effects: In an AI computing process, when the AI apparatus 21 needs to load service data required for AI computing, the service data can be sent from the storage apparatus 20 to the AI apparatus 21 through the high-speed interconnect network 22, and loaded to the AI memory 210 in the AI apparatus 21. When the AI apparatus 21 needs to store a computing result of AI computing, the computing result can be sent from the AI apparatus 21 to the hard disk 201 in the storage apparatus 20 through the high-speed interconnect network 22, so that the computing result can be stored in the hard disk 201. In this way, for a loading path and a storage path, the service data is transmitted inside the storage device 2 through the high-speed interconnect network 22, instead of being transmitted outside the storage device 2 through forwarding by one or more network links and one or more switches. Therefore, a path for transmitting the service data can be greatly shortened, so that the AI apparatus 21 can obtain the service data nearby that is stored in the storage apparatus 20, and store the computing result in the storage apparatus 20 nearby. In addition, the service data is transmitted based on the high-speed interconnect network 22 instead of a common remote network according to a TCP/IP protocol. A transmission speed of the high-speed interconnect network 22 is usually far faster than a transmission speed of the remote network, and a cumbersome procedure of establishing a network communication connection such as three-way handshake required for network communication can be avoided. Therefore, the AI apparatus 21 can quickly load the service data required for AI computing from the storage apparatus 20, and quickly store the computing result of AI computing in the hard disk 201 in the storage apparatus 20. Experiments show that a delay can be shortened by more than 30% during each time of service data loading.

It should be understood that the storage device 2 may include one or more AI apparatuses 21. A quantity of AI apparatuses 21 may be set based on a structure, space, or a requirement of the storage device 2. The quantity of AI apparatuses 21 included in the storage device 2 is not limited in this embodiment.

If the storage device 2 includes a plurality of AI apparatuses 21, the plurality of AI apparatuses 21 may communicate with each other through the high-speed interconnect network 22, for example, exchange an AI parameter through the high-speed interconnect network 22. Shapes and structures of different AI apparatuses 21 in the storage device 2 may be the same, or may be slightly different based on an actual requirement.

The storage device 2 may be a distributed controlled storage device 2, or may be a centralized controlled storage device 2. A form of the storage device 2 may be but is not limited to a storage server, a storage array, or another dedicated storage device 2. The storage device 2 may be but is not limited to running in a cloud environment, an edge environment, or a terminal environment.

The storage apparatus and the AI apparatus are disposed in the storage device provided in this embodiment, so that the storage device can provide an AI computing capability through the AI apparatus and provide a service data storage capability through the storage apparatus, thereby implementing convergence of storage and AI computing power. The AI parameter and the service data are transmitted inside the storage device through the high-speed interconnect network without a need of being forwarded through an external network. Therefore, a path for transmitting the service data and the AI parameter is greatly shortened, and the service data can be loaded nearby, thereby accelerating loading. In addition, the AI apparatus can borrow a computing resource of the storage apparatus to process the service data, so that computing power of the AI apparatus is increased through computing power collaboration, thereby accelerating AI computing.

In the foregoing embodiment, the AI apparatus 21 may send a data obtaining request to the processor 202 to obtain the service data from the hard disk 201, to perform AI computing based on the service data. In this manner, the AI apparatus 21 can obtain the service data from the storage device. This avoids communication overheads caused by requesting the service data from a remote storage device through a network, and shortens a delay of obtaining the service data.

The AI apparatus 21 may specifically obtain the service data in a plurality of implementations. Correspondingly, there may be a plurality of cases of the data obtaining request sent by the AI apparatus, and data obtaining requests in different cases may be slightly different. The following uses Manner 1, Manner 2, and Manner 3 as examples for description. For distinguishing description, a data obtaining request in Manner 1 is referred to as a first data obtaining request, a data obtaining request in Manner 2 is referred to as a second data obtaining request, and a data obtaining request in Manner 3 is referred to as a third data obtaining request.

Manner 1: The storage device may transmit the service data stored in the hard disk 201 to the AI apparatus 21 through the processor 202. Specifically, the AI apparatus 21 is further configured to send the first data obtaining request to the processor 202. The first data obtaining request is used to request to obtain the service data. The processor 202 is further configured to: receive the first data obtaining request; and in response to the first data obtaining request, obtain the service data from the hard disk 201, and send the service data to the AI apparatus 21.

Manner 2: The storage device may transmit the service data stored in the hard disk 201 to the AI apparatus 21 through DMA. Specifically, the AI apparatus 21 is further configured to send the second data obtaining request to the processor 202. The second data obtaining request is used to request to obtain the service data. The processor 202 is further configured to: receive the second data obtaining request, and send metadata of the service data to the AI apparatus 21 in response to the second data obtaining request. The AI apparatus 21 may determine, based on the metadata, whether the service data is located in the storage device. When the metadata indicates that the service data is located in the storage device, the AI apparatus 21 sends a first data access request to the hard disk 201. The first data access request includes the metadata. For example, the first data access request may be a DMA request. The hard disk 201 is configured to: obtain the service data based on the metadata, and write the service data into the AI apparatus 21 through DMA. The metadata is used to indicate an address of the service data. In Manner 2, the service data is located in the storage device.

The hard disk 201 may communicate with the AI apparatus 21. Therefore, the foregoing procedure of interaction based on a second data access request can be implemented. In an example embodiment, the hard disk 201 may include a high-speed interconnect network interface. The hard disk 201 may be connected to the AI apparatus 21 through the high-speed interconnect network interface. The AI apparatus 21 may perform read/write in the hard disk 201 through a controller or a driver corresponding to the high-speed interconnect network interface. For example, the high-speed interconnect network interface of the hard disk 201 may be a serial attached SCSI (Serial Attached SCSI, SAS) interface. The AI apparatus 21 may communicate with the SAS interface through an SAS controller, to perform read/write in the hard disk 201. Certainly, the high-speed interconnect network interface of the hard disk 201 may alternatively be an interface other than the SAS interface, for example, an advanced technology attachment (advanced technology attachment, ATA) interface, an integrated drive electronics (integrated drive electronics, IDE) interface, an FC, or a small computer system interface (small computer system interface, SCSI).

Manner 3: The storage device may transmit service data stored in another storage device to the AI apparatus 21 through RDMA. Specifically, the AI apparatus 21 is further configured to send the third data obtaining request to the processor 202. The third data obtaining request is used to request to obtain the service data. The processor 202 is further configured to: receive the third data obtaining request, and send metadata of the service data to the AI apparatus 21 in response to the third data obtaining request. The AI apparatus 21 may determine, based on the metadata of the service data, whether the service data is located in the another storage device. When the metadata indicates that the service data is located in the another storage device, the AI apparatus 21 sends a second data access request to the another storage device. The second data access request includes the metadata. For example, the second data access request may be an RDMA request. The another storage device may obtain the service data in response to the second data access request based on the metadata, and write the service data into the AI apparatus 21 through RDMA. The metadata is used to indicate an address of the service data. In Manner 3, the service data is located in the another storage device.

The AI apparatus 21 may include the AI memory 210. The AI memory 210 is configured to cache an AI parameter and/or service data that is just used or cyclically used by an AI computing power unit 212 or the AI processor 213. If the AI computing power unit 212 or the AI processor 213 needs to use the service data again, the AI computing power unit 212 or the AI processor 213 may directly invoke the service data from the AI memory 210, to avoid repeated access, thereby reducing a waiting time of the AI computing power unit 212 or the AI processor 213, and improving computing efficiency. In an AI computing process, the AI memory 210 may cache input service data, an intermediate result, or a final result of AI computing. For example, the AI memory 210 may be a high-speed cache. The AI memory 210 may include a high-speed random access memory, or may include a nonvolatile memory, for example, at least one magnetic disk storage device, a flash memory device, or a universal flash storage (universal flash storage, UFS).

The AI apparatus 21 is configured to send a first data access request to the hard disk 201. The first data access request includes the metadata. The metadata (metadata) is used to indicate an address of the service data. For example, the metadata may include a track identifier and a sector identifier. The track identifier is used to identify a track on which the service data is located in the hard disk. For example, the track identifier may be a track ID. The sector identifier is used to identify a sector in which the service data is located in the hard disk. For example, the sector identifier may be a sector ID. The hard disk may find a corresponding track based on the track identifier, find a corresponding sector on the track based on the sector identifier, and then read data in the sector, to obtain the service data requested by the AI apparatus 21 through the first data access request. It should be understood that the metadata may indicate the address in a plurality of manners. For example, the metadata may indicate the address of the service data by indicating a start address and a length of the service data. For another example, the metadata may indicate the address of the service data by indicating a start address and an end address of the service data. This is not limited in this embodiment.

The hard disk 201 is configured to: obtain the service data based on the metadata, and write the service data into the AI memory 210 through DMA.

Optionally, the storage device 2 communicates with another storage device. For example, the storage device 2 may be the first storage device 10 in the system 1 shown in FIG. 1, the another storage device may be the second storage device 11 in the system 1 shown in FIG. 1, and the first storage device 10 may communicate with the second storage device 11.

In a possible implementation, the AI apparatus 21 may include the first network interface 211. The first network interface 211 may be in a form of a network interface card. The first network interface 211 may provide a network communication capability. The AI apparatus 21 can communicate with another storage device 2 through the first network interface 211, for example, exchange an AI parameter with the another storage device 2 through the first network interface 211. Optionally, the first network interface 211 may support a remote direct memory access (remote direct memory access, RDMA for short) function, and the first network interface 211 may be a remote direct memory access network interface controller (RDMA network interface controller, RNIC for short).

In an example application scenario, in a training process or in an inference process, if the AI apparatus 21 obtains an AI parameter through computing, the AI apparatus 21 may send the AI parameter to the another storage device 2 through the first network interface 211, so that the another storage device 2 receives the AI parameter. Similarly, if the another storage device 2 obtains an AI parameter through computing, the another storage device 2 may send the AI parameter to the first network interface 211, and the first network interface 211 may receive the AI parameter.

The AI apparatus 21 is further configured to: when it is determined, based on the metadata, that the service data is located in the another storage device 2, send a second data access request to the another storage device 2, so that the service data is written into the AI memory 210 through RDMA. The second data access request includes the metadata.

Optionally, the AI apparatus 21 further includes the AI computing power unit 212. The AI computing power unit 212 is configured to provide AI computing power. In an example embodiment, an AI algorithm may be run on the AI computing power unit 212, to perform model training or inference and prediction. The AI algorithm may be a neural network model. Essentially, the AI algorithm includes matrix or vector multiplication and addition, and may further include a division operation and an exponential operation. The AI computing power unit 212 may include one or more graphics processing units (graphics processing unit, GPU), a neural processing unit (neural-network processing unit, NPU), a tensor processing unit (tensor processing unit, TPU), a field-programmable gate array (field-programmable gate array, FPGA), an application-specific integrated circuit (application specific integrated circuit, ASIC), a brain-like chip, a reconfigurable general-purpose AI chip, a CPU, a programmable logic device (programmable logic device, PLD), a controller, a state machine, gate logic, a discrete hardware component, or any combination of other circuits that can provide AI computing power. The AI computing power unit 212 may include one or more processing cores.

The AI computing power unit 212 is specifically configured to: obtain the service data from the AI memory 210, and perform AI computing.

Optionally, the AI apparatus 21 includes the AI processor 213. The AI processor 213 may be connected to the AI memory 210 through the high-speed interconnect network 22. The AI processor 213 may be a CPU. The AI processor 213 may be configured to perform management and resource scheduling. The AI processor 213 may run an operating system or an application program. The AI processor 213 may include one or more processing cores.

Optionally, the storage apparatus 20 includes the processor 202 and the memory 203. The processor 202 may be connected to the memory 203 through the high-speed interconnect network 22. The processor 202 may be a central processing unit (central processing unit, CPU) in the storage apparatus 20. The processor 202 may be implemented in at least one hardware form of digital signal processor (digital signal processing, DSP), an FPGA, and a programmable logic array (programmable logic array, PLA).

Figure 5:
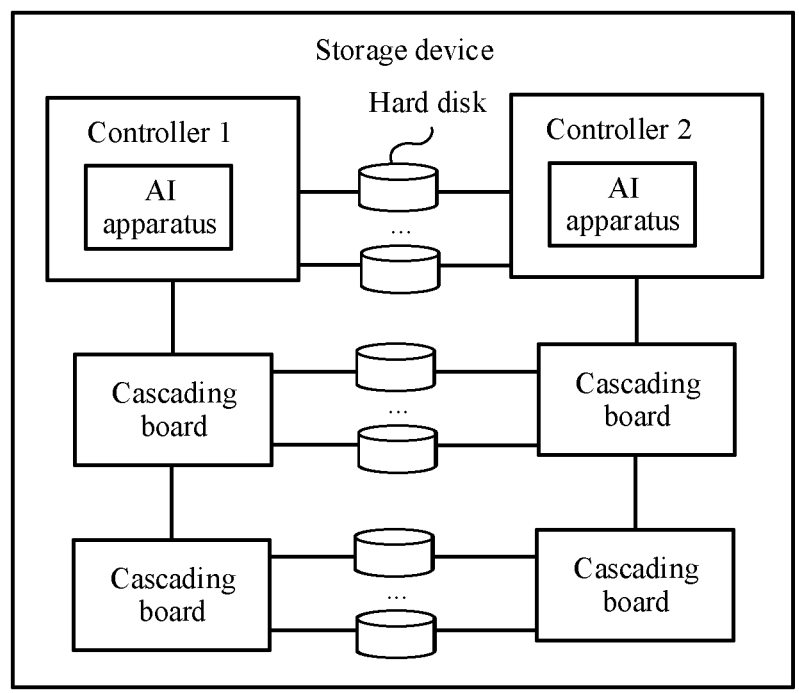
FIG. 5 is a schematic structural diagram of a storage device according to an embodiment of this application.
Figure 6:
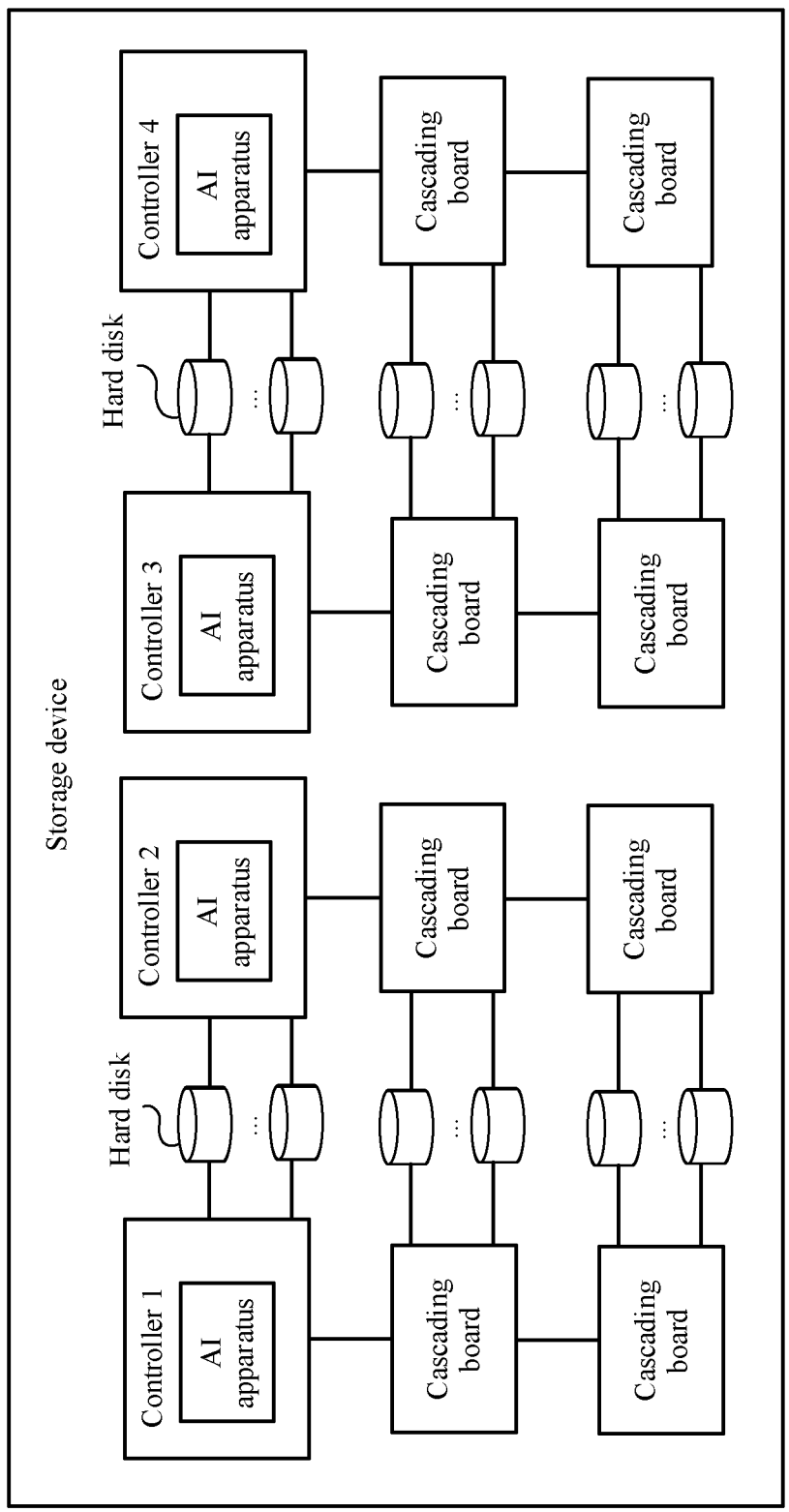
FIG. 6 is a schematic structural diagram of a storage device according to an embodiment of this application.

In some possible embodiments, the storage device may be a centralized controlled storage device. Specifically, the storage device may include one or more controllers, and may control the hard disk through the controller. In addition, the storage device may further include one or more cascading boards. The cascading board may be configured to cascade different hard disks in the storage device. The cascading board may be connected to the hard disk and the controller. For example, referring to FIG. 5, the storage device may be of a dual-controller architecture. The dual-controller architecture means that there are two controllers in the storage device. For example, in FIG. 5, the system 1 may include two controllers: a controller 1 and a controller 2. For another example, referring to FIG. 6, the storage device may be of a four-controller architecture. The four-controller architecture means that there are four controllers in the storage device. For example, in FIG. 6, the system 1 may include four controllers: a controller 1, a controller 2, a controller 3, and a controller 4.

If the storage device is a centralized controlled storage device, an AI apparatus may be disposed inside the controller. In this case, the controller may further provide AI computing power in addition to implementing an original function of controlling the hard disk. If the storage device includes a plurality of controllers, an AI apparatus may be disposed in each controller; or an AI apparatus may be disposed in some controllers, and no AI apparatus is disposed in the other controllers. This is not limited in this embodiment.

The memory 203 is configured to cache service data. Optionally, with a function of supporting pass-through between the AI memory 210 and the memory 203, the memory 203 may also be configured to cache an AI parameter. The memory 203 is configured to cache the service data and/or the AI parameter. When the processor 202, the AI computing power unit 212, or the AI processor 213 needs to use the service data and/or the AI parameter, the processor 202, the AI computing power unit 212, or the AI processor 213 may directly invoke the service data and/or the AI parameter from the memory 203, to avoid repeated access, thereby reducing a waiting time of the processor 202, the AI computing power unit 212, or the AI processor 213, and improving computing efficiency. For example, the memory 203 may be a high-speed cache. The memory 203 may include a high-speed random access memory, or may include a nonvolatile memory, for example, at least one magnetic disk storage device, a flash memory device, or a universal flash storage (universal flash storage, UFS).

The AI apparatus 21 includes the AI processor 213. The AI processor 213 may be connected to the AI memory 210 through the high-speed interconnect network 22. The AI processor 213 may be a CPU, and the AI processor 213 may be configured to perform management and resource scheduling. In an example embodiment, the AI processor 213 may run an operating system or an application program.

The AI processor 213 is disposed in the AI apparatus 21, so that an AI computing task and a non-AI computing task can be allocated to different processors for execution. The AI computing power unit 212 executes the AI computing task, and the AI processor 213 executes the non-AI computing task, to implement computing task load sharing, thereby prevent computing power from being occupied when the AI computing power unit 213 executes the non-AI computing task. In some embodiments, the storage device may further use the AI processor 201 to share computing tasks of the processor 202. For example, the processor 202 may send a task of obtaining the service data from the hard disk to the AI processor 201, and the AI processor 201 may execute the task of obtaining the service data from the hard disk, and send the obtained service data to the AI processor 201. In addition, performance advantages of different processors can be used. For example, due to an advantage of a CPU in performing logic control, the CPU is used as the AI processor 213 to perform resource scheduling and management. Due to an advantage of a GPU or an NPU in performing a floating-point operation and parallel computing, the GPU or the NPU is used as the AI computing power unit 212 to perform model training or other AI computing, to improve overall AI computing efficiency and help AI acceleration. In addition, this can prevent an AI computing process from being interfered with by a resource scheduling management process, improve overall AI computing efficiency, and help AI acceleration.

Optionally, the processor 202 is further configured to obtain a segment of memory space from the memory 203 through division and reserve the segment of memory space for the AI apparatus 21.

Optionally, the AI processor 213 is configured to: when an available capacity of the AI memory 210 reaches a preset threshold, send a memory application request to the processor 202. The processor 202 is configured to obtain a segment of memory space from the memory 203 through division based on the memory application request and reserve the segment of memory space for the AI apparatus 21.

Optionally, the available capacity of the AI memory 210 is determined by a specified batchsize.

Optionally, the AI processor 213 is configured to: divide a computing task into at least two subtasks, and send a first subtask in the at least two subtasks to the processor 202. The processor 202 is further configured to: execute the first subtask, and send a computing result to the AI processor 213. This optional manner may be applied to a plurality of cases. For example, when it is determined that computing power of the AI processor 213 is insufficient, the AI processor may execute the optional manner.

Optionally, the storage apparatus 20 may include the second network interface 204. The second network interface 204 is configured to perform network communication, the second network interface 204 may be a network interface card. The second network interface 204 may be connected to the AI apparatus 21, the processor 202, and the memory 203 through the high-speed interconnect network 22.

Optionally, the storage apparatus 20 may include a service interface 205.

In some possible embodiments, the storage apparatus 20 may be configured to: load the operating system to the AI apparatus 21, and start the AI apparatus 21 through the operating system. Specifically, the storage apparatus 20 may store an image file of the operating system. If the storage apparatus 20 needs to start the AI apparatus 21, the storage apparatus 20 may send the image file of the operating system to the AI apparatus 21 through the high-speed interconnect network 22, and load the image file of the operating system to the AI memory 210 in the AI apparatus 21. The operating system runs based on the image file of the operating system, to start the AI apparatus 21. The operating system may be LINUX™, UNIX™, WINDOWS™, or the like.

The storage apparatus 20 loads the operating system to the AI apparatus 21, and the operating system may not need to be installed in the AI apparatus 21, so as to prevent the operating system from occupying storage space of the AI apparatus 21, thereby ensuring a storage capacity of the AI apparatus 21. Particularly, if the storage apparatus 20 includes a plurality of AI apparatuses 21, operating systems of the plurality of AI apparatuses 21 are usually the same. Therefore, the storage apparatus 20 may load the same operating system to the AI apparatuses 21 in batches, to start the AI apparatuses 21 in batches. In this way, a same operating system can be prevented from occupying storage space of all the AI apparatuses 21 because the same operating system is installed on all the AI apparatuses 21, thereby saving storage space of all the AI apparatuses 21, and improving storage efficiency. In addition, a batch startup manner can improve startup efficiency of the plurality of AI apparatuses 21.

Optionally, the AI apparatus 21 may further include a nonvolatile storage medium. All or some of steps of the following method embodiments may be implemented in a form of a computer software product. The computer software product may be stored in the nonvolatile storage medium in the AI apparatus 21 or the AI memory 210 described above. The computer software product includes one or more instructions for enabling the AI apparatus 21 to perform all or some of the steps.

Optionally, the AI apparatus 21 and the storage apparatus 20 may be integrated together and sold or used as a set of products. The AI apparatus 21 and the storage apparatus 20 are not separated from each other. In some other possible embodiments, the AI apparatus 21 may alternatively be sold as an independent product and used together with the storage apparatus 20. For example, the AI apparatus 21 may be inserted into a high-speed interconnect bus of the storage device 2, or removed from a high-speed interconnect bus of the storage device 2, to implement contact with or separation from the storage apparatus 20.

It should be understood that the storage device 2 shown in FIG. 2 may include more or fewer components. For example, there may be one component, or there may be dozens or hundreds of components or more components. For example, the AI apparatus 21 may include a plurality of AI computing power units 212. Quantities of components in the storage device 2 are not limited in this embodiment.

It should be understood that the structure shown in this embodiment does not constitute a specific limitation on the storage device 2. In some other embodiments of this application, the storage device 2 may include more or fewer components than those shown in FIG. 2, or combine two or more components in FIG. 2, or split one component in FIG. 2 into two or more nodes, or arrange two or more components in FIG. 2 at different locations.

The distributed storage system and the storage device provided in the embodiments of this application are described above, and method procedures applied to the distributed storage system and the storage device are described below by using an example.

Figure 7:
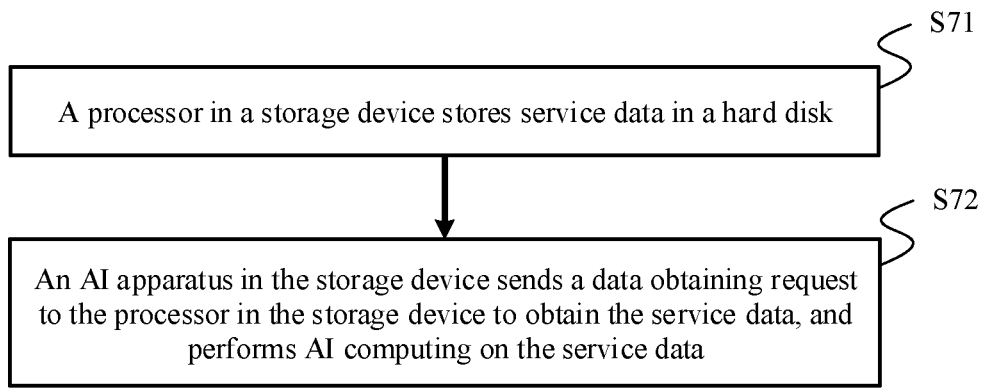
FIG. 7 is a flowchart of a data processing method according to an embodiment of this application.

FIG. 7 is a flowchart of a data processing method according to an embodiment of this application. The method may be applied to a storage device. The storage device may be any storage device shown in FIG. 1 or FIG. 2. The method includes the following steps.

S71: A processor in the storage device stores service data in a hard disk.

For example, a client may send the service data to the storage device, and the storage device may receive the service data from the client and write the service data into the hard disk, to store the service data in the hard disk.

S72: An AI apparatus in the storage device sends a data obtaining request to the processor in the storage device to obtain the service data, and performs AI computing on the service data.

Optionally, a computing resource of the processor and a computing resource of the AI apparatus in the storage device may constitute a resource pool. The storage device may schedule a resource in the resource pool to process AI computing. Overall AI computing power of the storage device can be increased through collaboration of computing power of the processor and computing power of the AI apparatus, thereby accelerating AI computing.

The AI computing process may be but is not limited to one or more of the following cases (1) and (2).

(1) Model Training

Specifically, the storage device may perform model training on a sample set through the computing resource of the processor and the computing resource of the AI apparatus in the storage device, to obtain an AI model. For example, the AI model may be a neural network model. For example, an image recognition model may be obtained through sample image training, and the image recognition model may be but is not limited to a convolutional neural network (convolutional neural networks, CNN), or certainly may be another CNN-based neural network such as a region CNN (region-CNN, R-CNN), a fast R-CNN (fast R-CNN), or a faster R-CNN (faster R-CNN), or a single shot multibox detector (single shot multibox detector, SSD). For another example, the AI apparatus may obtain a semantic recognition model through sample text training, and the semantic recognition model may be but is not limited to a recurrent neural network (recurrent neural networks, RNN). For another example, the AI apparatus may obtain a speech recognition model through sample speech training.

(2) Inference and Prediction

Specifically, the storage device may input to-be-identified service data into a trained AI model, and perform service data inference through the AI model, the computing resource of the processor, and the computing resource of the AI apparatus, to obtain an identification result of the service data. For example, a to-be-recognized image may be input into the image recognition model, and an image recognition result is output. The image recognition result may be but is not limited to one or more of an image category, an image feature, or a location of an object in the image. The image category may indicate a specific object included in the image. For example, in a facial recognition scenario, the image recognition model is a facial recognition model, and the image category may be a face category. In a scene recognition scenario, the image recognition model is a scene recognition model, and the image category may be a scene category, for example, a ceiling, a lawn, or the ground. In a character recognition scenario, the image recognition model is a character recognition model, and the image category may be a character category. The image feature may be but is not limited to a one-dimensional feature value, a two-dimensional feature map, a three-dimensional feature cube, or a higher-dimensional tensor. The location of the object in the image may be represented by coordinates of a bounding box (bounding box) in which the object is located. For another example, a to-be-recognized text may be input into the semantic recognition model, and a semantic recognition result is output. For another example, a to-be-recognized speech may be input into the speech recognition model, and a speech recognition result is output.

The processor and the AI apparatus are disposed in the storage device provided in this embodiment, so that the storage device can provide an AI computing capability through the AI apparatus and provide a service data storage capability through the processor, thereby implementing convergence of storage and AI computing power. An AI parameter and the service data are transmitted inside the storage device through a high-speed interconnect network without a need of being forwarded through an external network. Therefore, a path for transmitting the service data and the AI parameter is greatly shortened, and the service data can be loaded nearby, thereby accelerating loading. In addition, the AI apparatus can borrow a computing resource of the processor to process the service data, so that computing power of the AI apparatus is increased, thereby accelerating AI computing.

Figure 10:
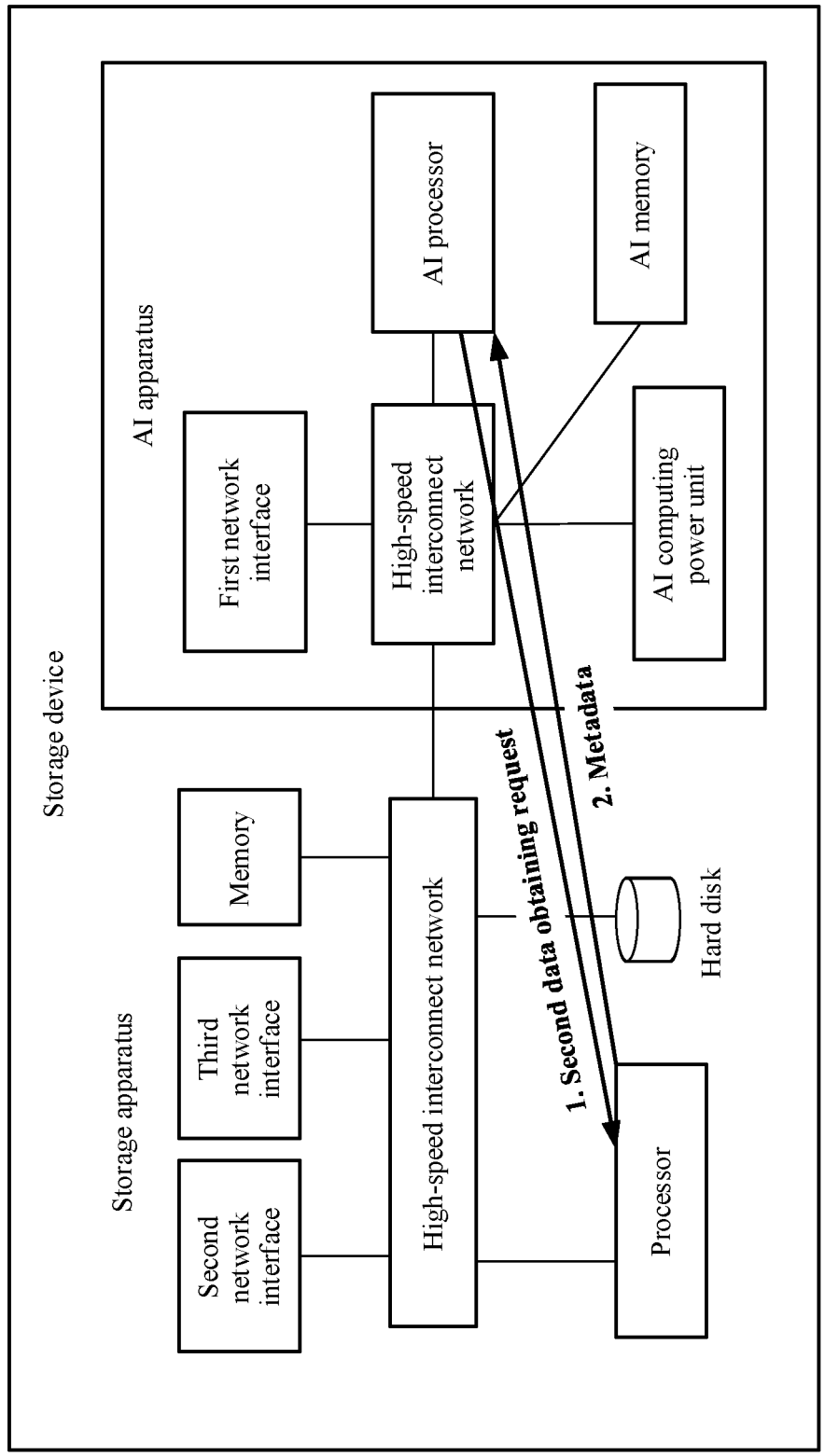
FIG. 10 is a schematic diagram of a data transmission procedure according to an embodiment of this application.

In the embodiment in FIG. 7, the AI apparatus may specifically obtain the service data in a plurality of implementations. An embodiment in FIG. 8, an embodiment in FIG. 9, and an embodiment in FIG. 10 are used as examples for description below.

In some embodiments, the AI apparatus can obtain the service data from the storage device nearby. An implementation of obtaining the service data nearby is described below by using the embodiment in FIG. 8 and the embodiment in FIG. 9 as examples.

Figure 8:
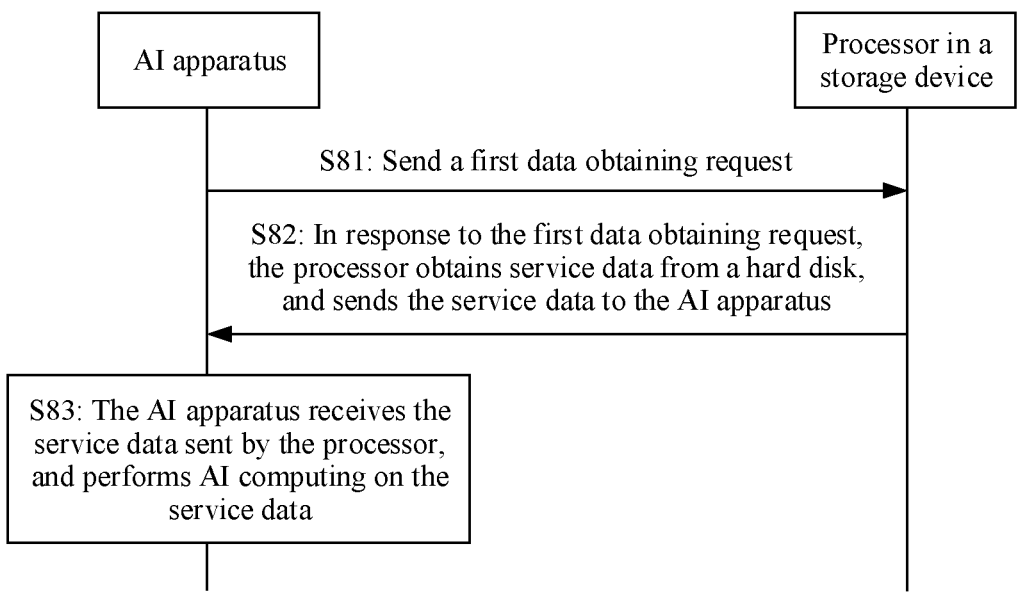
FIG. 8 is a flowchart of a data processing method according to an embodiment of this application.

For example, FIG. 8 is a flowchart of a data processing method according to an embodiment of this application. A procedure in which the AI apparatus obtains the service data nearby may include the following steps.

S81: An AI processor sends a first data obtaining request to the processor.

The AI processor may generate the first data obtaining request, and send the first data obtaining request to the processor through a high-speed interconnect network. The first data obtaining request is used to request the service data stored in the hard disk. The first data obtaining request may carry an identifier of the service data. The identifier of the service data may be an ID of the service data.

S82: In response to the first data obtaining request, the processor obtains the service data from the hard disk, and sends the service data to the AI apparatus.

The processor may receive the first data obtaining request through the high-speed interconnect network. The processor may parse the first data obtaining request to obtain the identifier of the service data that is carried in the first data obtaining request. The processor may determine an address of the service data in the hard disk based on the identifier of the service data. The processor may access the hard disk based on the address of the service data, to obtain the service data stored in the hard disk. The processor may return the service data to the AI apparatus through the high-speed interconnect network.

S83: The AI apparatus receives the service data sent by the processor, and performs AI computing on the service data.

According to the method in which the AI apparatus obtains the service data nearby provided in this embodiment, the storage device includes the AI apparatus, the processor, and the hard disk. Therefore, when the AI apparatus needs to obtain the service data, the AI apparatus sends the data obtaining request to the processor. The processor in the storage device obtains the service data from the hard disk, and sends the service data to the AI processor, so that the AI processor can locally obtain the service data. This avoids communication overheads caused by requesting the service data from a remote storage device through a network, and shortens a delay of obtaining the service data.

The embodiment in FIG. 8 provides the procedure of obtaining the service data nearby. In some other embodiments of this application, the service data may alternatively be obtained nearby in another implementation. The embodiment in FIG. 9 is used as an example for description below.

FIG. 9 is a schematic diagram of a data processing method according to an embodiment of this application. The procedure in which the AI apparatus obtains the service data nearby may include the following steps.

S91: The AI apparatus sends a second data obtaining request to the processor.

When the AI apparatus needs to obtain the service data from the processor, the AI processor may generate the second data obtaining request, and send the second data obtaining request to the processor through the high-speed interconnect network. The second data obtaining request is used to request to obtain the service data. The second data obtaining request may carry an identifier of the service data. The identifier of the service data may be an ID of the service data.

S92: The processor sends metadata of the service data to the AI apparatus in response to the second data obtaining request, where the metadata is used to indicate an address of the service data.

The processor may parse the second data obtaining request to obtain the identifier of the service data that is carried in the second data obtaining request, obtain the metadata of the service data, and send the metadata of the service data to the AI processor through the high-speed interconnect network. The metadata is used to indicate the address of the service data, that is, a storage location of the service data. For example, the metadata may indicate a start address of the service data and a length of the service data, or the metadata may indicate a start address and an end address of the service data.

FIG. 10 is a schematic diagram of interaction between the AI processor and the processor in the storage device.

Optionally, the processor may determine, based on the address of the service data, whether the service data can be sent to the AI apparatus through DMA. If the service data can be sent to the AI apparatus through DMA, the metadata of the service data is sent to the AI apparatus, to trigger the method procedure provided in the embodiment in FIG. 9. In addition, the processor may determine whether the service data can be sent to the AI apparatus through RDMA. If the service data can be sent to the AI apparatus through RDMA, the metadata of the service data is sent to the AI apparatus, to trigger a method procedure provided in an embodiment in FIG. 12. In addition, if the service data cannot be sent to the AI apparatus through DMA or RDMA, the service data is loaded from the hard disk to a memory, and then the service data is transmitted from the memory to an AI memory.

S93: When the metadata indicates that the service data is located in the storage device, the AI apparatus sends a first data access request to the hard disk.

The first data access request includes the metadata of the service data, and the first data access request may be a DMA request. In an example embodiment, the AI processor in the AI apparatus may determine the address of the service data based on the metadata of the service data, and determine whether the service data is located in the hard disk or another storage device. If determining that the service data is located in the hard disk, the AI processor generates the first data access request based on the metadata, and sends the first data access request to the hard disk through the high-speed interconnect network.

S94: The hard disk obtains the service data based on the metadata, and writes the service data into the AI apparatus through DMA.

The hard disk may parse the first data access request to obtain the metadata carried in the first data access request, determine the address of the service data based on the metadata, and access the address to obtain the service data. A DMA path may be established between the hard disk and the AI memory, and the hard disk may send the service data to the AI memory through the DMA path. The hard disk may be a smart disk. The hard disk may include a CPU, and the hard disk may write the service data through the CPU in the hard disk.

Figure 11:
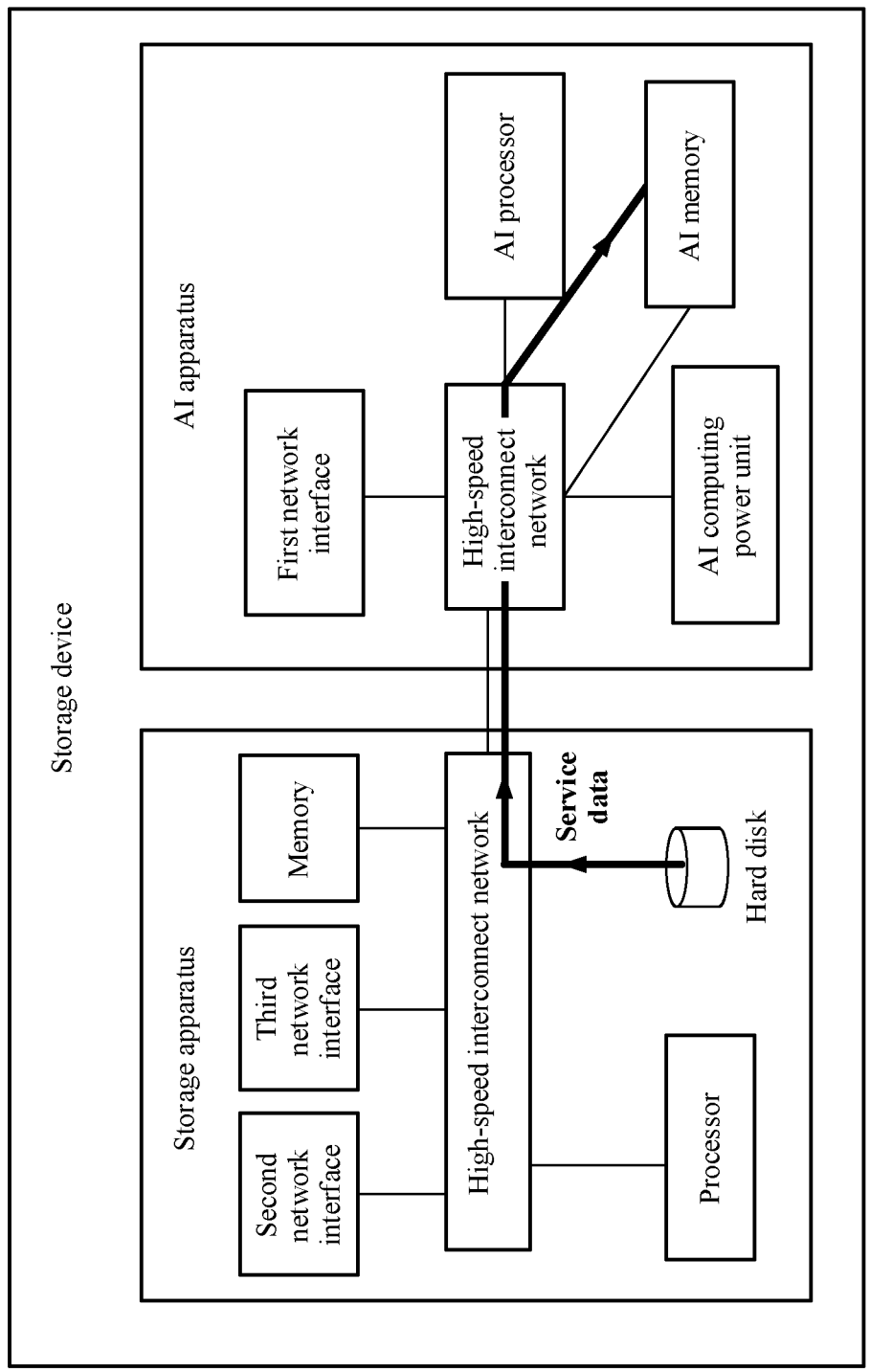
FIG. 11 is a schematic diagram of a data transmission procedure according to an embodiment of this application.

For example, FIG. 11 is a schematic diagram of service data transmission according to an embodiment of this application. It can be learned from FIG. 11 that the service data stored in the hard disk can be transmitted to the AI memory through the high-speed interconnect network through DMA.

According to the method provided in this embodiment, DMA pass-through between the AI apparatus and the hard disk can be implemented. The DMA path is established between the AI apparatus and the hard disk, so that the AI apparatus and the hard disk can quickly exchange the service data with each other through the DMA path. This accelerates service data loading by the AI apparatus, increases an amount of service data that can be simultaneously processed by the AI apparatus, reduces communication overheads for transmitting an AI parameter between AI apparatuses, and accelerates AI training.

In some other embodiments, the AI apparatus can obtain the service data from another storage device. A method for obtaining the service data from the another storage device is described below by using the embodiment in FIG. 12 as an example. Specifically, referring to FIG. 12, an embodiment of this application provides a data processing method. The method may be applied to a storage device. The storage device may be any storage device shown in FIG. 1 or FIG. 2. The method includes the following steps.

S1201: The AI apparatus sends a third data obtaining request to the processor.

S1202: The processor sends metadata of the service data to the AI apparatus in response to the third data obtaining request.

S1203: When the metadata indicates that the service data is located in another storage device, the AI apparatus sends a second data access request to the another storage device.

The AI processor may determine an address of the service data based on the metadata of the service data, and determine, based on the address of the service data, whether the service data is locally stored or is stored in the another storage device. If determining that the service data is stored in the another storage device, the AI processor generates the second data access request, and sends the second data access request to a first network interface. The first network interface may send the second data access request to the another storage device. The second data access request may include the metadata of the service data. The second data access request may be an RDMA request. The second data access request may include a destination address in the AI memory in the storage device, to indicate the another storage device to write the service data into the destination address.

S1204: The another storage device sends the service data to the AI apparatus in response to the second data access request.

For example, the another storage device may write the service data into the AI memory through RDMA. Specifically, the another storage device may parse the second data access request to obtain the metadata of the service data that is carried in the second data access request, determine the address of the service data based on the metadata of the service data, and access the address in a storage medium to obtain the service data. In addition, the another storage device may establish an RDMA path between the another storage device and the AI memory in the AI apparatus based on the second data access request, and write the service data into the AI memory in the AI apparatus through the RDMA path. Specifically, the another storage device may generate an RDMA message based on the destination address and the service data in the AI memory, and send the RDMA message to the AI apparatus. The RDMA message includes the service data and the destination address in the AI memory. The first network interface in the AI apparatus may receive the RDMA message, and parse the RDMA message to obtain the service data and the destination address in the AI memory that are carried in the RDMA message. The another storage device accesses the AI memory through the high-speed interconnect network, and writes the service data into the destination address in the AI memory.

Figure 13:
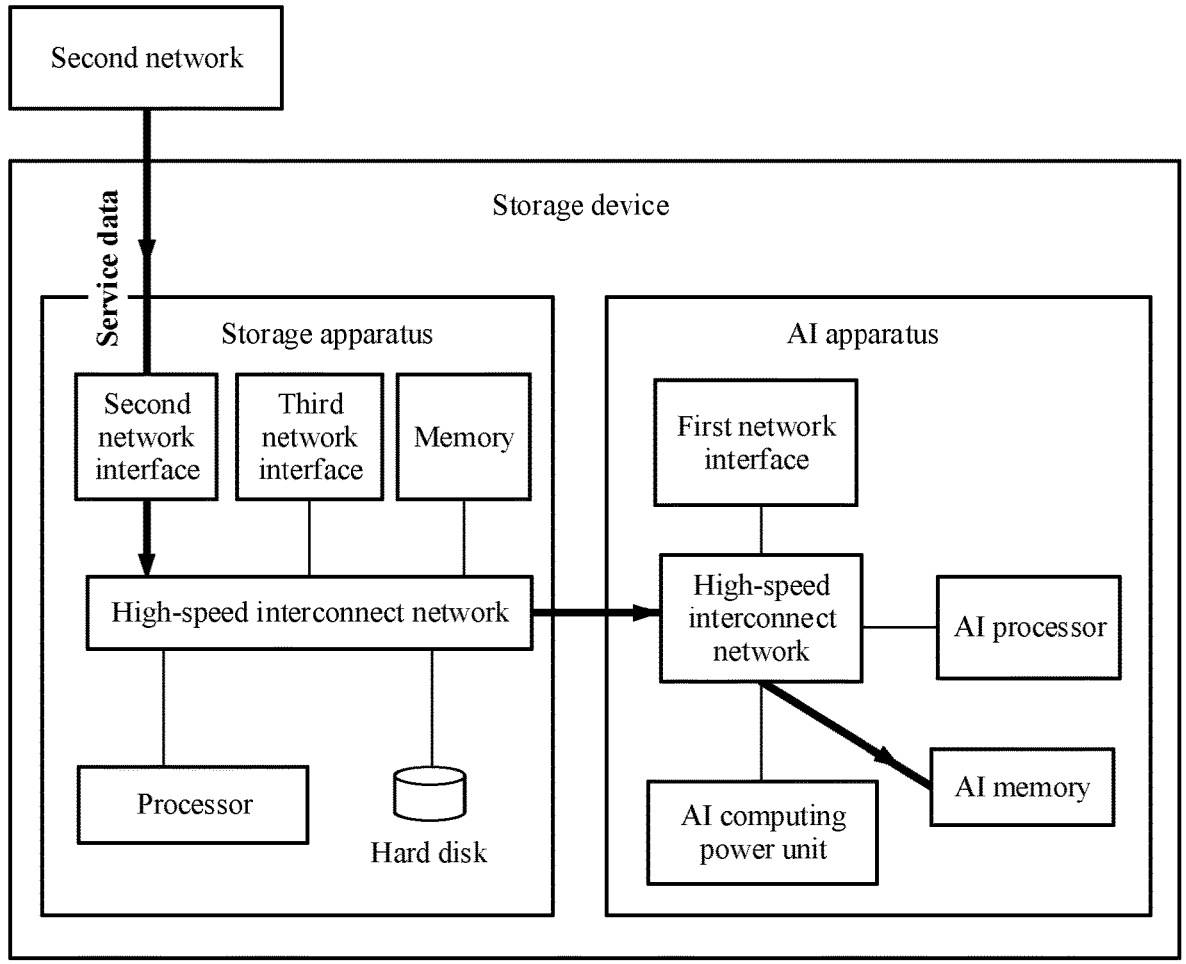
FIG. 13 is a schematic diagram of a data transmission procedure according to an embodiment of this application.

For example, FIG. 13 is a schematic diagram of service data transmission according to an embodiment of this application. It can be learned from FIG. 13 that the service data stored in the another storage device can be transmitted to the AI memory through the high-speed interconnect network through RDMA.

In this optional manner, RDMA pass-through between the AI memory in the AI apparatus and the another storage device is implemented, and the AI memory and the another storage device quickly exchange the service data with each other. This accelerates AI training.

Optionally, the AI apparatus may provide AI computing power through an AI computing power unit. For example, referring to FIG. 14, an embodiment of this application provides an AI computing processing method. The method may be applied to a storage device. The storage device may be any storage device shown in FIG. 1 or FIG. 2. The method is executed by an AI computing power unit in the storage device, and includes the following steps.

S1401: The AI computing power unit obtains the service data from the AI memory.

The AI computing power unit may communicate with the AI memory through the high-speed interconnect network. The AI computing power unit may access the AI memory through the high-speed interconnect network, to obtain the service data cached in the AI memory.

S1402: The AI computing power unit performs AI computing on the service data.

For details about AI computing, refer to step S72 in the embodiment in FIG. 7. Details are not described herein again.

In this optional manner, the AI apparatus can provide the AI computing power through the AI computing power unit, so as to prevent AI computing from occupying computing power of a storage apparatus, thereby preventing AI computing from severely affecting performance of the storage device.

Figure 15:
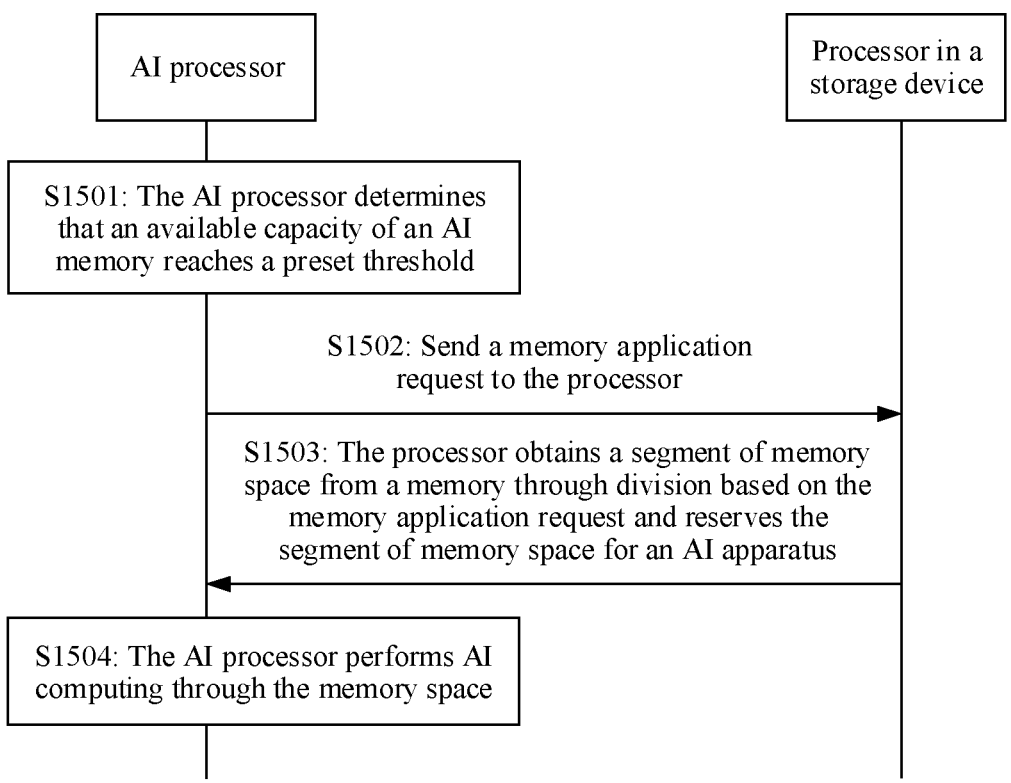
FIG. 15 is a flowchart of a data processing method according to an embodiment of this application.
Figure 16:
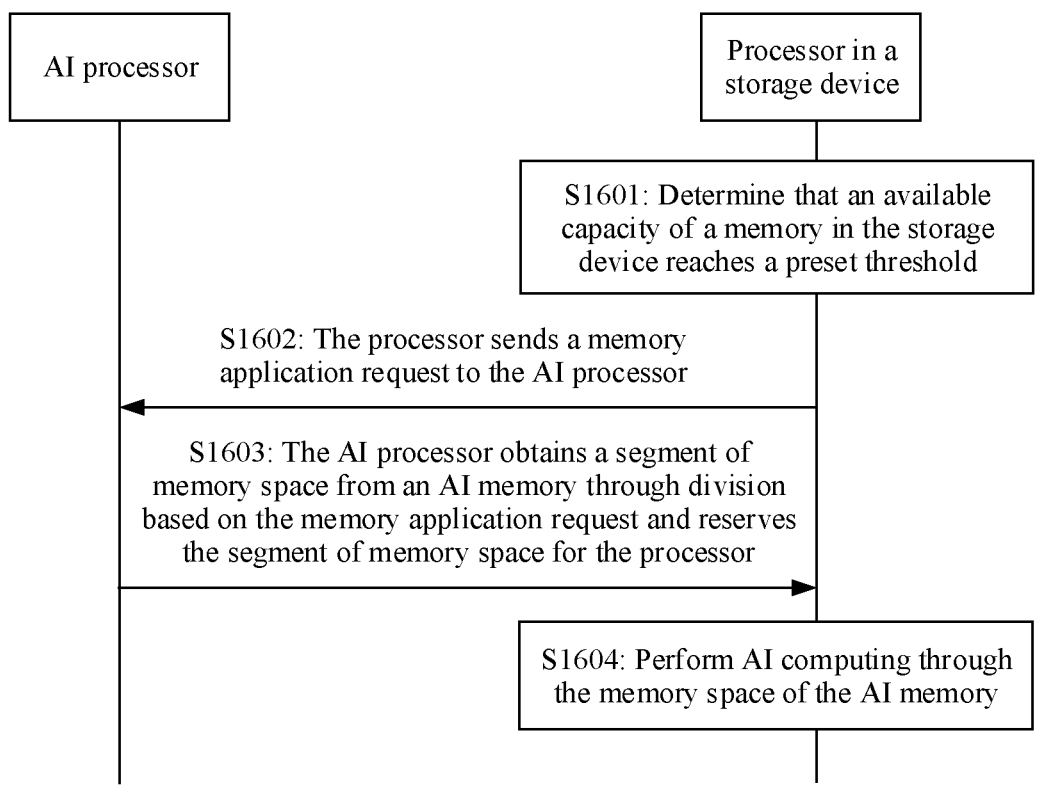
FIG. 16 is a flowchart of a data processing method according to an embodiment of this application.

Optionally, the memory and the AI memory in the storage device may implement memory resource collaboration. The memory resource collaboration may be implemented in a plurality of manners. An embodiment in FIG. 15 and an embodiment in FIG. 16 are used as examples for description below.

In some embodiments, the AI apparatus can borrow a memory in the storage apparatus to perform AI computing. Referring to FIG. 15, an embodiment of this application provides a data processing method. The method may be applied to the storage device. The storage device may be the first storage device 10 or the second storage device 11 in the system 1 shown in FIG. 1, or may be the storage device 2 shown in FIG. 2. Interaction bodies of the method include the AI processor in the storage device and the processor in the storage device. The method includes the following steps.

S1501: The AI processor determines that an available capacity of the AI memory reaches a preset threshold.

S1502: The AI processor sends a memory application request to the processor.

The memory application request is used to borrow a memory of the processor. The memory application request may carry a size of to-be-borrowed memory space. It can be understood that the trigger condition specified in S1501 is merely an example. The AI processor may alternatively send the memory application request to the processor in another case or in a case in which there is no trigger condition.

S1503: The processor obtains a segment of memory space from the memory through division based on the memory application request and reserves the segment of memory space for the AI processor.

S1504: The AI processor performs AI computing through the memory space of the memory in the storage device.

The AI processor may access, through a PCIe bus or a memory fabric, the memory space reserved by the processor in the storage device, and perform AI computing through the memory space of the memory and memory space of the AI memory. In an AI computing process, fast exchange can be performed between the memory and the AI memory through DMA, PCIe, or the memory fabric. Therefore, because larger memory space can increase an amount of data that can be processed by a single AI processor in one batch, overheads for parameter communication between different AI processors can be reduced, and AI training can be accelerated. In addition, when the AI processor stops performing AI computing, and does not use the memory space of the memory in the storage device, the AI processor may send a memory release request to the processor, so that the processor releases the reserved memory space and returns the memory space to the processor.

In a related technology, GPU memory is fixed, and consequently there is frequently no sufficient memory for AI computing. In this optional manner, the AI apparatus can borrow the memory in the storage apparatus to perform AI computing, so that available memory space of the AI apparatus is expanded, and the AI apparatus can perform AI computing in larger memory. This improves AI computing efficiency.

It should be noted that, under a trigger condition that the AI processor sends the memory application request, a manner in which the processor in the storage device obtains the memory space through division and reserves the memory space for the AI processor is only an optional manner. In some other embodiments, the processor in the storage device may alternatively obtain a segment of memory space from the memory through division and reserve the segment of memory space for the AI apparatus in another case. For example, the processor in the storage device may actively obtain the memory space and reserve the memory space for the AI apparatus. For example, when determining that the available capacity of the memory is greater than the preset threshold, the processor in the storage device may obtain the memory space through division and reserve the memory space for the AI apparatus. For another example, the processor in the storage device may monitor an available capacity of the AI memory, and when determining that the available capacity of the AI memory reaches a preset threshold, the processor in the storage device obtains memory space through division and reserves the memory space for the AI apparatus. It should be understood that an application scenario in which the processor in the storage device obtains memory space through division and reserves the memory space for the AI processor is not limited in this embodiment. In some embodiments, the processor in the storage device may obtain memory space through division and reserve the memory space for the AI processor under any preset condition.

Optionally, the available capacity of the AI memory is determined by a specified batch size (batchsize). The batch size is an amount of data used for one time of training. Specifically, the AI processor may determine the available capacity of the AI memory based on the specified batch size, in other words, determine a specific capacity of the AI memory that is required for performing AI computing based on the specified batch size. The AI processor may compare the available capacity of the AI memory with the preset threshold. If the available capacity of the AI memory reaches the preset threshold, it indicates that the AI memory has insufficient memory space. In this case, a procedure of borrowing the memory in the storage device is triggered.

In this optional manner, the AI processor may perform training through the memory space of the memory in the storage device. Therefore, because larger available memory space can increase a batch size for AI training, an amount of service data that can be processed by the AI apparatus in one batch can be increased, communication overheads for exchanging an AI parameter between different AI apparatuses can be reduced, and AI training can be accelerated. Experiments show that, if AI training is performed only through the AI memory, a maximum batch size is set to 256. However, in this manner, the batch size may be set to 32000. Therefore, the batch size is significantly increased.

In some embodiments, in a process in which the storage device reads/writes an AI parameter, the AI memory may be preferentially used, and then the memory in the storage device is used, to accelerate AI parameter read/write by taking advantage that the AI memory usually has better performance than the memory in the storage device (for example, an access speed of the AI memory may be faster than that of the memory). Specifically, the AI memory may serve as a first level and the memory may serve as a second level, to perform layered AI parameter caching. A priority of the first level is higher than a priority of the second level. In this manner, the memory and AI memory in the storage device are layered, and an AI parameter is preferentially cached in the AI memory. In a possible implementation, a medium controller may establish a mapping relationship between the AI memory and the memory in the storage device. If the AI memory overflows, an AI parameter cached in the AI memory is stored in the memory in the storage device.

In some embodiments, the storage apparatus can borrow the memory in the AI apparatus to read/write the service data, to accelerate service data access or service data storage. Referring to FIG. 16, an embodiment of this application provides a data processing method. The method may be applied to the storage device. The storage device may be any storage device shown in FIG. 1 or FIG. 2. The method includes the following steps.

S1601: The processor in the storage device determines that an available capacity of the memory in the storage device reaches a preset threshold.

S1602: The processor in the storage device sends a memory application request to the AI processor.

The memory application request is used to borrow an AI memory of the AI processor. The memory application request may carry a size of to-be-borrowed memory space. It can be understood that the trigger condition specified in S1111 is merely an example. The processor in the storage device may alternatively send the memory application request to the AI processor in another case or in a case in which there is no trigger condition.

S1603: The AI processor obtains a segment of memory space from the AI memory through division based on the memory application request and reserve the segment of memory space for the processor in the storage device.

S1604: The processor in the storage device performs AI computing through the memory space of the AI memory.

The processor in the storage device may access, through a high-speed interconnect network or a memory fabric, the memory space reserved by the AI processor, and read/write the service data through the memory space of the AI memory and memory space of the memory. In a service data read/write process, fast exchange can be performed between the AI memory and memory through DMA, the high-speed interconnect network, or the memory fabric. Therefore, because larger memory space can increase an amount of data that can be processed by a single processor in one batch, overheads for parameter communication between different processors can be reduced, and service data read/write can be accelerated. In addition, when the processor in the storage device stops reading the service data or writing the service data, and does not use the memory space of the AI memory, the processor may send a memory release request to the AI processor, so that the AI processor releases the reserved memory space and returns the memory space to the AI processor.

In an example application scenario, a user annotates a face image set, and needs to store the face image set in the storage device to subsequently perform AI training through the face image set. In this case, the user may trigger the client, so that the client sends the face image set to the storage device. After the storage device receives the face image set, the processor in the storage device usually first caches the face image set into the memory, and then writes the face image set in the memory into the hard disk, to implement persistent storage of the face image set. Because a data amount of the face image set is huge, a capacity of the memory in the storage device may not meet a requirement, and consequently the available capacity of the memory in the storage device reaches the preset threshold. In this case, the processor in the storage device may perform step S1601 to step S1604 to borrow memory space of the AI memory, and cache the face image set through larger memory space, thereby accelerating storage of the face image set.

In a related technology, the capacity of the memory in the storage device is fixed, and consequently there is frequently no sufficient memory for storing the service data. In this optional manner, the storage apparatus can borrow the AI memory in the AI apparatus to read/write the service data, so that the available memory space of the storage apparatus is expanded, and the storage apparatus can store the service data in larger memory. This reduces a service data read/write time, and improves service data read/write efficiency.

Figure 17:
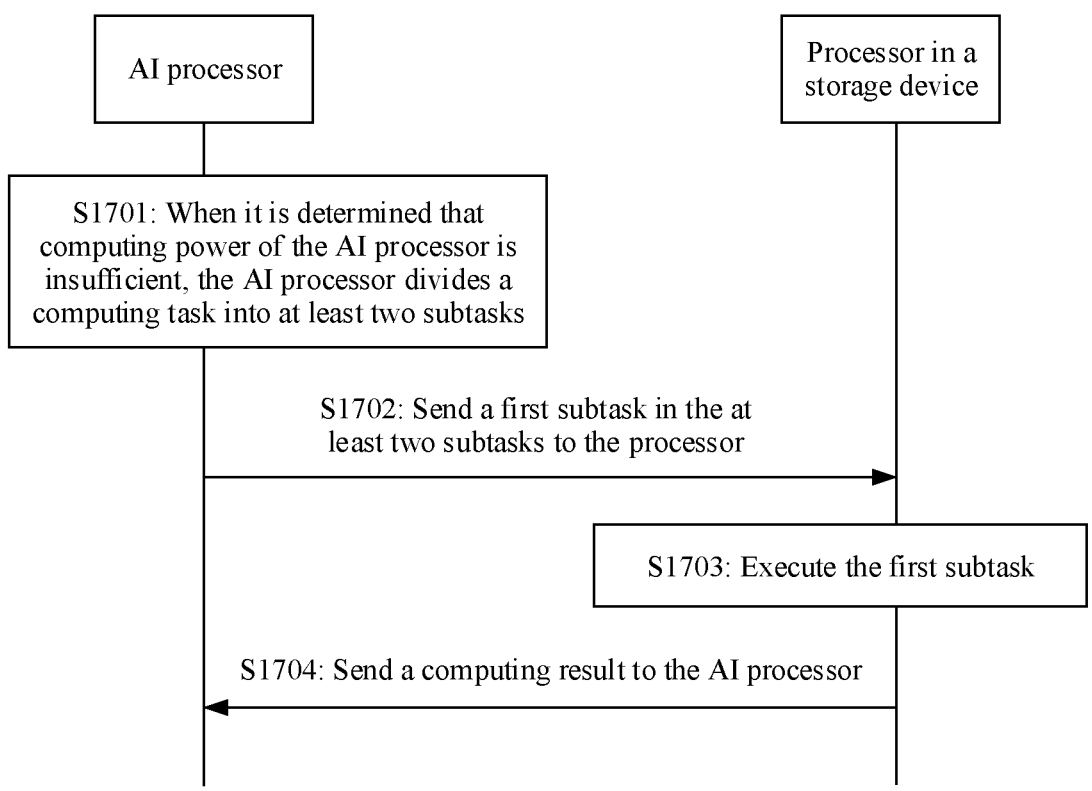
FIG. 17 is a flowchart of a data processing method according to an embodiment of this application.
Figure 18:
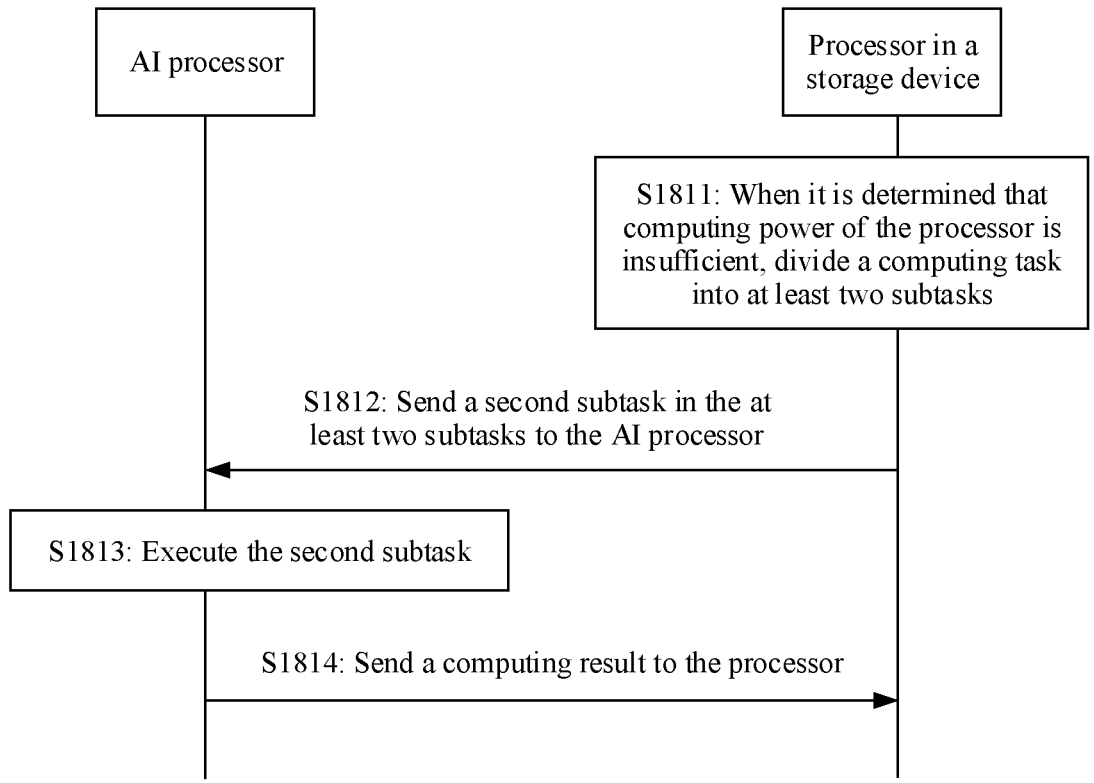
FIG. 18 is a flowchart of a data processing method according to an embodiment of this application.

Optionally, the processor and the AI processor in the storage device may implement computing power collaboration. The computing power collaboration may be implemented in a plurality of manners. An embodiment in FIG. 17 and an embodiment in FIG. 18 are used as examples for description below.

In some embodiments, the AI processor can borrow computing power of the processor in the storage device to process AI computing, to support collaboration between computing power of the processor in the storage device and computing power of the AI processor. Referring to FIG. 17, an embodiment of this application provides a data processing method. The method may be applied to the storage device. The storage device may be any storage device shown in FIG. 1 or FIG. 2. The method includes the following steps.

S1701: When it is determined that the computing power of the AI processor is insufficient, the AI processor divides a computing task into at least two subtasks.

In a process in which the AI processor performs AI training and resource scheduling, because the AI processor performs a computing operation, a CPU is occupied, and consequently the computing power is insufficient. In this case, the AI processor may divide the computing task, to share the computing task through the processor.

S1702: The AI processor sends a first subtask in the at least two subtasks to the processor in the storage device.

The first subtask is a task that is in the at least two subtasks and that is to be executed by the processor in the storage device. The AI processor may send the first subtask through a high-speed interconnect network.

S1703: The processor in the storage device executes the first subtask.

S1704: The processor in the storage device sends a computing result to the AI processor.

After completing the first subtask, the processor in the storage device may feed back the computing result of the first subtask to the AI processor. The AI processor may receive the computing result, and execute a next computing task based on the computing result, or schedule an AI computing power unit based on the computing result.

In this optional manner, when the computing power of the AI processor is insufficient, the AI processor can borrow the computing power of the processor in the storage device to process AI computing, to implement collaboration between the computing power of the AI processor and the computing power of the processor in the storage device, and increase the computing power of the AI processor, thereby accelerating AI training.

In some embodiments, the processor in the storage device can borrow computing power of the AI processor to read/write the service data, to accelerate service data access or service data storage. Referring to FIG. 18, an embodiment of this application provides a data processing method. The method may be applied to the storage device. The storage device may be any storage device shown in FIG. 1 or FIG. 2. The method includes the following steps.

S1811: When it is determined that the computing power of the processor in the storage device is insufficient, the processor in the storage device divides a computing task into at least two subtasks.

In a process in which the processor in the storage device processes the service data, because the processor performs a read operation or a write operation, a CPU is insufficient, and consequently the computing power is insufficient. In this case, the processor in the storage device may divide the computing task, to share the computing task through the AI processor.

S1812: The processor in the storage device sends a second subtask in the at least two subtasks to the AI processor.

The second subtask is a task that is in the at least two subtasks and that is to be executed by the AI processor. For example, the second subtask may be obtaining the service data from the hard disk. The processor may send the second subtask through a high-speed interconnect network.

S1813: The AI processor executes the second subtask.

S1814: The AI processor sends a computing result to the processor in the storage device.

After completing the second subtask, the AI processor may feed back the computing result of the second subtask to the processor in the storage device. The processor in the storage device may receive the computing result, and execute a next computing task based on the computing result.

For example, if the second subtask is obtaining the service data from the hard disk, after obtaining the service data from the hard disk, the AI processor may send the obtained service data to the processor in the storage device.

In this optional manner, when the computing power of the processor in the storage device is insufficient, the processor in the storage device can borrow the computing power of the AI processor to read/write the service data, to implement collaboration between the computing power of the AI processor and the computing power of the processor in the storage device, and increase the computing power of the processor in the storage device, thereby accelerating service data read/write.

In an optional embodiment, before the storage device processes AI computing, the processor in the storage device may load an operating system to the AI apparatus, and the processor in the storage device starts the AI apparatus through the operating system. In another optional embodiment, the AI apparatus may alternatively pre-store an operating system, and the processor in the storage device may send a start instruction to the AI apparatus. The AI apparatus may receive the start instruction, load the operating system in response to the start instruction, and run the operating system, so that the AI apparatus is started. The processor may receive an AI computing instruction from a terminal or an upper-layer application. The AI computing instruction is used to indicate the processor to perform AI computing. The processor may load the operating system to the AI apparatus through trigger by the AI computing instruction. Certainly, the processor may alternatively load the operating system to the AI apparatus on another occasion. This is not limited in this embodiment.

The foregoing embodiments describe a method procedure in which a single storage device processes AI computing. In some embodiments of this application, a plurality of storage devices in the distributed storage system may collaborate to perform AI computing, thereby enhancing overall AI computing power. Details are described below.

Figure 19:
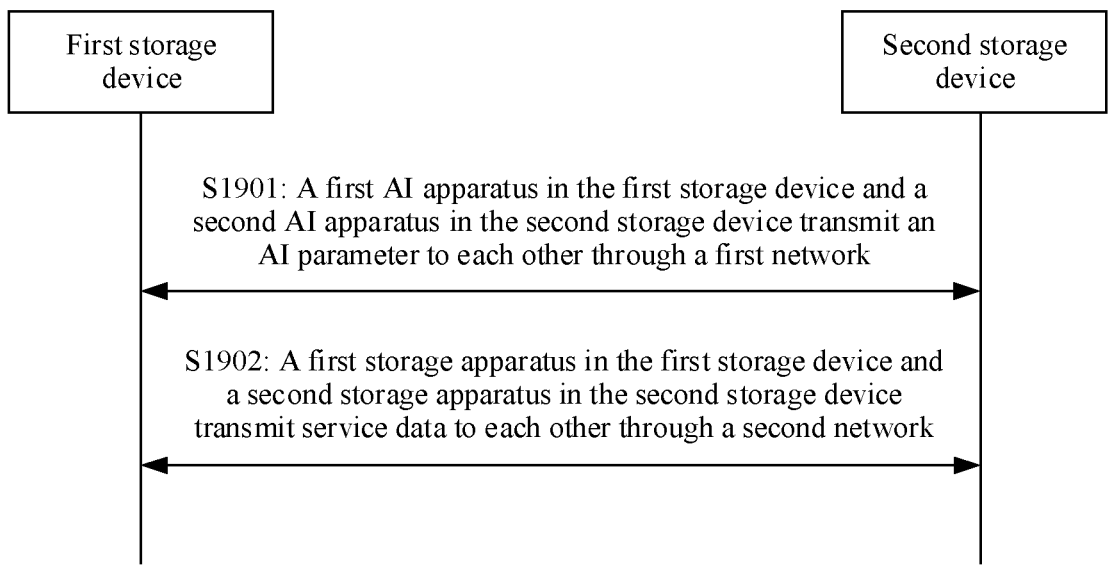
FIG. 19 is a flowchart of a data processing method according to an embodiment of this application.

FIG. 19 is a flowchart of a data processing method according to an embodiment of this application. The method may be applied to the storage system shown in FIG. 1, and the method may be applied to the system 1 shown in FIG. 1. Interaction bodies of the method include a first storage device and a second storage device in the storage system. The method includes the following steps.

S1901: A first AI apparatus in the first storage device and a second AI apparatus in the second storage device transmit an AI parameter to each other through a first network.

In a process in which the first storage device and the second storage device process AI computing, the first storage device and the second storage device may exchange the AI parameter with each other. Specifically, AI computing is usually performed based on a neural network model, and a computing process based on the neural network model mainly includes two parts: a forward propagation algorithm and a backward propagation algorithm (back propagation neural networks, BP). The forward propagation algorithm is used to compute an output result of the neural network model. In a process of running the forward propagation algorithm, data is computed and transmitted layer by layer in a direction from an input layer of the neural network model to one or more hidden layers to an output layer, until the data is output from the output layer. The backward propagation algorithm is used to reduce an error between an output result of the model and an actual result. In a process of running the backward propagation algorithm, the neural network model is optimized by adjusting an AI parameter, for example, a weight of each neuron. In conclusion, the running of the neural network model includes cyclic iteration of the forward propagation algorithm and the backward propagation algorithm. In this process, the AI parameter needs to be exchanged, so that the model can be continually optimized through AI parameter adjustment.

When the first AI apparatus obtains the AI parameter through computing, the first AI apparatus may output the AI parameter through a first network interface. The first network may receive the AI parameter from the first network interface in the first AI apparatus, and the first network may send the received AI parameter to a first network interface in the second AI apparatus. The second AI apparatus may receive the input AI parameter from the first network interface.

Optionally, if the storage system further includes a host configured to process AI computing, the first network may be used to transmit the AI parameter between the first storage device, the second storage device, and the host.

S1902: A first storage apparatus in the first storage device and a second storage apparatus in the second storage device transmit service data to each other through a second network.

Figure 20:
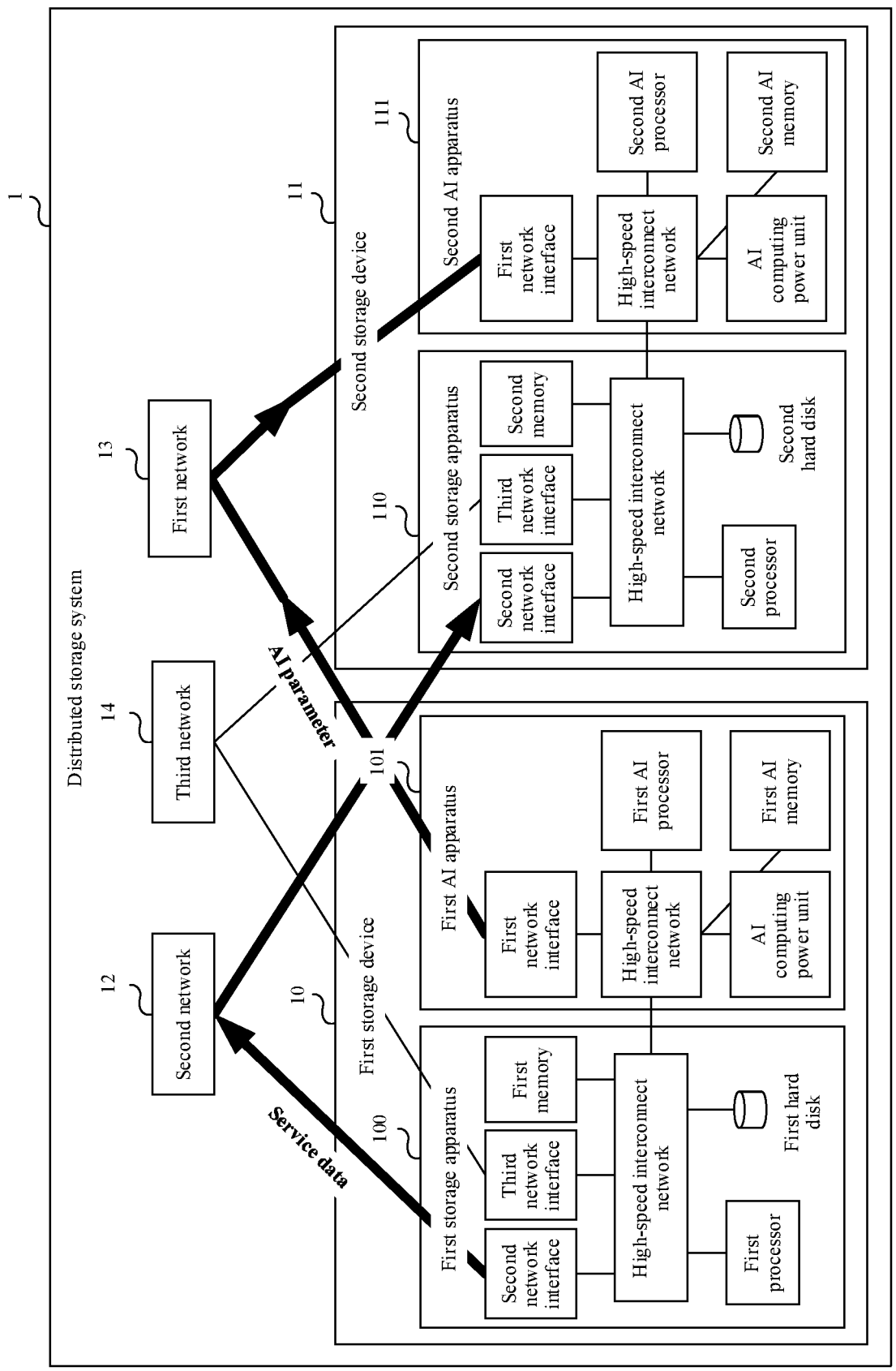
FIG. 20 is a schematic diagram of a data transmission procedure according to an embodiment of this application.

For example, FIG. 20 is a schematic diagram of data transmission according to an embodiment of this application. It can be learned from FIG. 20 that an AI parameter may be transmitted between AI apparatuses in different storage devices through the first network, and service data may be transmitted between storage apparatuses in different storage devices through the second network.

According to the method provided in this embodiment, two storage devices exchange an AI parameter with each other through respective AI apparatuses through the first network, and exchange service data with each other through respective storage apparatuses through the second network, to collaboratively perform AI computing based on the AI parameter and the service data. Storage capabilities and AI computing power of a plurality of storage devices are converged, so that an overall storage capability and AI computing power of the system can be increased.

Figure 21:
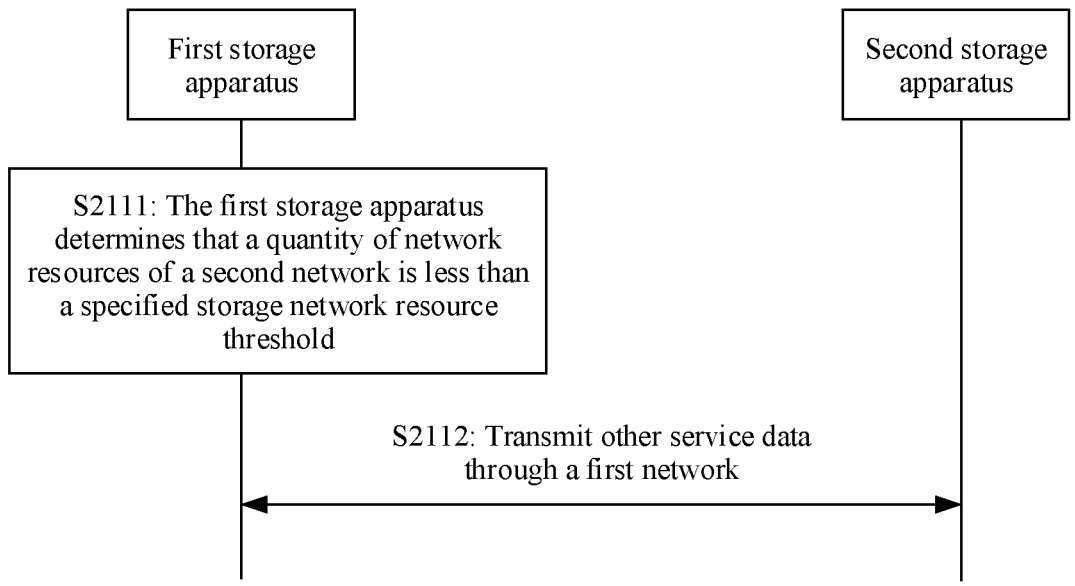
FIG. 21 is a flowchart of a data processing method according to an embodiment of this application.

Optionally, storage apparatuses may exchange service data with each other through the first network. Specifically, referring to FIG. 21, an embodiment of this application provides a service data transmission method. The method may be applied to the system 1 shown in FIG. 1. Interaction bodies of the method include a first storage apparatus and a second storage apparatus. The method includes the following steps.

S2111: The first storage apparatus determines that a quantity of network resources of the second network is less than a specified storage network resource threshold.

The first storage apparatus or a management apparatus may detect the quantity of network resources of the second network of the first storage apparatus, determine whether the quantity of network resources of the second network of the first storage apparatus is less than the specified storage network resource threshold, and if determining that the quantity of network resources of the second network is less than the specified storage network resource threshold, perform step S2112. In some embodiments, the first storage apparatus or a management apparatus may further detect a quantity of network resources of the first network of the first AI apparatus and a quantity of network resources of the first network of the second AI apparatus, and determine whether the quantity of network resources of the first network of the first AI apparatus and the quantity of network resources of the first network of the second AI apparatus each are greater than a specified AI network resource threshold. If it is determined that the quantity of network resources of the second network is less than the specified storage network resource threshold, the quantity of network resources of the first network of the first AI apparatus is greater than the specified AI network resource threshold, and the quantity of network resources of the first network of the second AI apparatus is greater than the specified AI network resource threshold, it indicates that network resources of the second network are currently insufficient but there are sufficient AI network resources. In this case, step S2112 may be performed. In addition, it can be understood that, even if there is no restrictive condition in S2111, the storage apparatuses may exchange the service data with each other through the first network.

S2112: Other service data is transmitted between the first storage apparatus and the second storage apparatus through the first network.

For example, the first storage apparatus is a source device, and the second storage apparatus is a destination device. A procedure of transmitting the other service data may include: The first network interface in the first AI apparatus may access a hard disk in the first storage apparatus through a high-speed interconnect network, read the other service data from the hard disk in the first storage apparatus, and send the other service data to the second storage device through the first network. The first network interface in the second AI apparatus may receive the other service data through the first network, and write the other service data into a memory in the second storage apparatus through the high-speed interconnect network.

In an example scenario, when the distributed storage system starts a job, and each storage device loads service data for the first time, congestion occurs in the second network because the storage device loads the service data through the second network. In this case, because the AI apparatus has not started the job or has just started the job, the first network is usually idle and therefore can be used.

The first network is used to transmit the service data, to accelerate service data transmission, so that the service data can be quickly loaded to each storage device through collaboration between the first network and the second network.

In a related technology, the service data is usually transmitted only through the second network. This is equivalent to that there is only one forwarding path of the second network. This optional manner can achieve at least the following effect: A new path is provided for the storage apparatuses to exchange the service data with each other. When network resources of the second network are insufficient, the first network is used to exchange the service data, and the first network may be used as a newly added path for forwarding the service data. In this case, the service data may be transmitted through the second network, or may be transmitted through the first network. This increases a network bandwidth for transmitting the service data, shortens a delay of exchanging the service data, accelerates service data exchange, and accelerates AI computing.

Optionally, memory pass-through between different storage devices may be implemented through RDMA. Specifically, referring to FIG. 22, an embodiment of this application provides a data processing method. The method may be applied to the system 1 shown in FIG. 1. Interaction bodies of the method include a first AI apparatus in a first storage device and a second AI apparatus in a second storage device. The method includes the following steps.

S2211: The first AI apparatus sends a network resource request of the first network to a second AI processor, and sends a memory RDMA access request to the second processor.

The network resource request of the first network is used to request to occupy some network resources of the first network of the second AI apparatus to transmit service data. The memory RDMA access request is used to access a second memory through RDMA. The memory RDMA access request may include a destination address of the second memory, to indicate that the service data needs to be written into the destination address.

In an optional embodiment, a first AI processor in the first AI apparatus may generate the network resource request of the first network and the memory RDMA access request, and send the network resource request of the first network and the memory RDMA access request to a first network interface. The first network interface may send the network resource request of the first network to the second AI processor, and send the memory RDMA access request to the second processor. After receiving the network resource request of the first network, the second AI processor may obtain some network resources of the first network through division and reserve the some network resources for the first AI apparatus. After the second AI processor receives the memory RDMA access request, the second AI processor may generate a memory RDMA access response, and return the memory RDMA access response to the first AI apparatus. The memory RDMA access response carries a target address of the second memory, so that the first AI apparatus writes the data into the target address of the second memory through RDMA. According to the foregoing procedure, an RDMA path between the second AI apparatus and the first AI apparatus may be established.

S2212: The first AI apparatus reads the other service data from the first memory.

The first AI apparatus may include a first network interface. The first network interface supports an RDMA function. The first network interface in the first AI apparatus may access the first memory through a high-speed interconnect network, and read the other service data from the first memory based on an address of the other service data in the first memory.

S2213: The first AI apparatus sends the other service data to the second AI apparatus through the first network.

The first network interface in the first AI apparatus may send the read other service data, and the other service data may be transmitted to the second AI apparatus through the first network.

S2214: The second AI apparatus writes the other service data into the second memory.

Specifically, the second AI apparatus may include a first network interface. The first network interface supports an RDMA function. The first network interface in the second AI apparatus may receive the other service data from the first AI apparatus. The first network interface in the second AI apparatus may write the other service data into the destination address of the second memory through the high-speed interconnect network.

In addition, after the second AI apparatus completes a write operation on the other service data, the first AI apparatus and the second AI apparatus may release an occupied network resource of the first network, and a task of exchanging data between the first AI apparatus and the second AI apparatus is ended.

Figure 23:
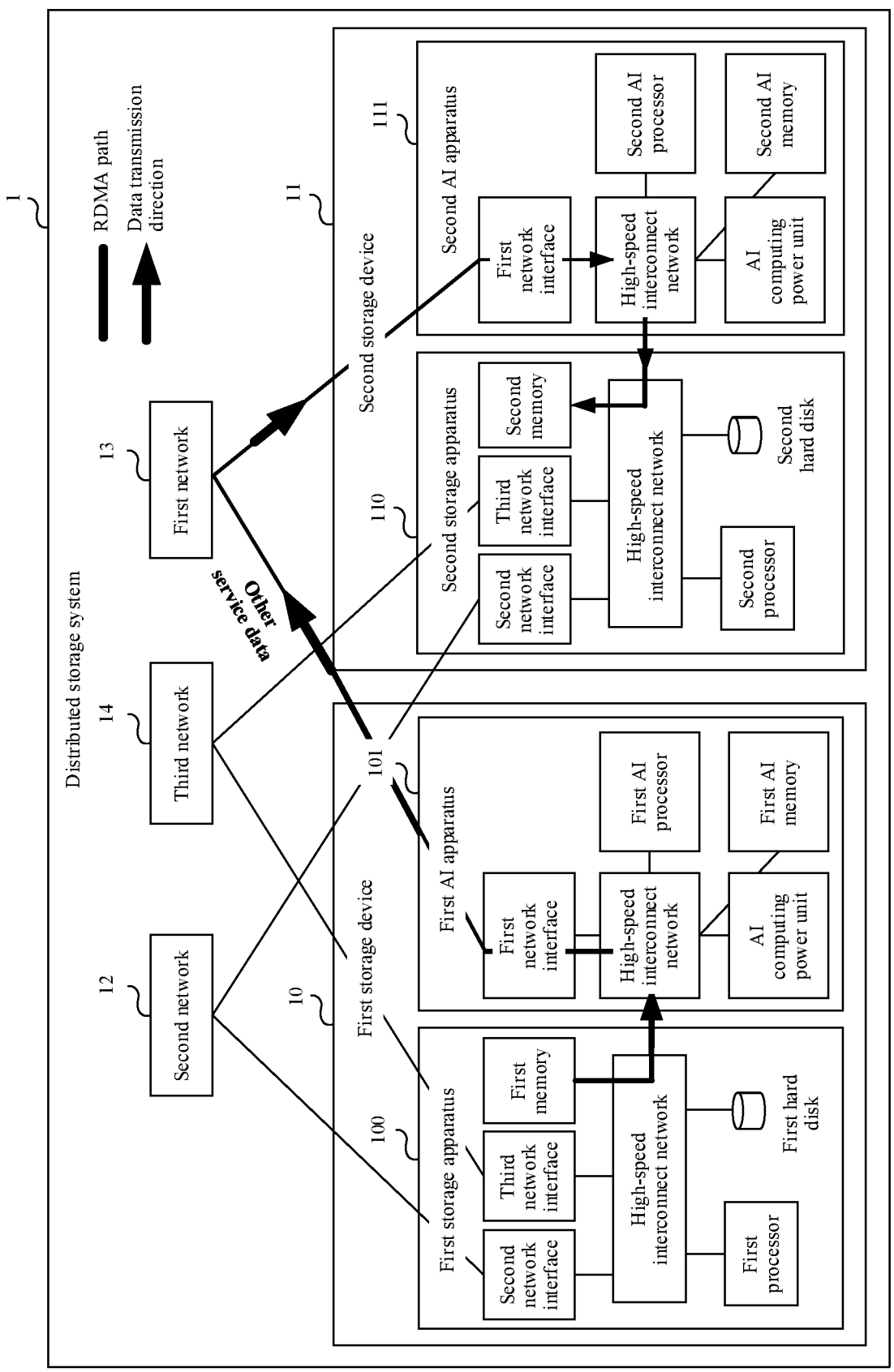
FIG. 23 is a schematic diagram of a data transmission procedure according to an embodiment of this application.

FIG. 23 is a schematic diagram of implementing data pass-through between different memories through a first network. It can be learned from FIG. 23 that the first network can be used as a new path for forwarding service data, and the service data cached in the first memory can be directly transmitted to the second memory through the first network.

In this optional manner, the service data can be exchanged between the first memory and the second memory through RDMA. Therefore, processing overheads of the first processor and the second processor can be avoided, and the service data directly arrives at the second memory from the first memory, thereby accelerating service data exchange, and improving service data exchange efficiency.

The embodiment in FIG. 23 shows a procedure of implementing RDMA data pass-through between memories in two storage devices through the first network. In some embodiments of this application, RDMA data pass-through between a hard disk in a source storage device and a memory in a destination storage device may also be implemented in a similar manner. The following provides a specific description by using an embodiment in FIG. 24.

Figure 24:
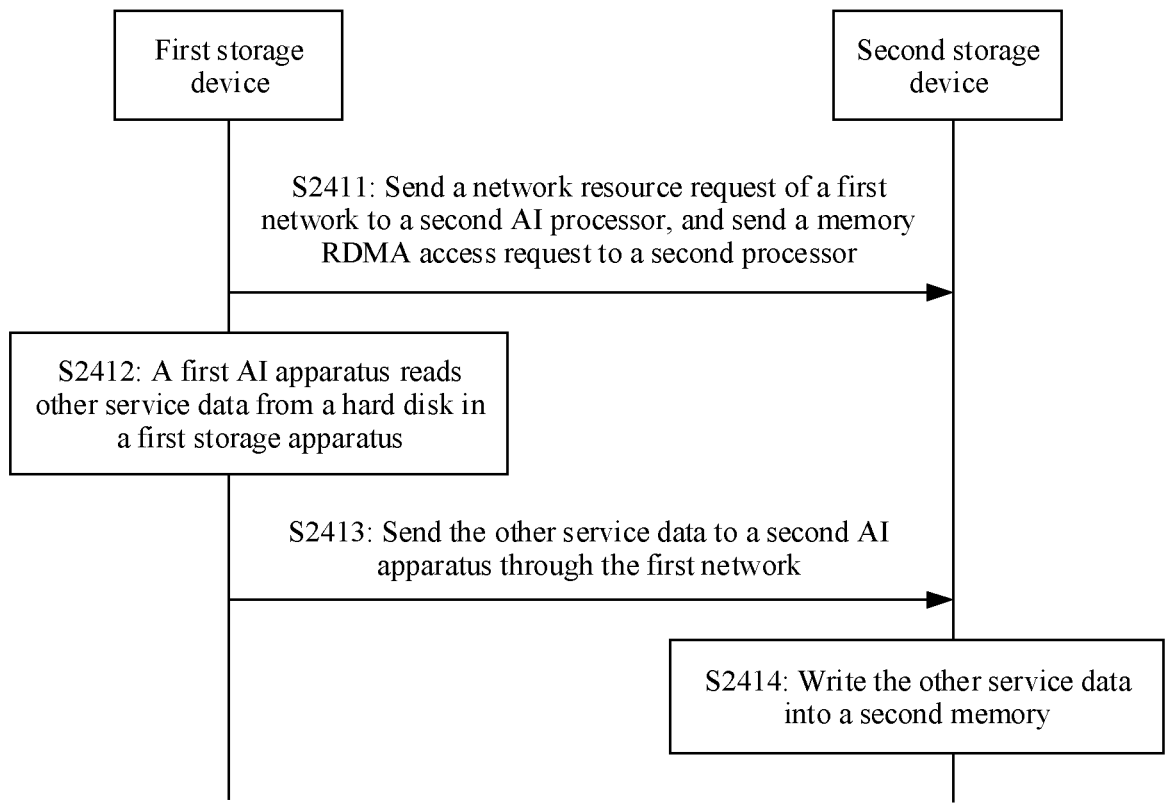
FIG. 24 is a flowchart of a data processing method according to an embodiment of this application.

Referring to FIG. 24, an embodiment of this application provides a data processing method. The method may be applied to the system 1 shown in FIG. 1. Interaction bodies of the method include a first AI apparatus in a first storage device and a second AI apparatus in a second storage device. The method includes the following steps.

S2411: The first AI apparatus sends a network resource request of the first network to a second AI processor, and sends a memory RDMA access request to the second processor.

S2412: The first AI apparatus reads the other service data from the hard disk in the first storage apparatus.

The first network interface in the first AI apparatus may access the hard disk in the first storage apparatus through a high-speed interconnect network, and read the other service data from the hard disk in the first storage apparatus based on an address of the other service data in the hard disk in the first storage apparatus.

S2413: The first AI apparatus sends the other service data to the second AI apparatus through the first network.

S2414: The second AI apparatus writes the other service data into the second memory.

Figure 25:
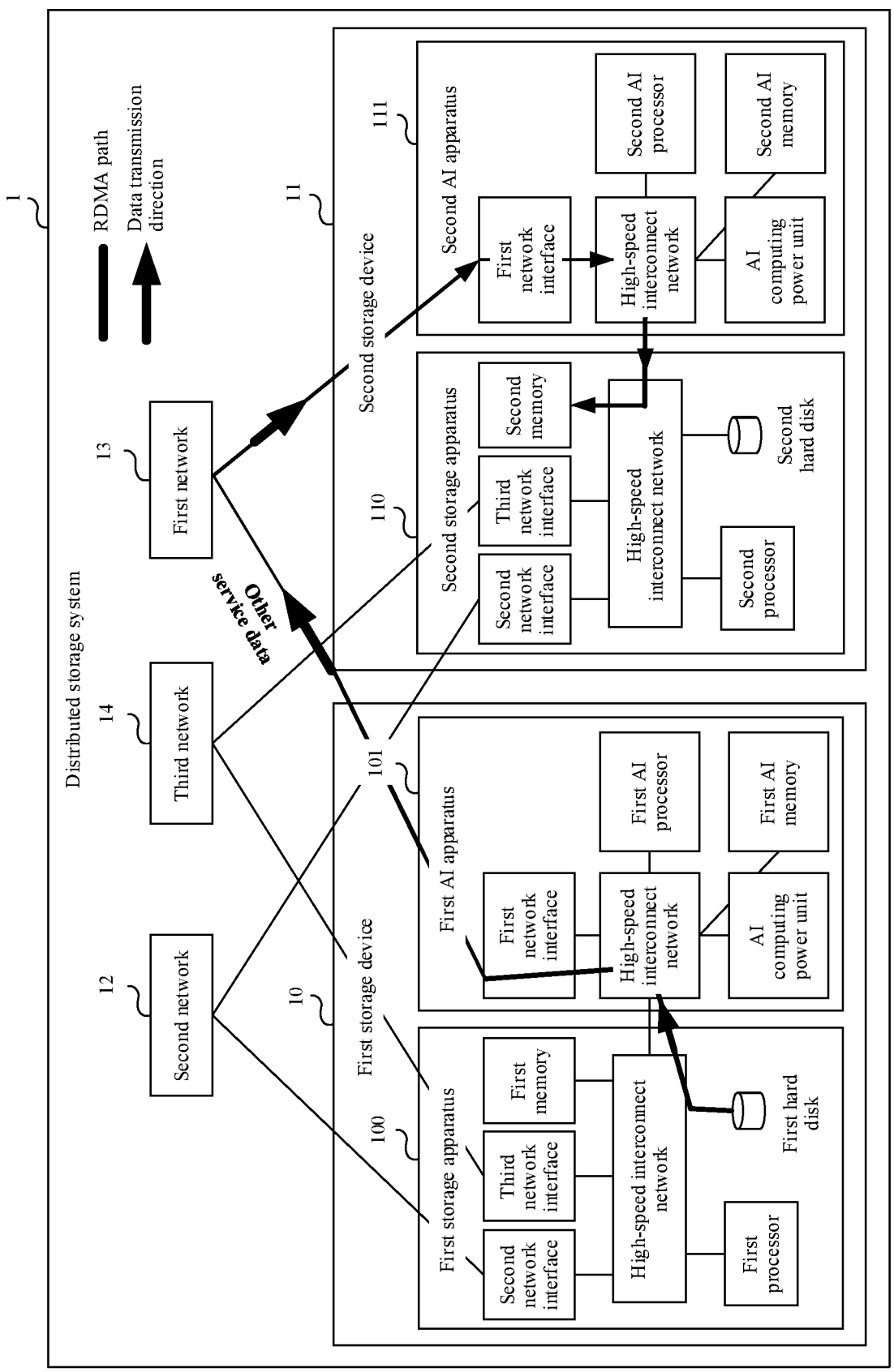
FIG. 25 is a schematic diagram of a data transmission procedure according to an embodiment of this application.

FIG. 25 is a schematic diagram of implementing data pass-through between a hard disk and a memory in a storage device through a first network. It can be learned from FIG. 25 that the first network can be used as a new path for forwarding service data. The service data stored in the hard disk in the first storage apparatus can be directly transmitted to the second memory through the first network through RDMA, thereby implementing data pass-through between a hard disk in a source storage node and a memory in a target storage node.

In this optional manner, the service data can be exchanged between the hard disk in the first storage apparatus and the second memory through RDMA. Therefore, processing overheads of the first processor and the second processor can be avoided, and the service data can directly arrive at the second memory from the hard disk in the first storage apparatus, thereby accelerating service data exchange, and improving service data exchange efficiency.

Optionally, the AI apparatuses may exchange an AI parameter with each other through a network resource of the second network. Specifically, another AI parameter is transmitted between the first AI apparatus and the second AI apparatus through the second network.

This function may be triggered in a plurality of cases. For example, when a quantity of network resources of the first network is less than a specified AI network resource threshold, the another AI parameter is transmitted between the first AI apparatus and the second AI apparatus through the second network. In addition, it can be understood that, even if there is no restrictive condition that the quantity of network resources is less than the specified AI network resource threshold, the another AI parameter may be transmitted between the first AI apparatus and the second AI apparatus through the second network.

In an optional embodiment, the first AI apparatus, the second AI apparatus, or a management apparatus may detect the quantity of network resources of the first network, determine whether the quantity of network resources of the first network is less than the specified AI network resource threshold, and if the quantity of network resources of the first network is less than the specified AI network resource threshold, transmit the another AI parameter through the second network. The first AI apparatus, the second AI apparatus, or the management apparatus may further detect a quantity of network resources of the second network, determine whether the quantity of network resources of the second network is greater than a specified storage network resource threshold, and if the quantity of network resources of the first network is less than the specified AI network resource threshold and the quantity of network resources of the second network is greater than the specified storage network resource threshold, transmit the another AI parameter through the second network.

In an example application scenario, if all or most of the service data to be loaded by the first AI apparatus is located in the first storage apparatus, the first AI apparatus can locally load the service data nearby. This prevents a large quantity of operations of accessing a remote storage device through the second network, so that local network resources of the second network are sufficient. However, because the first AI apparatus frequently exchanges the AI parameter with the remote AI apparatus, network resources of the first network are insufficient. In this scenario, relatively sufficient network resources of the second network may be used as a new path of the AI parameter, thereby accelerating AI parameter exchange.

In this optional manner, a new path is provided for the AI apparatuses to exchange the AI parameter with each other. When network resources of the first network are insufficient, the second network is used to exchange the AI parameter. This increases a network bandwidth for transmitting the AI parameter, shortens a delay of exchanging the AI parameter, accelerates AI parameter exchange, and accelerates AI computing.

Optionally, AI memory pass-through between different storage devices may be implemented through RDMA. Specifically, referring to FIG. 26, an embodiment of this application provides a data processing method. The method may be applied to the system 1 shown in FIG. 1. Interaction bodies of the method include a first storage device and a second storage device. The method includes the following steps.

S2601: The first AI processor sends a network resource request of the second network to the second processor.

The first AI processor may generate the network resource request of the second network, and send the network resource request of the second network to a first network interface. The first network interface may send the network resource request of the second network to the second processor. The network resource request of the second network is used to request to occupy some network resources of the second network of a second AI apparatus to transmit another AI parameter. The request of the second network may carry a destination address of the another AI parameter.

The network resource request of the second network may be a memory RDMA access request. The network resource request of the second network is used to request to access a second AI memory through RDMA. The destination address carried in the request of the second network may be an address in the second AI memory. After receiving the request of the second network, the second processor may establish an RDMA path between a first AI memory and the second AI memory.

S2602: The first AI processor obtains the another AI parameter from the first AI memory.

S2603: The first AI processor transmits the another AI parameter to the second AI memory through the second network through RDMA.

The first AI processor may locally access the first AI memory to obtain the another AI parameter, and send the another AI parameter to a first network interface in the first AI apparatus. The first network interface in the first AI apparatus may send the another AI parameter to a first network interface in the second AI apparatus. The first network interface in the second AI apparatus may receive the another AI parameter, and write the another AI parameter into the second AI memory. In this process, the second AI processor in the second AI apparatus does not need to participate through RDMA, thereby preventing a processing resource of the second AI processor from being occupied, and improving forwarding performance.

Figure 27:
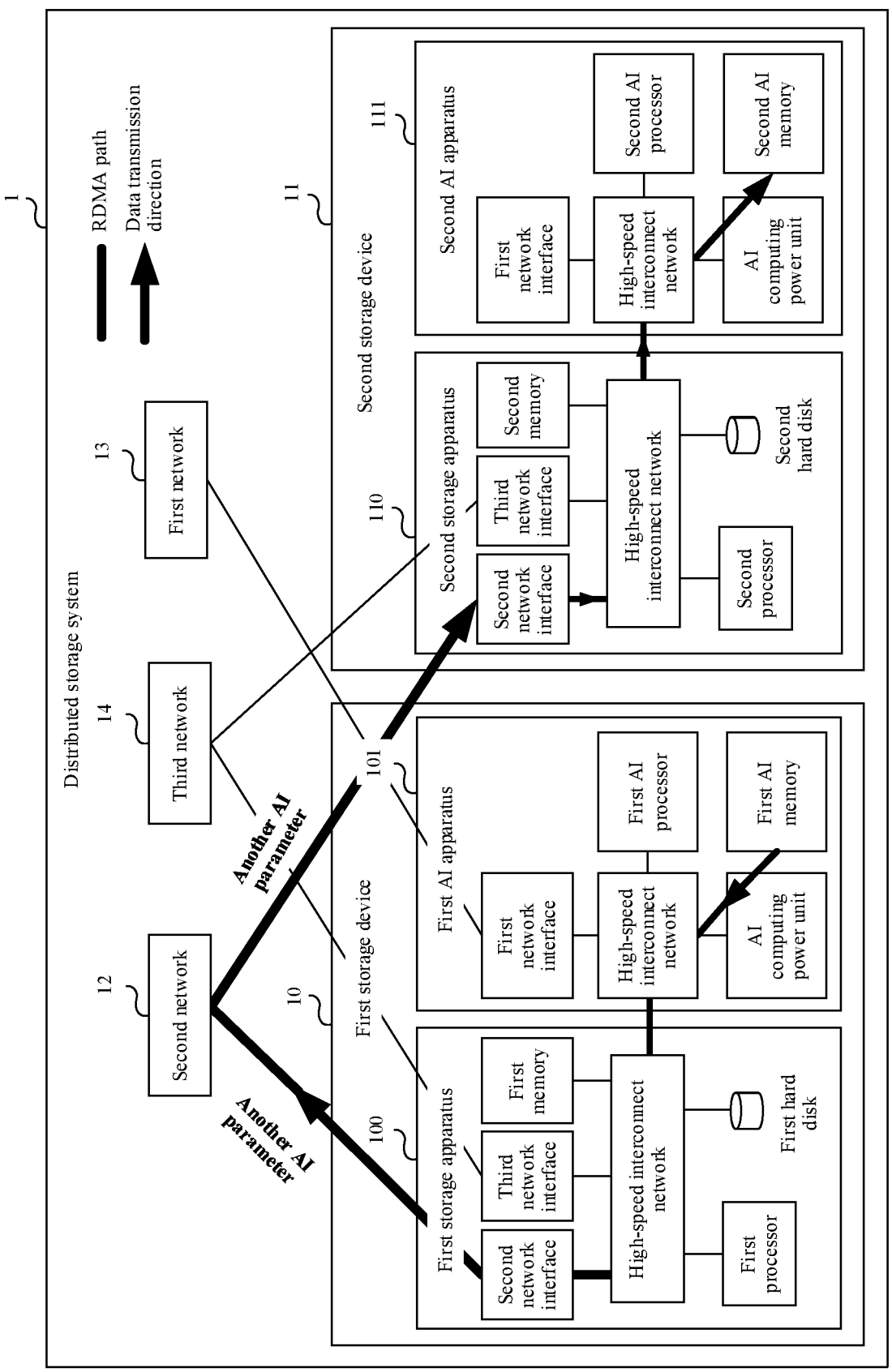
FIG. 27 is a schematic diagram of a data transmission procedure according to an embodiment of this application.

FIG. 27 is a schematic diagram of implementing data pass-through between AI memories in two storage devices through a second network. It can be learned from FIG. 27 that the second network can be used as a new path for forwarding an AI parameter, and the AI parameter of the first AI memory in the first storage device can be directly transmitted to the second AI memory through a first network through RDMA, thereby implementing data pass-through between a AI memory in a source storage device and a AI memory in a target storage device.

In this optional manner, the AI parameter can be exchanged between the first AI memory and the second AI memory through RDMA. Therefore, processing overheads of the first AI processor and the second AI processor can be avoided, and the AI parameter can directly arrive at the second AI memory from the first AI memory, thereby accelerating AI parameter exchange, and improving AI parameter exchange efficiency.

Optionally, if an AI apparatus performs training by borrowing a memory in a storage device, the memory in the storage device may cache an AI parameter. Memory pass-through between different storage devices may be implemented through RDMA, and AI parameters cached in memories in different storage devices may be exchanged through a second network. Specifically, referring to FIG. 28, an embodiment of this application provides a service data transmission method. Interaction bodies of the method include a first storage device and a second storage device. The method includes the following steps.

S2801: The first AI processor sends a network resource request of the second network to the second processor.

S2802: The first AI processor obtains the another AI parameter from the first memory.

The first AI processor may access the first memory through a high-speed interconnect network, to obtain the another AI parameter cached in the first memory.

S2803: The first AI processor transmits the another AI parameter to the second memory through the second network through RDMA.

Figure 29:
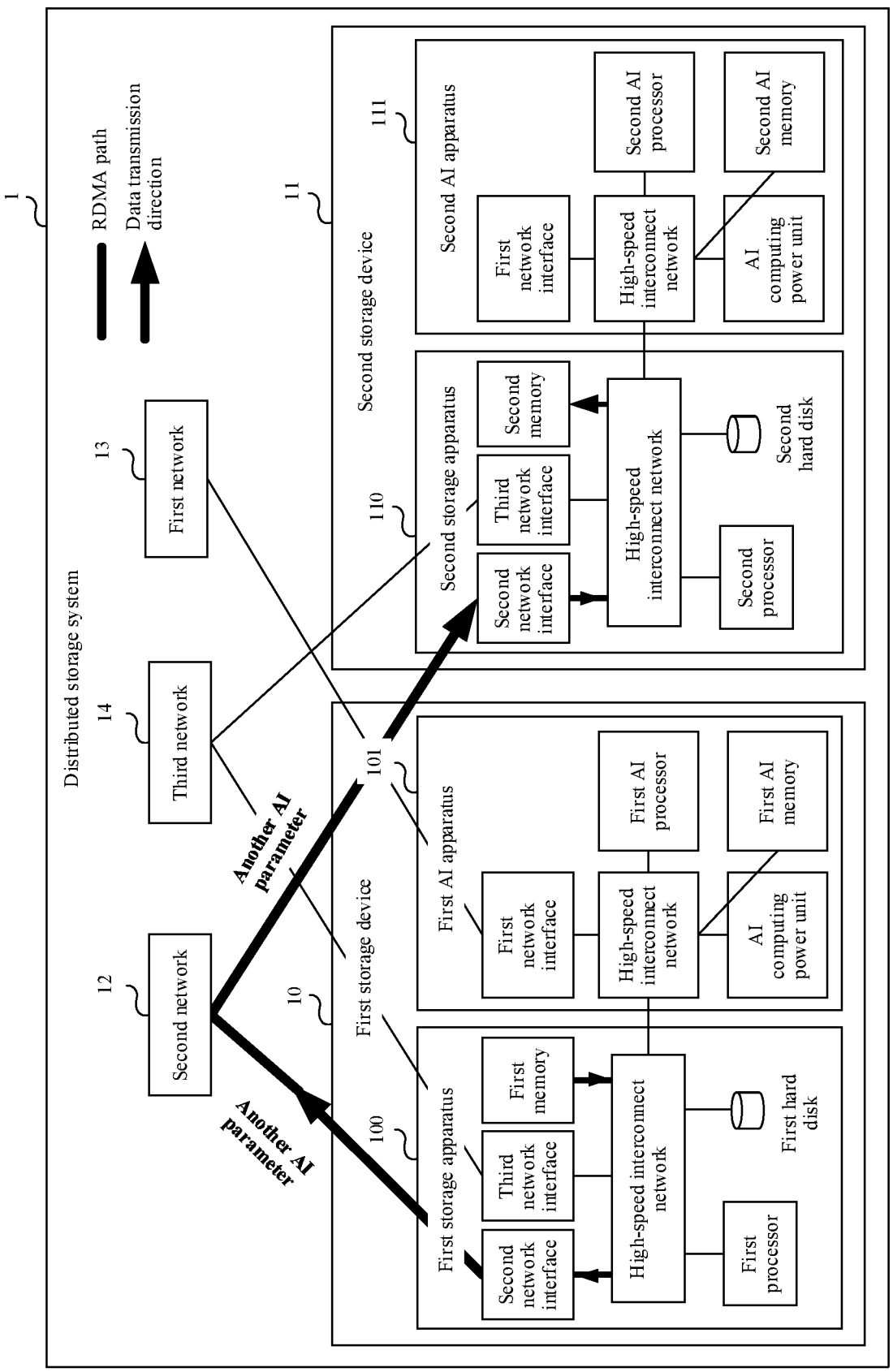
FIG. 29 is a schematic diagram of a data transmission procedure according to an embodiment of this application.

FIG. 29 is a schematic diagram of implementing AI parameter pass-through between memories in two storage devices through a second network. It can be learned from FIG. 29 that the second network can be used as a new path for forwarding an AI parameter, and the AI parameter of the first memory in the first storage device can be directly transmitted to the second memory through a first network through RDMA, thereby implementing AI parameter pass-through between a memory in a source storage node and a memory in a target storage node.

In this optional manner, the AI parameter can be exchanged between the first memory and the second memory through RDMA. Therefore, processing overheads of the first AI processor and the second AI processor can be avoided, and the AI parameter can directly arrive at the second memory from the first memory, thereby accelerating AI parameter exchange, and improving AI parameter exchange efficiency.

Optionally, a storage device in which a dataset is located in the storage system may be scheduled by using the management apparatus to perform AI computing. For details, refer to the following method embodiment.

Figure 30:
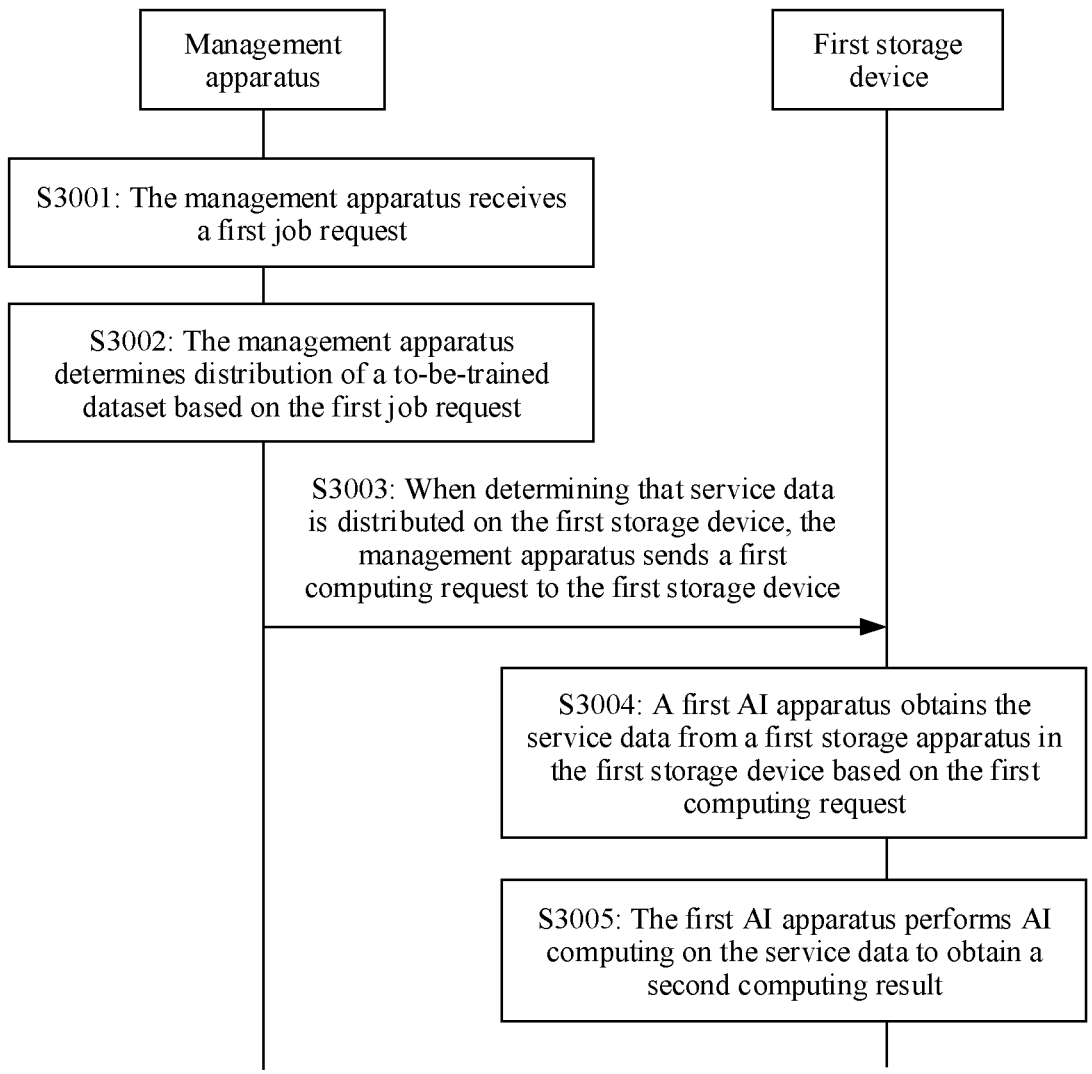
FIG. 30 is a flowchart of a data processing method according to an embodiment of this application.

FIG. 30 is a flowchart of a data processing method according to an embodiment of this application. The method may be applied to the system 1 shown in FIG. 1. Interaction bodies of the method include a management apparatus and a first storage device. The method includes the following steps.

S3001: The management apparatus receives a first job request.

The first job request is used to request to perform training based on a dataset. The dataset includes service data. The first job request may include an identifier of the dataset. The identifier of the dataset is used to indicate the dataset, for example, may be an ID or a name of the dataset. In some embodiments, a client may generate the first job request, and send the first job request to the management apparatus. The management apparatus may receive the first job request from the client. The first job request may be triggered by an input operation of the user. For example, the client may display a graphical user interface. The user may enter the identifier of the dataset in the graphical user interface, and the client may receive the entered identifier of the dataset to generate the first job request.

S3002: The management apparatus determines distribution of a to-be-trained dataset based on the first job request.

The management apparatus may parse the first job request to obtain the identifier of the dataset that is carried in the first job request, and query a mapping relationship between the identifier of the dataset and metadata of the dataset based on the identifier of the dataset, to obtain the metadata of the dataset. The metadata of the dataset is used to indicate an address of the dataset. The management apparatus may determine the distribution of the dataset based on the metadata of the dataset. For example, the management apparatus may query a storage device in which each piece of service data in the dataset is located, and generate a storage device list. The storage device list includes a device identifier. The device identifier is used to identify a target storage device. The target storage device stores some or all of the service data in the dataset. Optionally, there may be a plurality of device identifiers in the storage device list, and a sequence of arranging the plurality of device identifiers is used to indicate an amount of data that is of the dataset and that is stored in a corresponding target storage device. For example, in the storage device list, a target device corresponding to the first device identifier stores the largest amount of service data in the dataset, and a target device corresponding to the last device identifier in the storage device list stores the smallest amount of service data in the dataset.

S3003: When determining that the service data is distributed on the first storage device, the management apparatus sends a first computing request to the first storage device.

The first computing request is used to request the first AI apparatus to perform AI computing on the service data. The first computing request may include the identifier of the dataset, and the identifier of the dataset is carried to indicate that the service data in the dataset needs to be obtained. For example, if the distributed storage system includes N storage devices: a storage device 1 to a storage device N, the dataset is distributed on the storage device 1, the storage device 2, and the storage device 3, and the management apparatus may select to perform AI computing on the storage device 1, the storage device 2, and the storage device 3, the management apparatus sends the first computing request to an AI apparatus of each of the storage device 1, the storage device 2, and the storage device 3, where N is a positive integer.

S3004: The first AI apparatus obtains the service data from the first storage apparatus in the first storage device based on the first computing request.

The first AI apparatus may parse the first computing request to obtain the identifier of the dataset that is carried in the first computing request, determine an address of the dataset in the first storage apparatus based on the identifier of the dataset, and access the first storage apparatus through a high-speed interconnect network, to obtain all or some of the service data of the dataset stored in the first storage apparatus.

S3005: The first AI apparatus performs AI computing on the service data to obtain a first computing result.

In this optional manner, the management apparatus selects the first storage device in which the service data is located, to provide AI computing, and the first storage device may obtain the service data through the first storage apparatus in the first storage device, to perform AI computing. This prevents the service data from moving across storage devices, avoids a delay caused by accessing another storage device to obtain the service data, shortens a delay of obtaining the service data, and accelerates AI computing.

Optionally, the management apparatus may determine whether a running status of the first storage device meets a specified condition. If the management apparatus determines that the running status of the first storage device meets the specified condition, the management apparatus sends the first computing request to the first storage device.

The running status may include one or more of free space of a memory in a storage device, free space of an AI memory, an occupation status of an AI computing power unit, an occupation rate of an AI processor, an occupation rate of a processor in the storage device, and network resource usage. The preset condition includes any one of the following conditions (1) to (5) and a combination thereof:

(1) whether the free space of the memory in the storage device is greater than a specified space threshold;
(2) whether the free space of the AI memory is greater than a specified space threshold;
(3) whether the occupation rate of the AI processor is less than a specified occupation rate threshold;
(4) whether the occupation rate of the processor in the storage device is less than a specified occupation rate threshold; and
(5) whether the network resource usage is less than a specified occupation rate threshold.

In this optional manner, it can be ensured that the selected first storage device is not occupied currently and can provide AI computing power, so as to avoid problems that device overheads are excessively high and an AI computing task cannot be completed in time because an occupied storage device is selected to perform AI computing.

Optionally, if the storage device in which the dataset is located has been occupied, the management apparatus may schedule a storage device that is in the storage system and that is close to the dataset to perform AI computing. Specifically, referring to FIG. 31, an embodiment of this application provides a flowchart of a data processing method. The method may be applied to the system 1 shown in FIG. 1. Interaction bodies of the method include a management apparatus, a first storage device, and a second storage device. The method includes the following steps.

S3101: The management apparatus receives a second job request.

Step S3101 is similar to step S3001. Details are not described herein again.

S3102: The management apparatus determines distribution of a to-be-trained dataset based on the second job request.

Step S3101 is similar to step S3002. Details are not described herein again.

S3103: When the other service data is distributed on the second storage device in the plurality of storage device, the management apparatus further determines whether a running status of the second storage device meets a specified condition.

S3104: When the running status of the second storage device does not meet the specified condition, the management apparatus sends a second computing request to the first storage device, where a distance between the first storage device and the second storage device is less than a specified distance threshold.

In some embodiments, for each storage device in the distributed storage system, the management apparatus may determine a running status of the storage device and a distance between the storage device and the second storage device, and the management apparatus may determine, in the distributed storage system based on the running status of each storage device and the distance between the storage device and the second storage device, a storage device whose running status meets the specified condition and whose distance to the second storage device is less than the specified distance threshold, to obtain the first storage device.

In a possible implementation, the management apparatus may determine the first storage device through cost-based optimization (Cost-Based Optimization, CBO for short). For example, for each storage device in the distributed storage system, the management apparatus may compute a cost value of the storage device based on the running status of the storage device, the distance between the storage device and the second storage device, and an amount of data in a second dataset stored in the storage device. The cost value indicates overheads of enabling the storage device to perform AI computing. The management apparatus may select, based on the cost value of the storage device, a storage device whose cost value meets a specified condition to serve as the first storage device. According to this algorithm, because a cost value of a storage device closest to the dataset is small, the storage device closest to the dataset may be selected to start AI computing. For example, a weight x1 and a weight y1 may be respectively assigned to a local storage and a remote storage, where x1 is less than y1. For any storage device, if an amount of data that is of the second dataset and that is stored in the storage device is x, and an amount of data that is of the second dataset and that is not stored in the storage device is y, a weighted summation is performed on x and y based on the weight x1 and the weight y1, and an obtained weighted sum value is used as a cost value of the storage device. The storage devices are sorted in ascending order of cost values. If n storage devices are required for AI computing, the first n storage devices are selected from the sorting result as the first storage device. For example, a weight of locally loaded data may be set to 1, and a weight of remotely loaded data may be set to 10. If a specific storage device stores 30% of the dataset, and the remaining 70% of the dataset is not stored in the storage device, a cost value of the storage device is $30\% \times 1 + 70\% \times 10 = 7.3$.

Optionally, after selecting the first storage device, the management apparatus may output a recommendation list to the client. The recommendation list indicates that the management apparatus recommends a storage device that starts AI computing. The recommendation list may include an identifier of the first storage device.

S3105: The first AI apparatus obtains the other service data from the second storage device based on the second computing request.

S3106: The first AI apparatus performs AI computing on the other service data to obtain a second computing result.

In this optional manner, if the storage device in which the dataset is located has been occupied, the management apparatus can select a storage apparatus that is close to the dataset, to provide AI computing. This shortens a dataset transmission distance, and reduces cross-node service data movements.

The following describes an example of an application scenario of this embodiment of this application.

Figure 32:
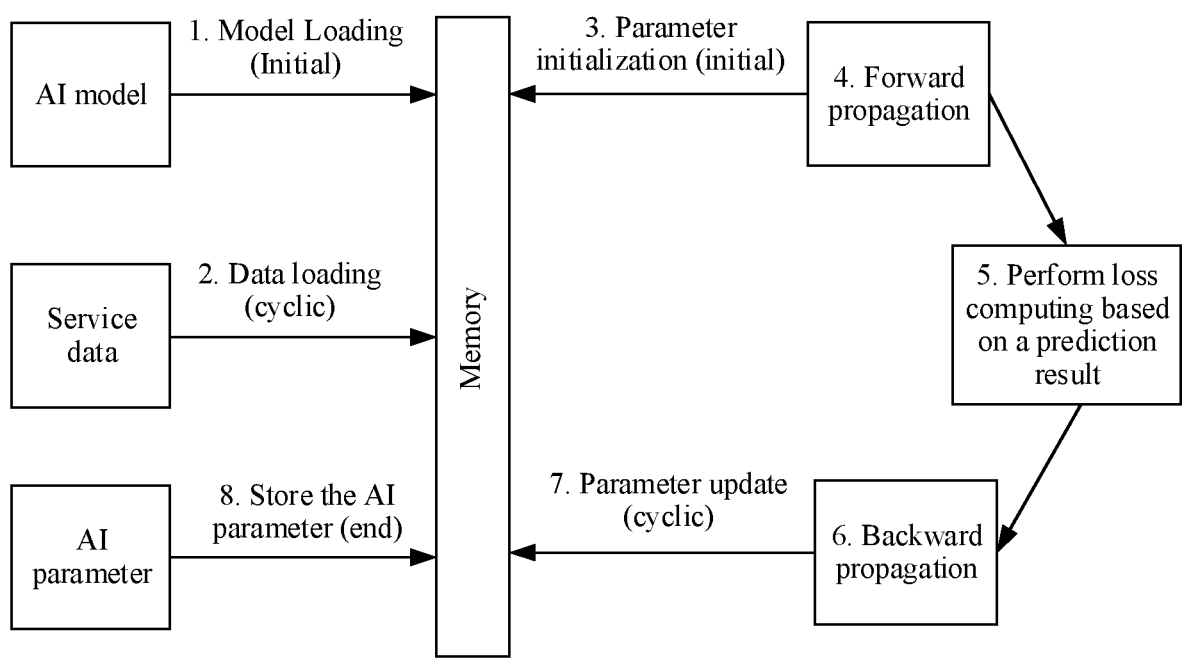
FIG. 32 is a flowchart of a data processing method according to an embodiment of this application.

With application of deep learning, a dataset including a large amount of data is usually required for model training, to obtain a neural network through fitting. For example, FIG. 32 shows a logical procedure of model training. The model training may include a model loading phase, a data loading phase, a parameter initialization phase, a forward propagation phase, a loss computing phase, a backward propagation phase, a parameter update phase, and a weight saving phase.

Because a large amount of iterative training is required to obtain a model parameter, and iteration may be performed for hundreds to tens of thousands times, a large amount of data needs to be loaded to perform parameter update and exchange, and consequently model training is very time-consuming. It can be learned that fully using software resources and hardware resources, improving scheduling performance, and optimizing a data transmission path are very important for model training.

According to the methods provided in the embodiments of this application, each phase of model training can be optimized.

Figure 31:
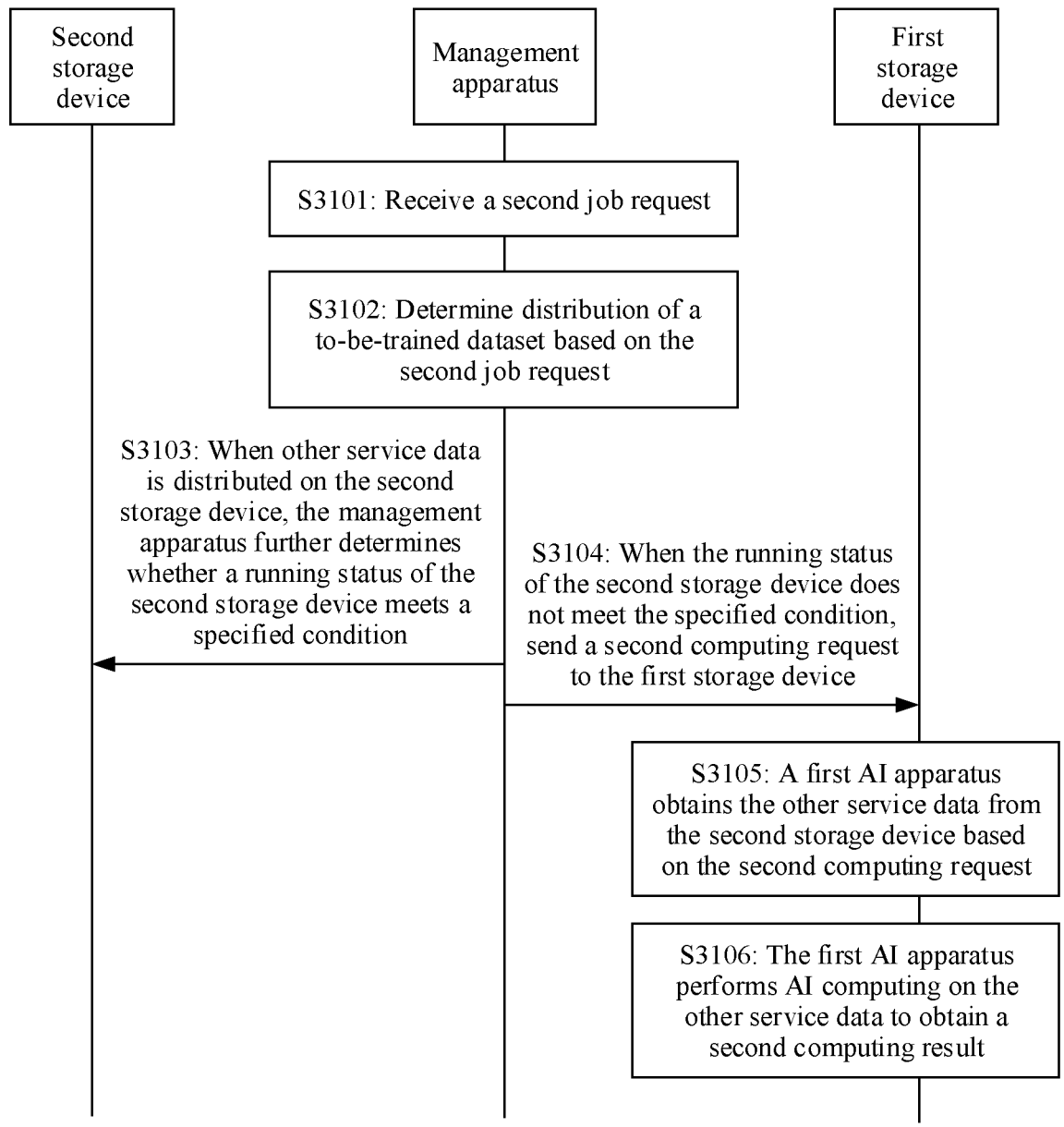
FIG. 31 is a flowchart of a data processing method according to an embodiment of this application.

Specifically, in the model loading phase, the methods provided in the embodiments in FIG. 30 and FIG. 31 may be used to provide near-data AI training. Specifically, a near-data AI apparatus may be selected as a training node based on an address of data required for model training, to start training.

Figure 12:
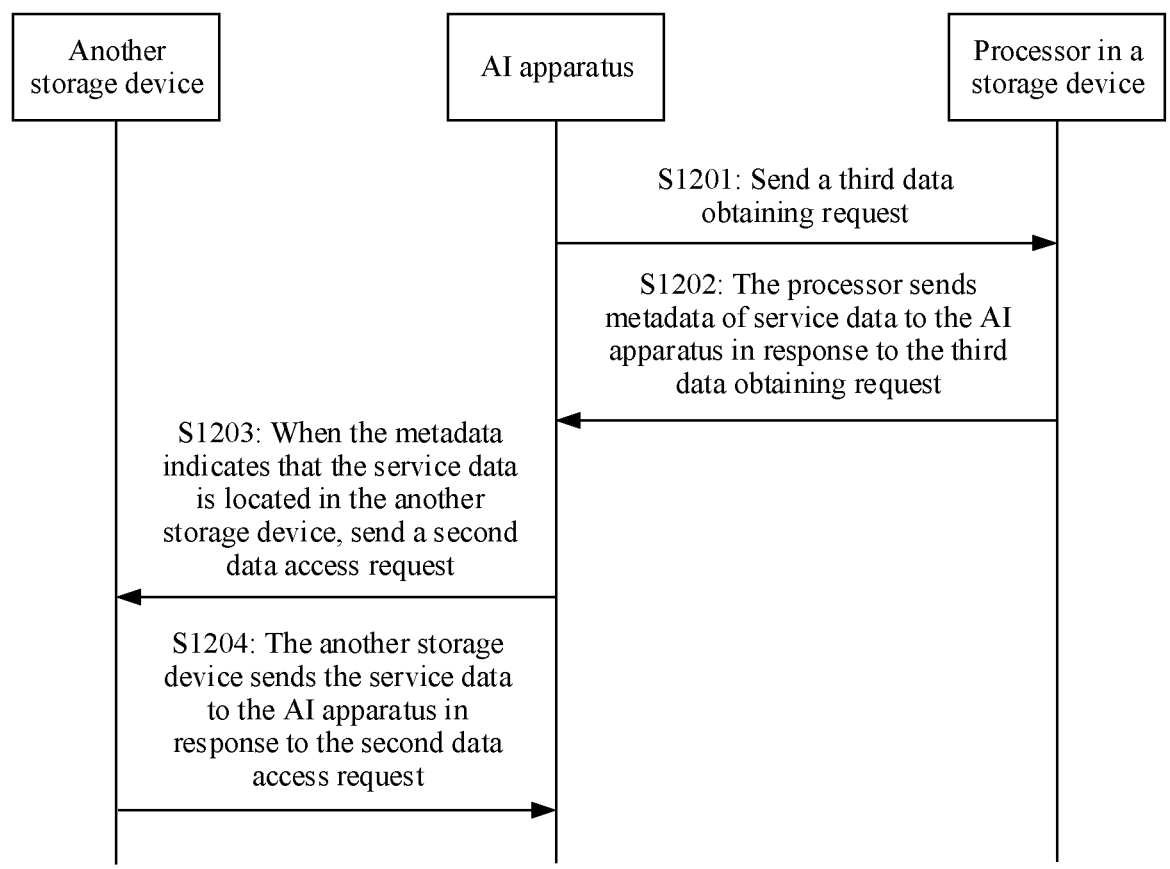
FIG. 12 is a flowchart of a data processing method according to an embodiment of this application.
Figure 14:
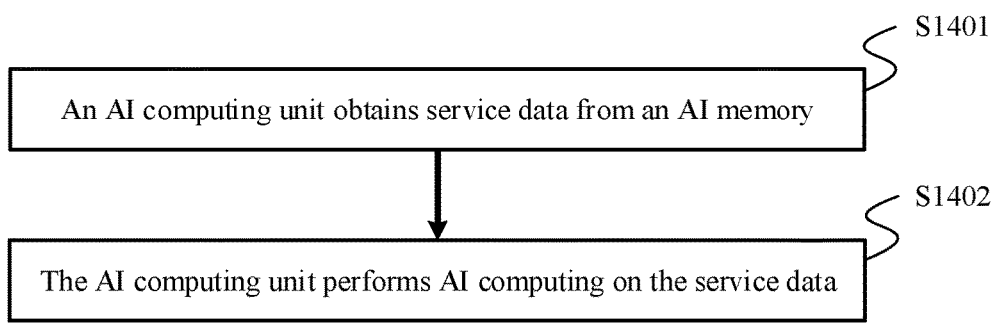
FIG. 14 is a flowchart of a data processing method according to an embodiment of this application.

In the data loading phase, the methods provided in the embodiment in FIG. 7, the embodiment in FIG. 8, the embodiment in FIG. 9, the embodiment in FIG. 12, and the embodiment in FIG. 14 may be used to shorten a service data transmission path, and perform a data read/write operation based on near storage. In addition, high-speed interconnection between a memory and an AI memory can be used to implement RDMA pass-through between the memory and the AI memory.

In the forward propagation phase, the method provided in the embodiment in FIG. 18 may be used to implement collaboration between computing power of a processor and computing power of an AI processor based on the high-speed interconnect network, thereby accelerating AI operator computing.

Figure 28:
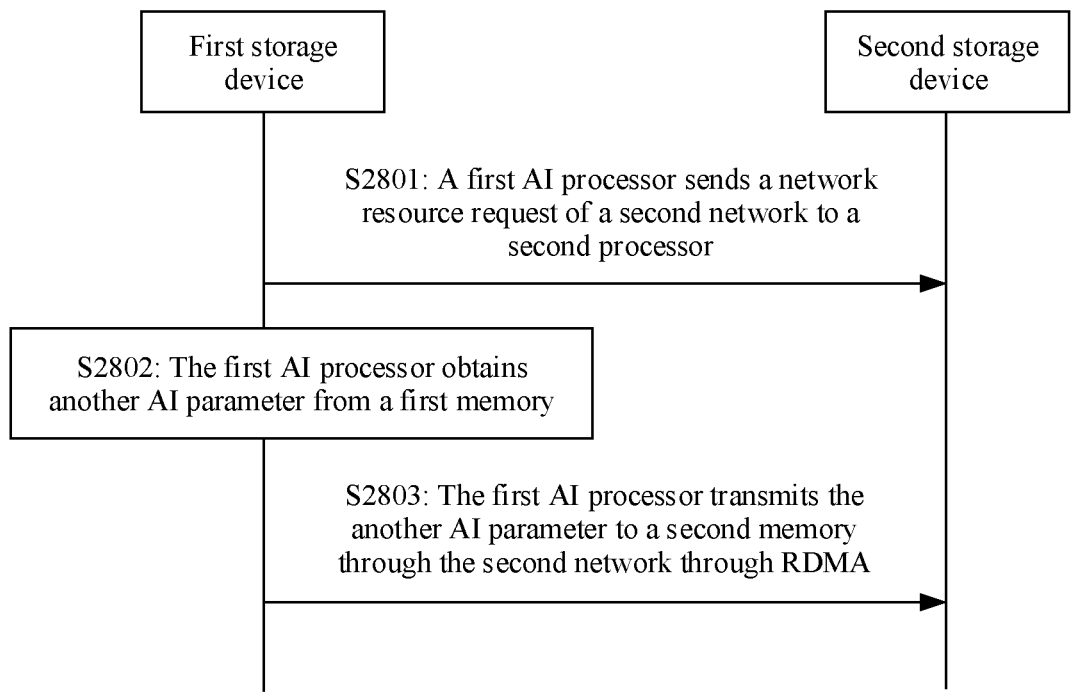
FIG. 28 is a flowchart of a data processing method according to an embodiment of this application.

In the parameter update phase, the method provided in the embodiment in FIG. 26 and the method provided in the embodiment in FIG. 28 may be used to implement an RDMA path between AI memories in different storage devices and an RDMA path between memories in different storage devices, to transmit an AI parameter through the RDMA path, thereby accelerating parameter exchange.

Figure 33:
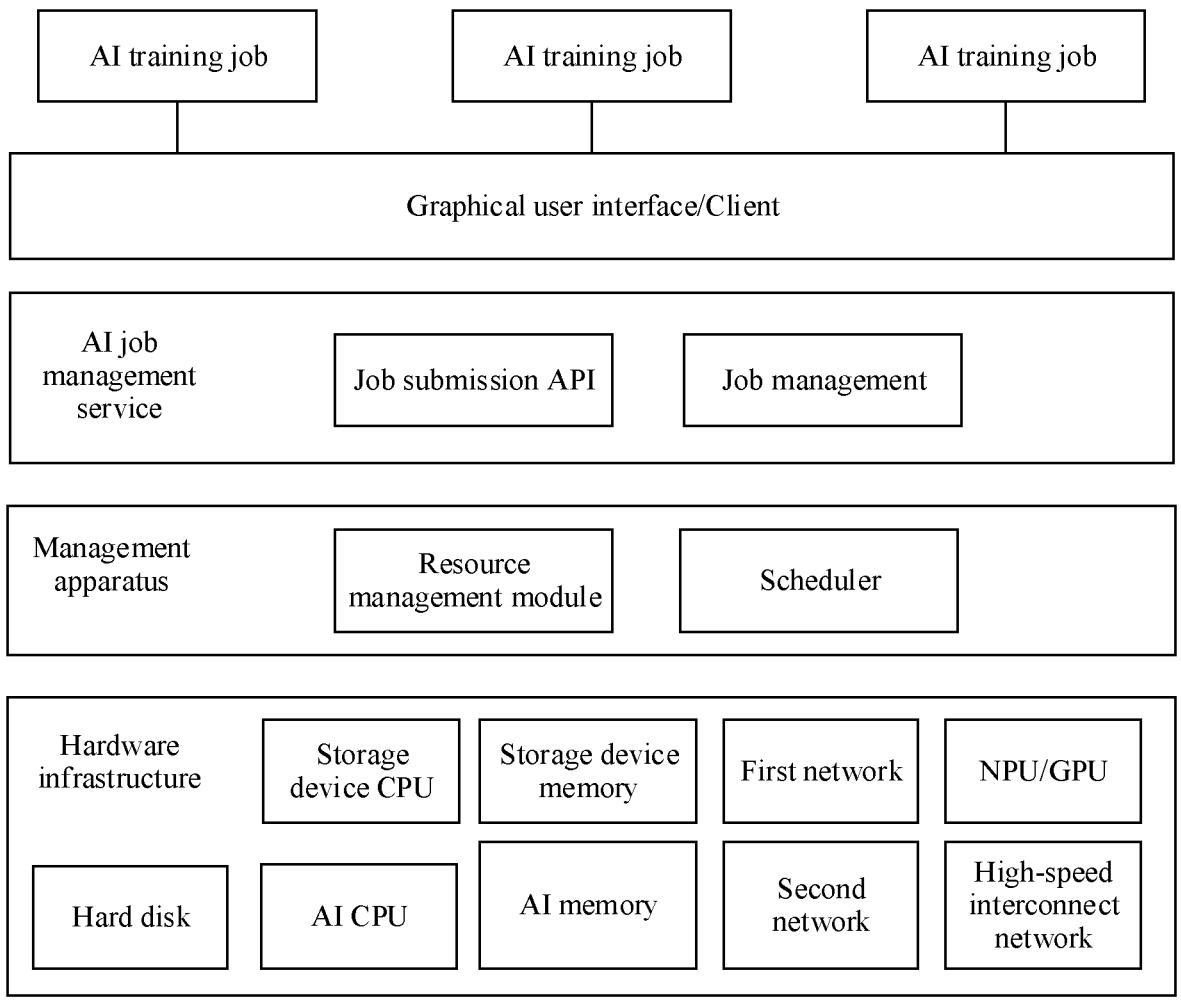
FIG. 33 is a logical architectural diagram of a data processing method according to an embodiment of this application.

FIG. 33 is a logical architecture diagram of AI training according to an embodiment of this application. A user may perform an operation on a client, and enter an AI training job. The client generates a request for indicating to perform the AI training job, to invoke a job to submit an application programming interface (Application Programming Interface, API), and sends the request to an AI job management service. After receiving the request, the AI job management service parses the job carried in the request, and sends a resource request to the management apparatus. After the management apparatus receives the resource request, a scheduler in the management apparatus selects an appropriate storage device from a managed bottom-layer physical resource pool, and starts a corresponding AI training job on an AI apparatus in the selected storage device. Computing power of the AI apparatus in the selected storage device is occupied by the AI training job. After the AI training job is completed, the compute resource is released.

All the foregoing optional technical solutions may be randomly combined to form optional embodiments of this application. Details are not described herein again.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer program instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer program instructions may be transmitted from a website, computer, server, or service data center to another website, computer, server, or service data center in a wired or wireless manner. The computer-readable storage medium may be any usable medium accessible by a computer, or a service data storage device, such as a server or a service data center, integrating one or more usable media. The usable medium may be a magnetic medium (for example, a floppy disk, a hard disk, or a magnetic tape), an optical medium (for example, a digital video disc (digital video disc, DVD), a semiconductor medium (for example, a solid-state drive), or the like.

A person of ordinary skill in the art may be aware that, method steps and units described in the embodiments disclosed in this specification may be implemented by electronic hardware, computer software, or a combination thereof. To clearly describe interchangeability between the hardware and the software, the foregoing has generally described steps and compositions of the embodiments according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It can be clearly understood by a person skilled in the art that, for the purpose of convenient and brief description, for a detailed working process of the foregoing described system, apparatus, and unit, refer to a corresponding process in the foregoing method embodiment. Details are not described herein again.

In the several embodiments provided in this application, it should be understood that the disclosed system, apparatus, and method may be implemented in other manners. For example, the foregoing described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings, the direct couplings, or the communication connections may be implemented through some interfaces, and indirect couplings or communication connections between the apparatuses or the units may be connections in an electrical form, a mechanical form, or another form.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for indicating a computer device (which may be a personal computer, a server, or a network device) to perform all or some of the steps of the method described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When the software is used to implement the embodiments, the embodiments may be implemented all or partially in a form of a computer program product. The computer program product includes one or more computer program instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD), a semiconductor medium (for example, a solid-state drive), or the like.

A person of ordinary skill in the art may understand that all or some of the steps of the embodiments may be implemented by hardware or a program instructing related hardware. The program may be stored in a computer-readable storage medium. The mentioned storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A data processing method implemented a distributed storage system having a plurality of storage devices, comprising:
    sending, by a first artificial intelligence (AI) apparatus of a first storage device in the plurality of storage devices, a data obtaining request to a first processor of the first storage device to obtain service data, wherein the first storage device of the distributed storage system comprises the first processor, a first hard disk, and the first AI apparatus, wherein the first AI apparatus communicates with the first processor through a high-speed interconnect network;
    sending, by the first processor, metadata of the service data to the first AI apparatus in response to the data obtaining request, wherein the metadata indicates an address of the service data:
    when the metadata indicates that the service data is located in a second storage device in the plurality of storage devices, sending, by the first AI apparatus, a second data access request to the second storage device, wherein the second data access request is a remote direct memory access (RDMA) request, and wherein the second data access request comprises the metadata;
    receiving, by the first processor, the service data sent by the second storage device in response to the second data access request;
    storing, by the first processor, the service data in the first hard disk; and
    performing, by the first processor, AI computing on the service data.

2. The method according to claim 1, further comprising:
    transmitting, by the second storage device, the service data to the first storage device through a second network; and
    transmitting, by the second storage device, an AI parameter to the first storage device through a first network, wherein the AI parameter is for performing AI computing on the service data.

3. The method according to claim 2, further comprising:
    transmitting, by the second storage device in the plurality of storage devices, other service data to the first storage device through the first network; and
    transmitting another AI parameter through the second network, wherein the another AI parameter is for performing AI computing on the other service data.

4. The method according to claim 1, wherein the distributed storage system comprises a management apparatus, and the method further comprises:
    receiving, by the management apparatus, a first job request;
    determining, by the management apparatus, distribution of a to-be-trained dataset based on the first job request, wherein the dataset comprises the service data; and
    when the service data is distributed on the first storage device, sending, by the management apparatus, a first computing request to the first storage device, wherein the first computing request is for requesting the first AI apparatus to perform AI computing on the service data.

5. The method according to claim 4, wherein before the sending, by the management apparatus, the first computing request to the first AI apparatus in the first storage device, the method further comprises:
    determining, by the management apparatus, that a running status of the first storage device meets a specified condition.

6. The method according to claim 5, wherein the dataset further comprises other service data, and the method further comprises:
    when the other service data is distributed on a second storage device in the plurality of storage devices, determining, by the management apparatus, a running status of the second storage device;

when the running status of the second storage device does not meet the specified condition, sending, by the management apparatus, a second computing request to the first storage device, wherein a distance between the first storage device and the second storage device is less than a specified distance threshold;

obtaining, by the first AI apparatus, the other service data from the second storage device based on the second computing request; and performing, by the first AI apparatus, AI computing on the other service data to obtain a second computing result.

7. A distributed storage system, comprising:

a plurality of storage devices, wherein a first storage device in the plurality of storage devices comprises a first processor, a first hard disk, and a first artificial intelligence (AI) apparatus, wherein the first AI apparatus communicates with the first processor through a high-speed interconnect network, wherein the first AI apparatus is configured to send a data obtaining request to the first processor to obtain service data, wherein the first processor is configured to send metadata of the service data to the first AI apparatus in response to the data obtaining request, wherein the metadata indicates an address of the service data, wherein when the metadata indicates that the service data is located in a second storage device in the plurality of storage devices, the first AI apparatus is further configured to send a second data access request to the second storage device, wherein the second data access request is a remote direct memory access (RDMA) request, wherein the second data access request comprises the metadata, and wherein the first processor is further configured to receive the service data sent by the second storage device in response to the second data access request, store the service data in the first hard disk, and perform AI computing on the service data.

8. The distributed storage system according to claim 7, wherein the first storage device further comprises a first memory, and wherein the first processor is further configured to obtain a segment of memory space from the first memory through division and reserve the segment of memory space for the first AI apparatus.

9. The distributed storage system according to claim 8, wherein the first AI apparatus comprises a first AI processor and a first AI memory, wherein the first AI processor is configured to, when an available capacity of the first AI memory reaches a preset threshold, send a memory application request to the first processor, and wherein the available capacity of the first AI memory is determined by a specified batch size, and the memory application request is for requesting the first processor to obtain a segment of memory space from the first AI memory through division and reserve the segment of memory space for the first AI apparatus.

10. The distributed storage system according to claim 9, wherein the first AI processor is configured to divide a computing task into at least two subtasks, and send a first subtask in the at least two subtasks to the first processor, wherein the computing task is for performing AI computing on the service data, and wherein the first processor is further configured to execute the first subtask and send a computing result to the first AI processor.

* * * * *